C. HOLLY.
MACHINE FOR MAKING BOXES.
APPLICATION FILED APR. 24, 1909.
1,158,211.
Patented Oct. 26, 1915.
26 SHEETS—SHEET 8.
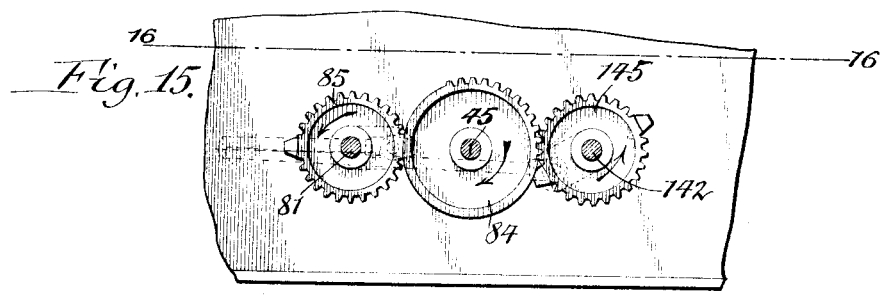
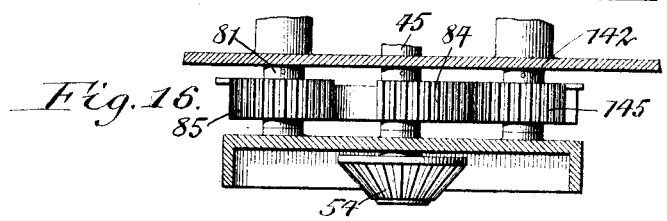
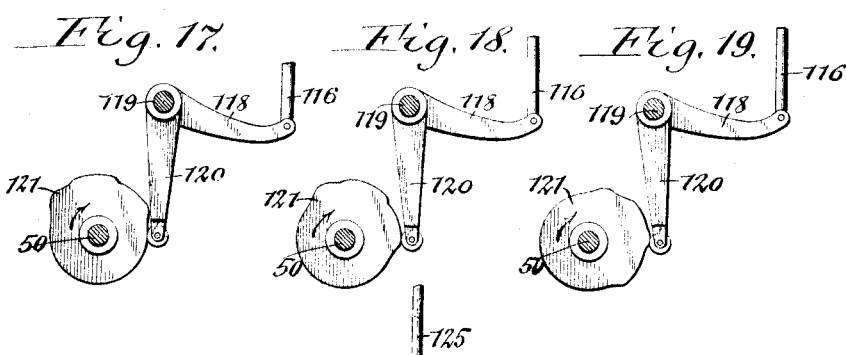
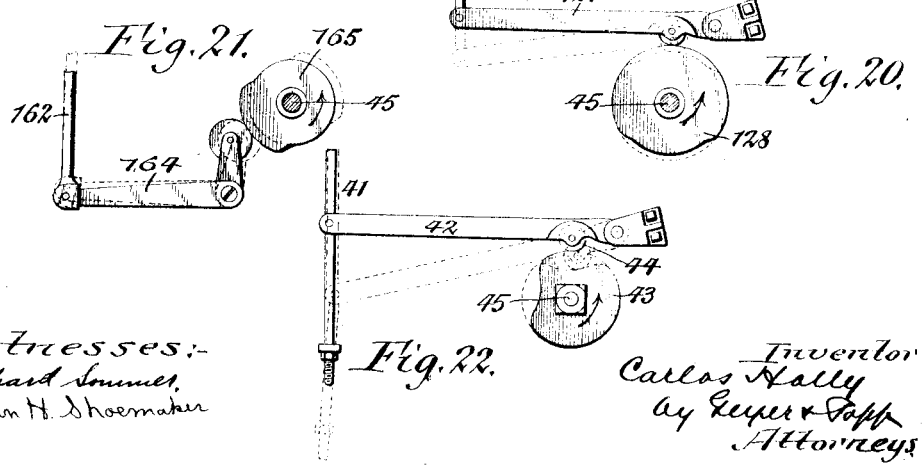
Witnesses:
Richard Sommer,
John H. Shoemaker
Inventor
Carlos Holly
by Geyer & Topp
Attorneys

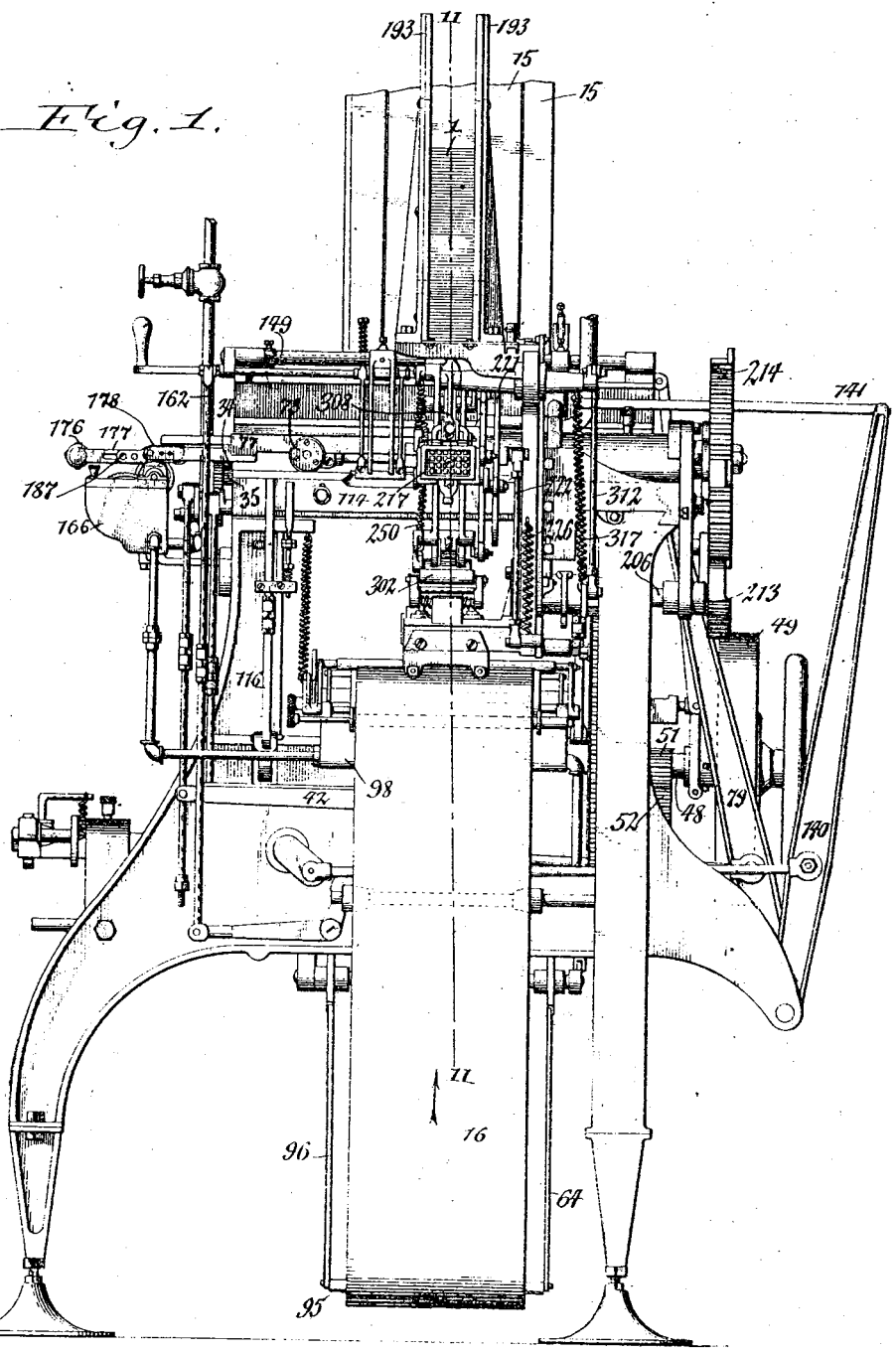

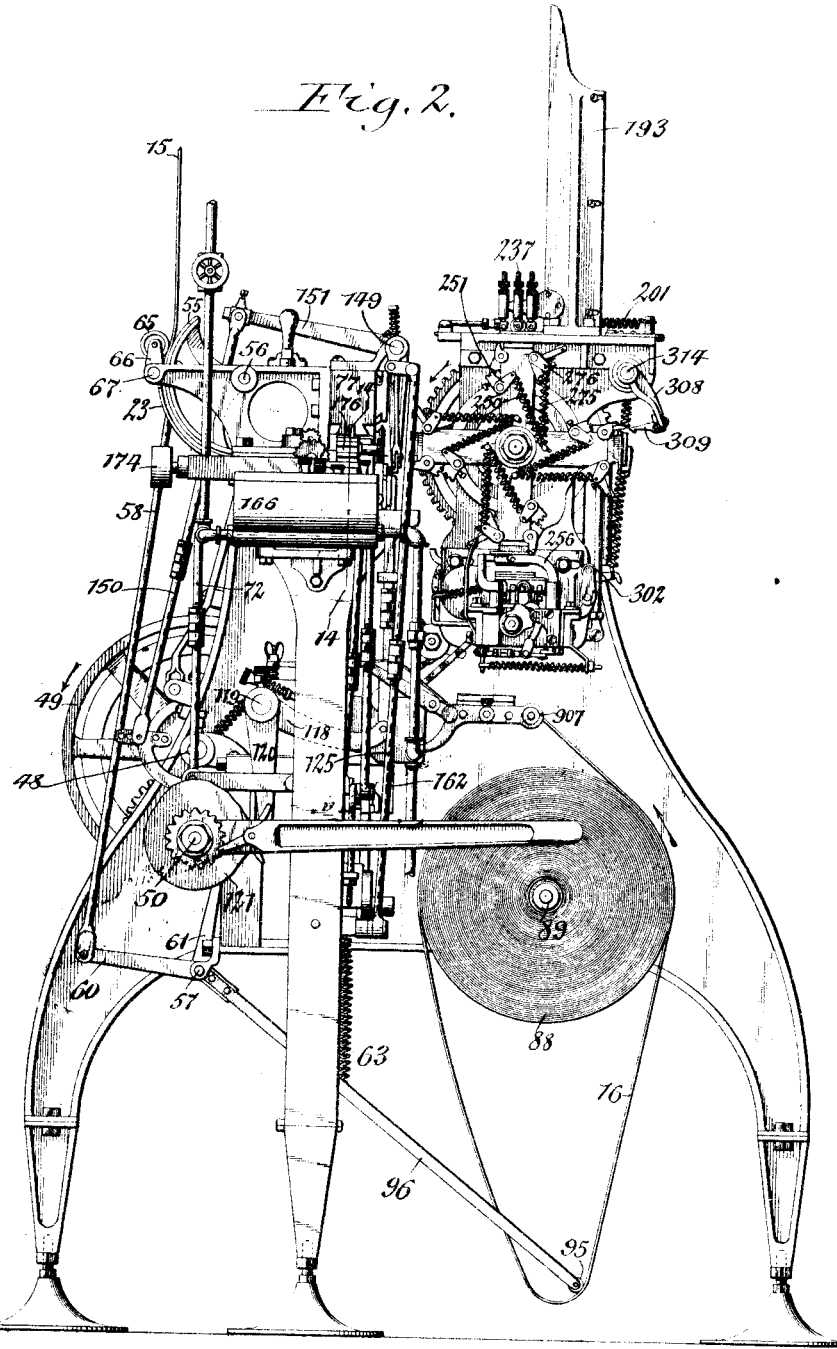

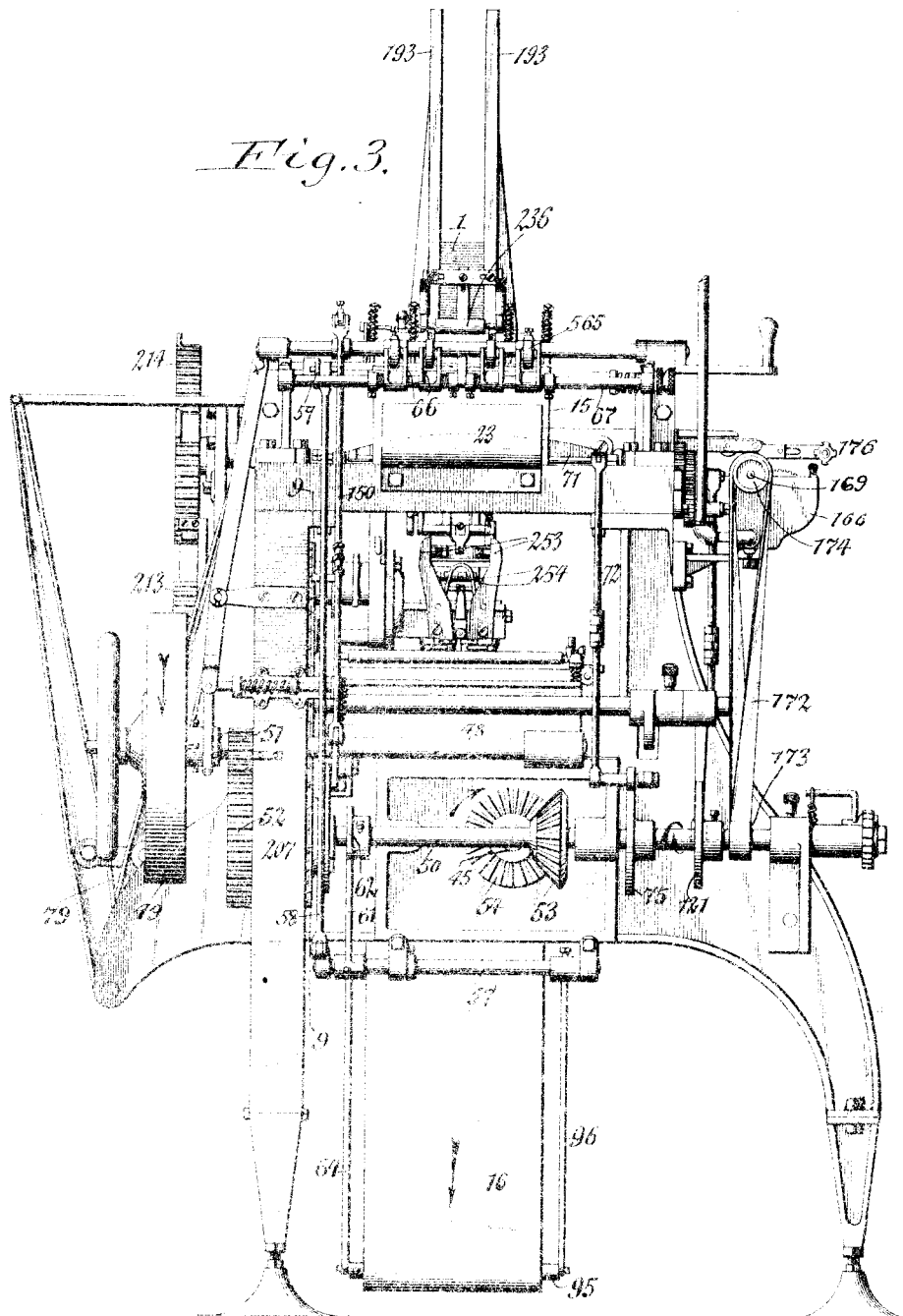

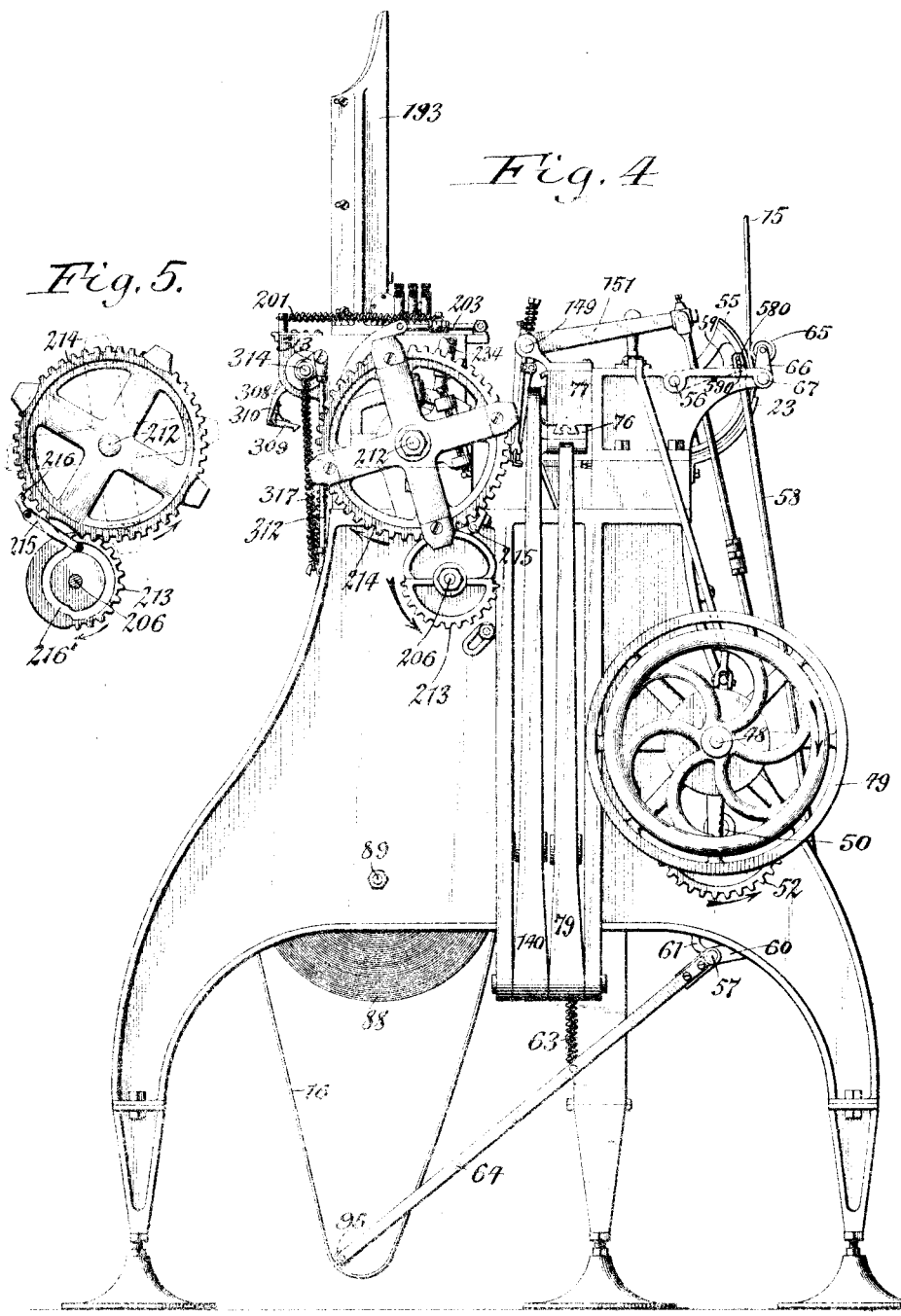

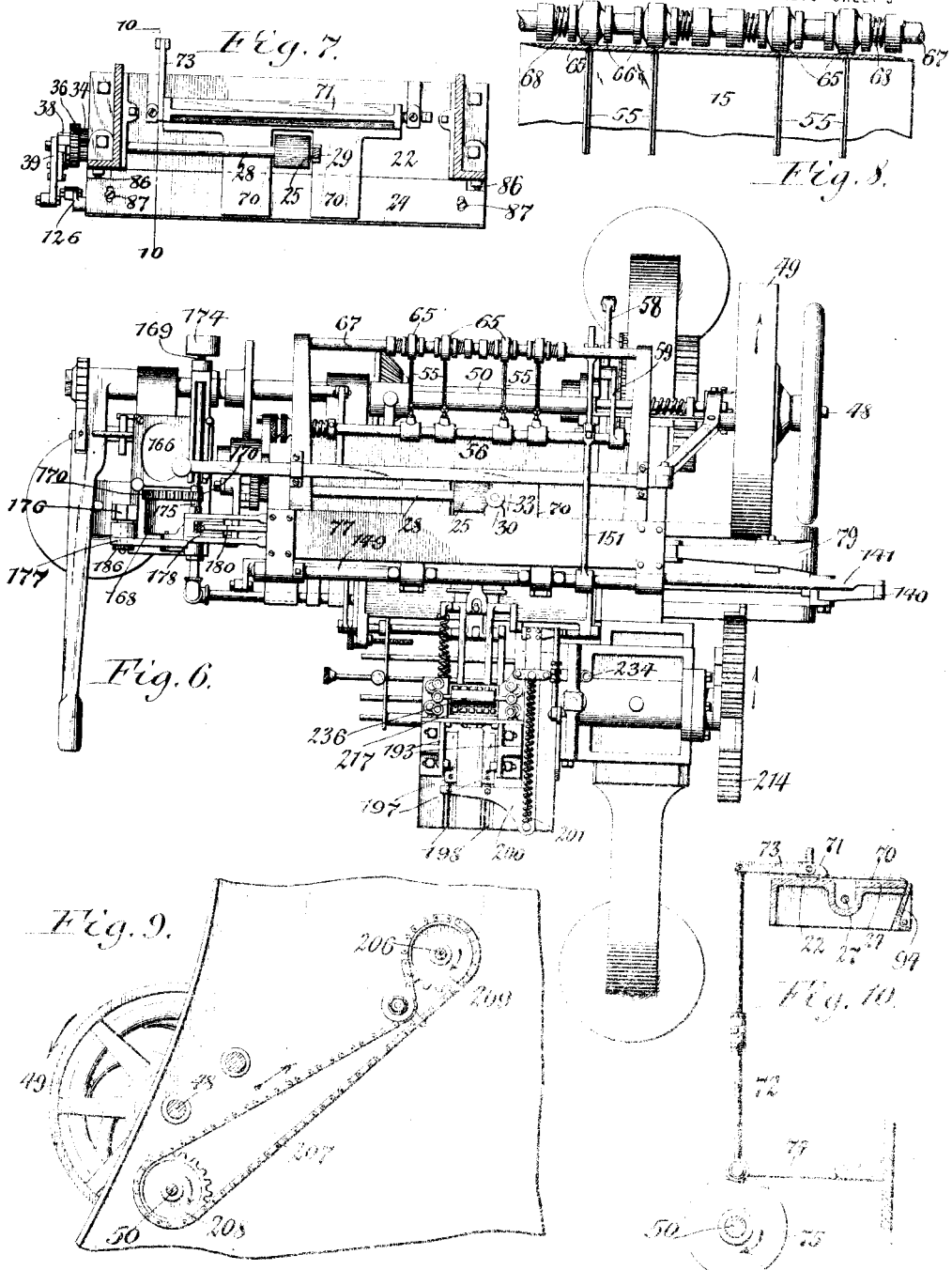

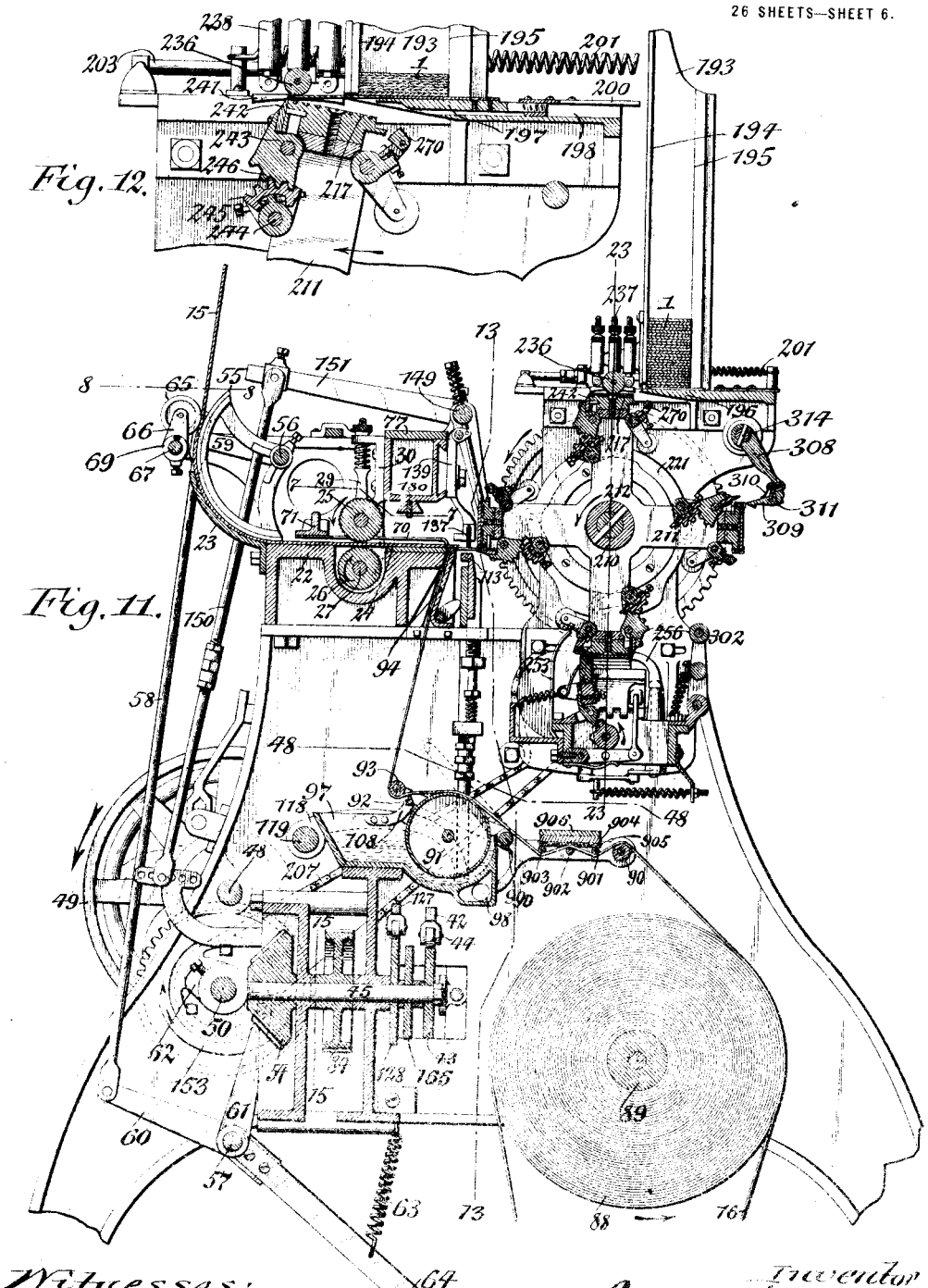

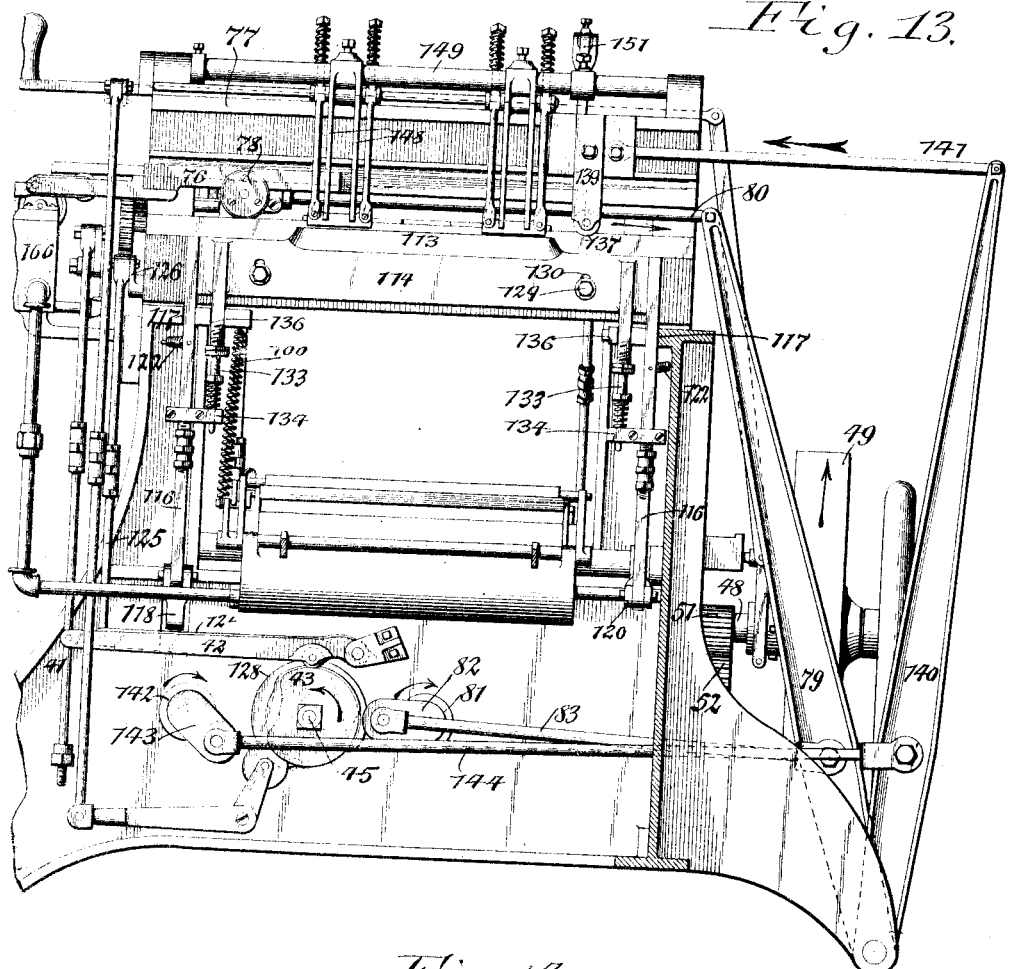

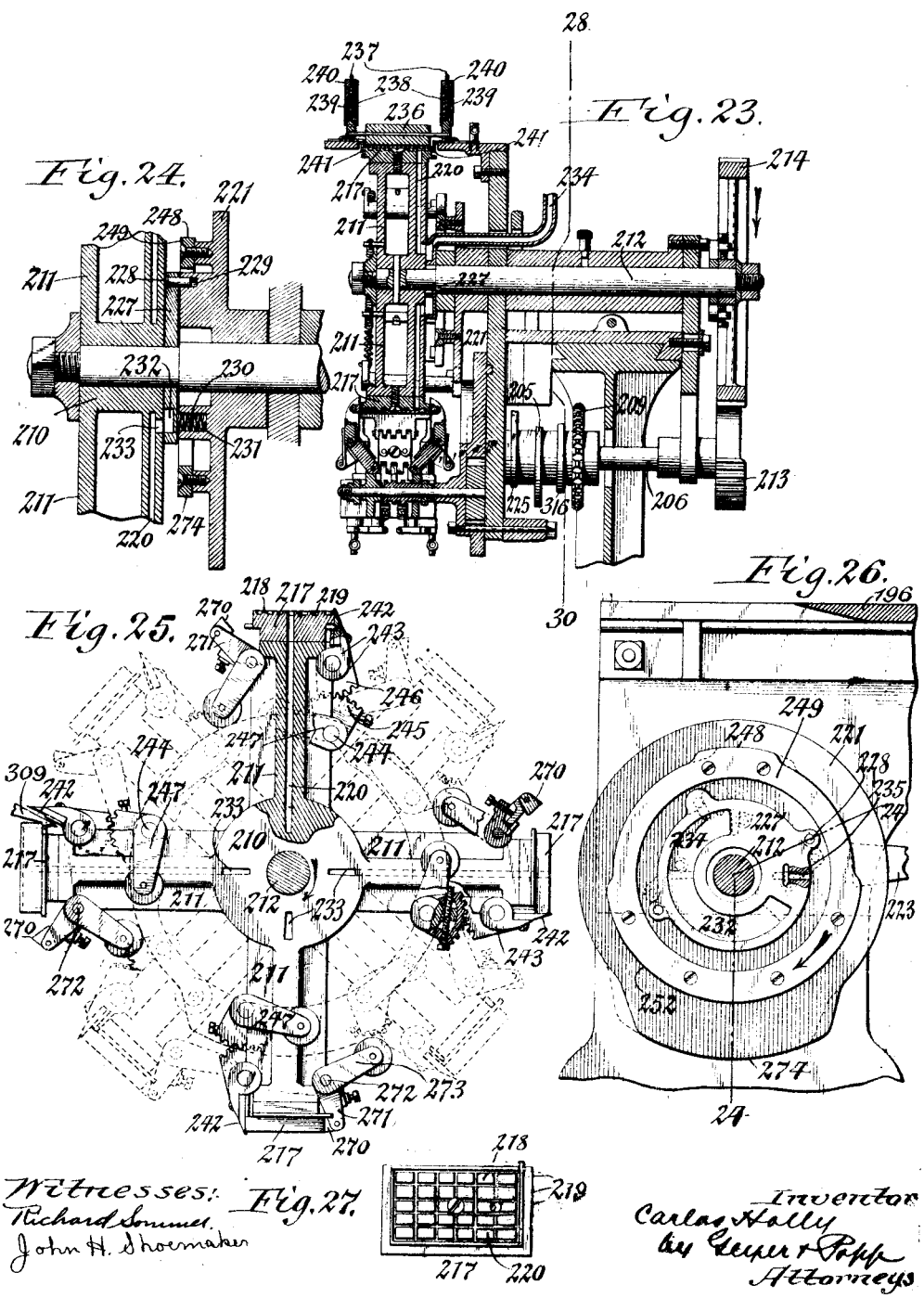

C. HOLLY.
MACHINE FOR MAKING BOXES.
APPLICATION FILED APR. 24, 1909.

1,158,211.

Patented Oct. 26, 1915.
26 SHEETS—SHEET 10.

Witnesses:
Richard Sommer.
John H. Shoemaker.

Inventor
Carlos Holly
by Geyer & Popp
Attorneys

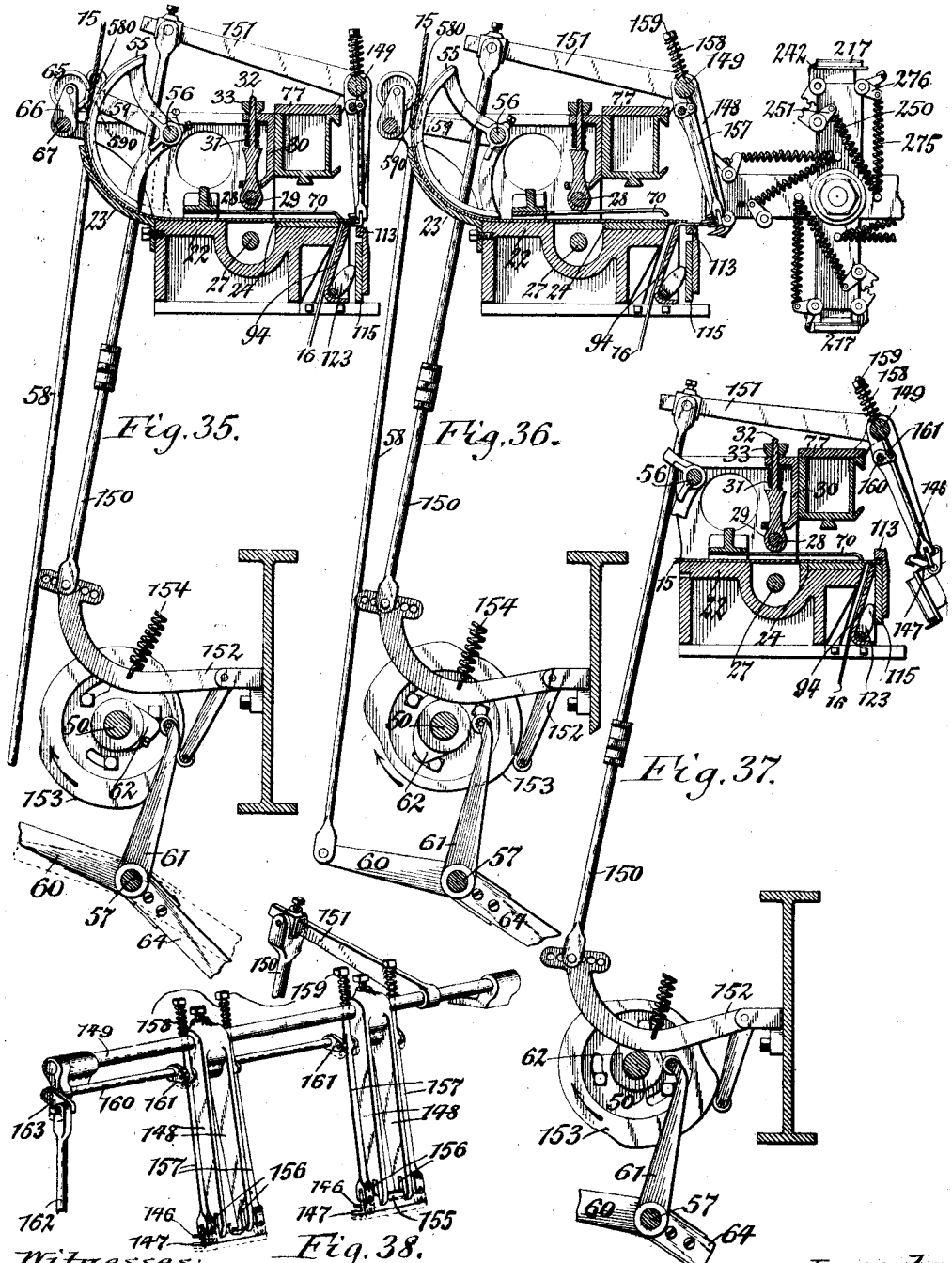

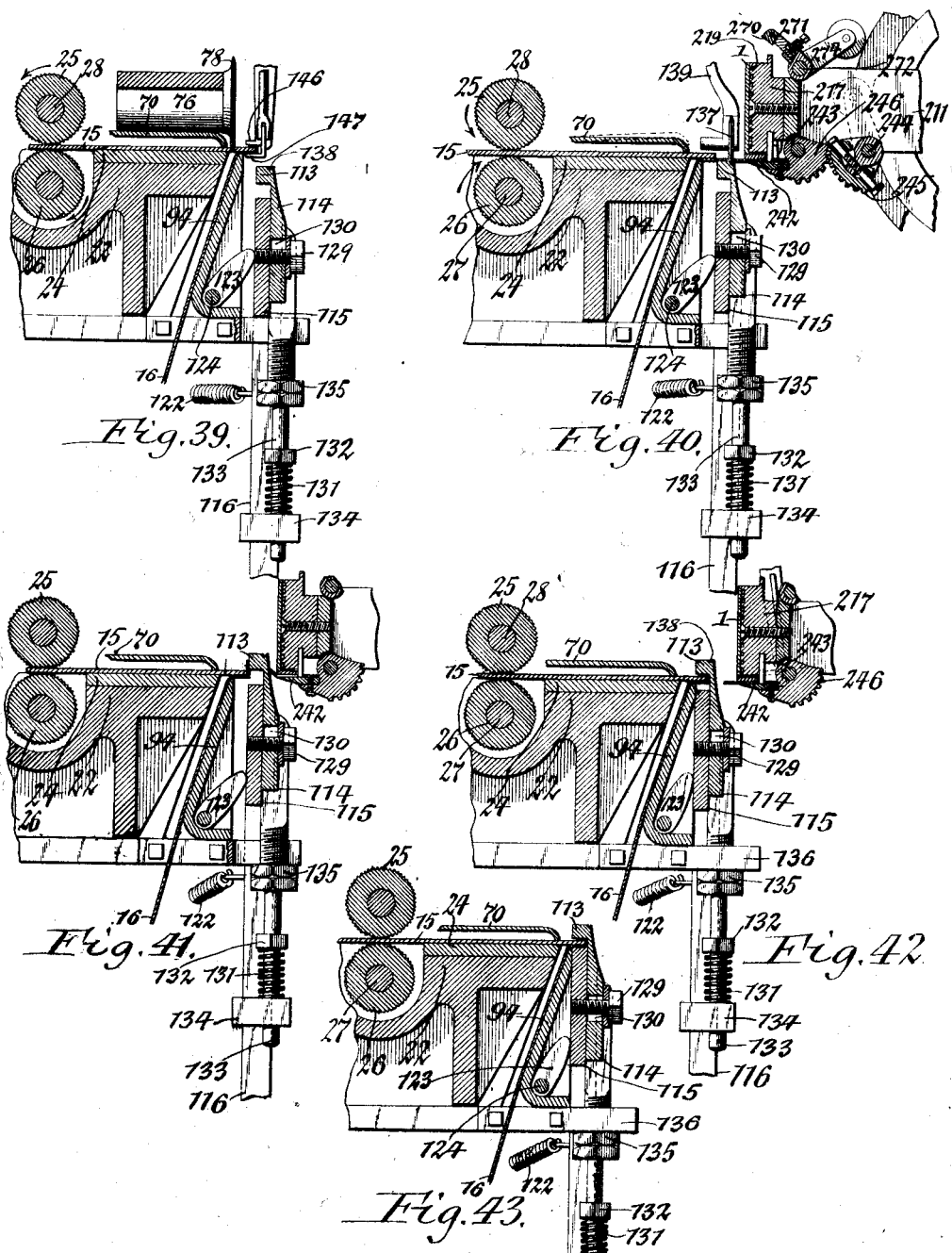

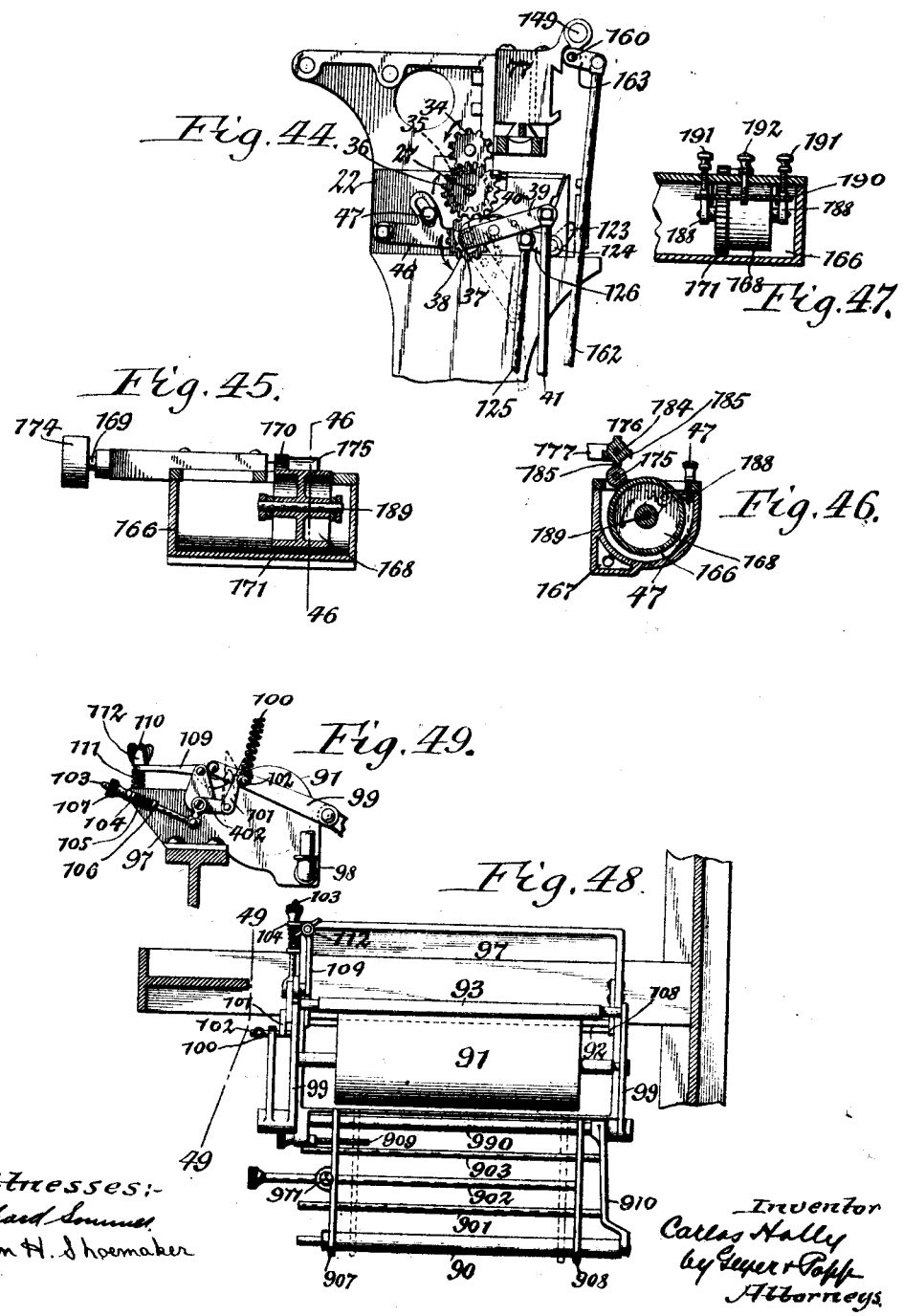

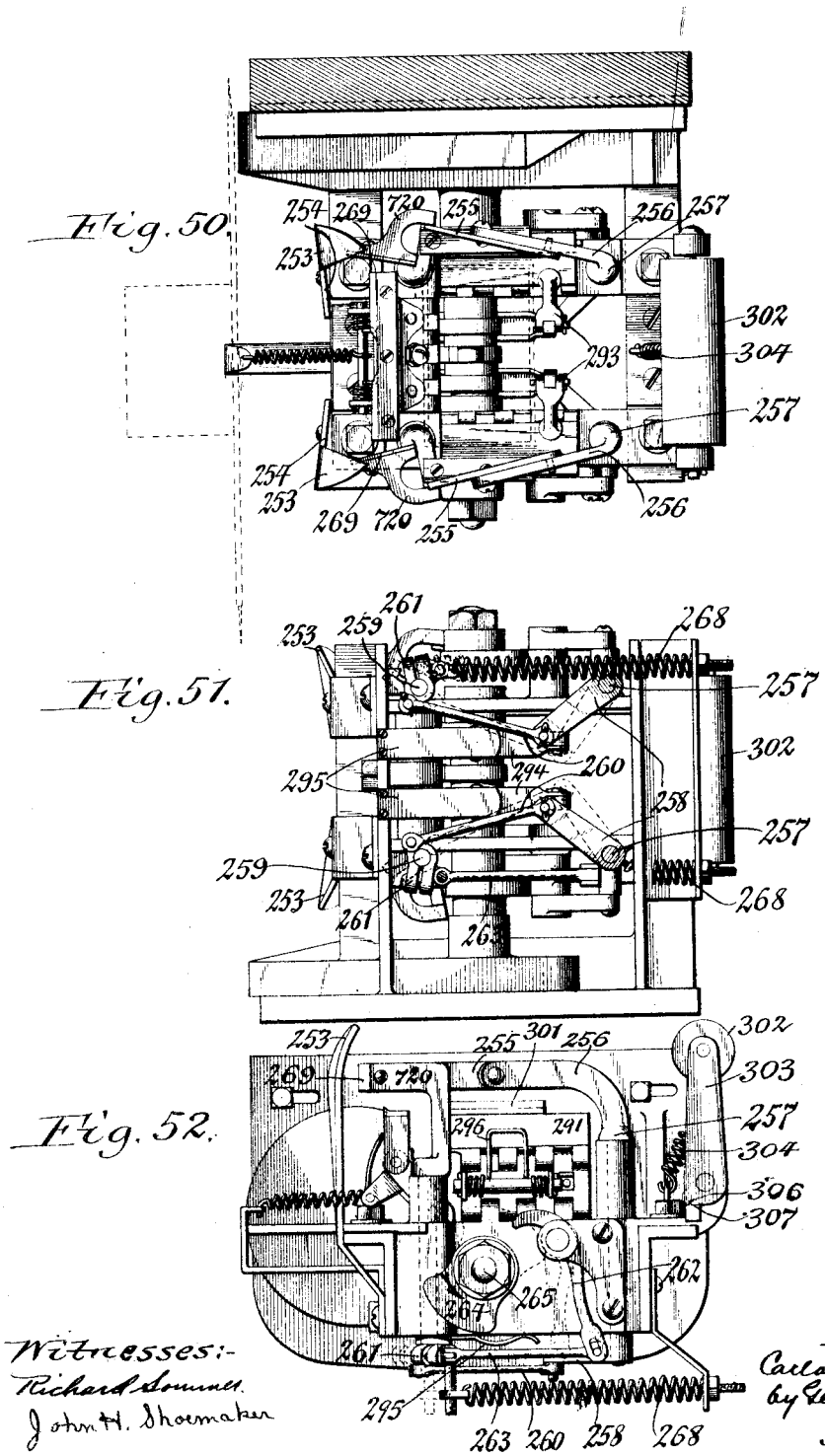

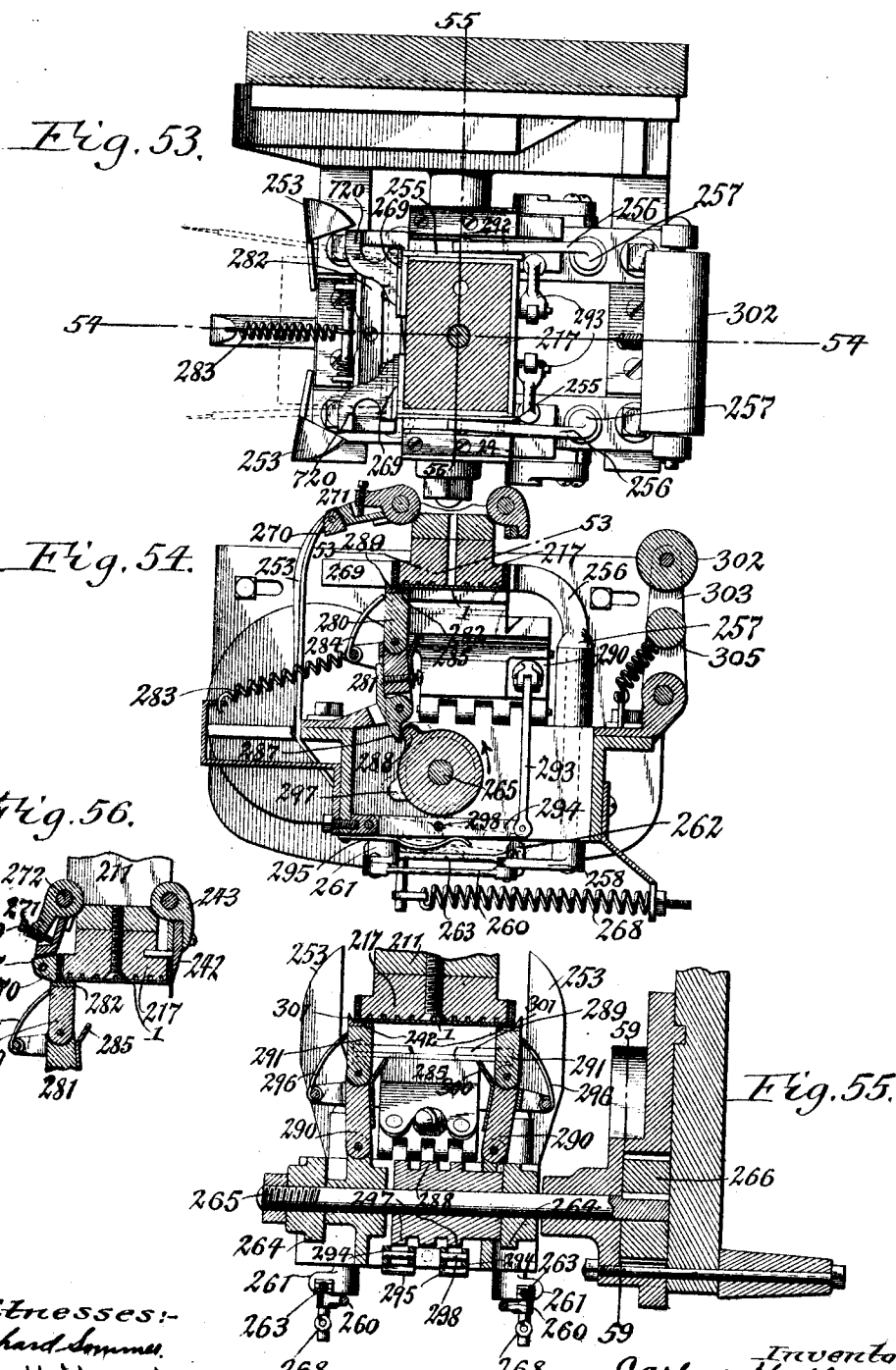

C. HOLLY.
MACHINE FOR MAKING BOXES.
APPLICATION FILED APR. 24, 1909.

1,158,211.

Patented Oct. 26, 1915.
26 SHEETS—SHEET 16.

Witnesses:
Richard Sommer.
John H. Shoemaker.

Inventor
Carlos Holly
by Geyer & Popp
Attorneys.

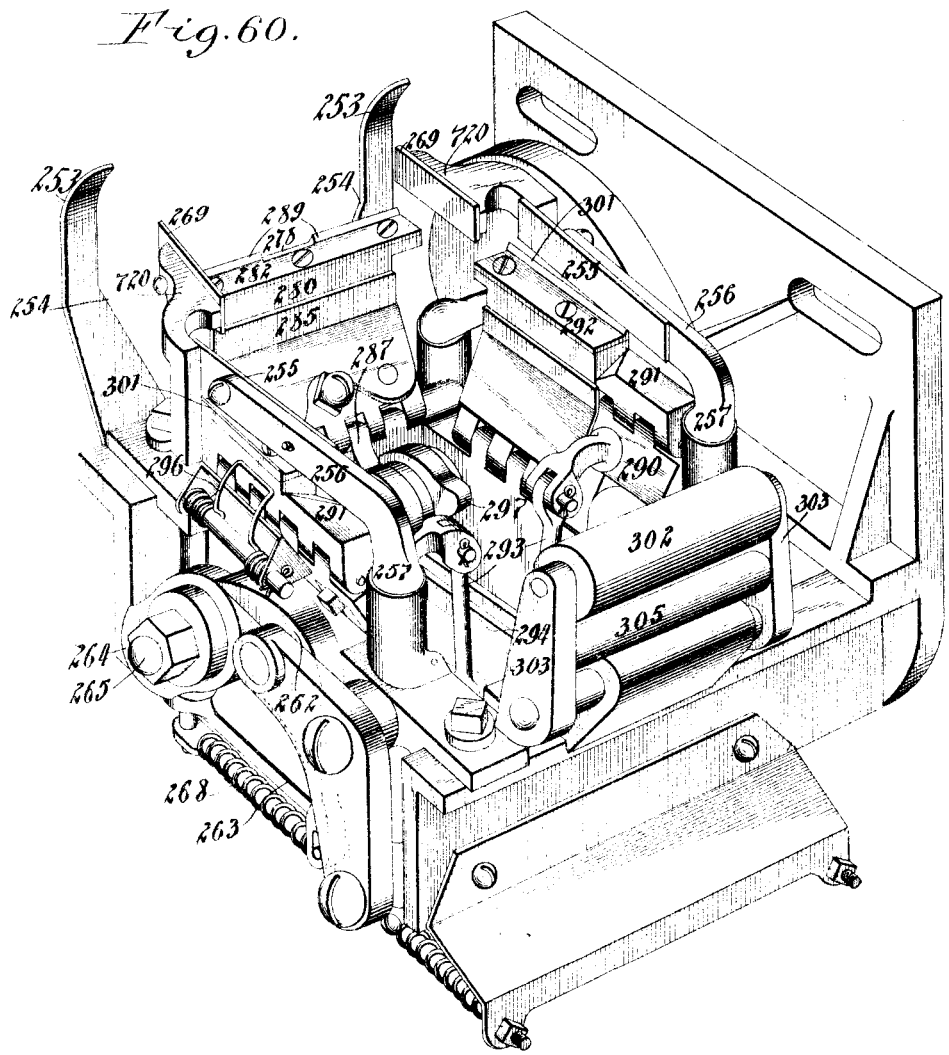

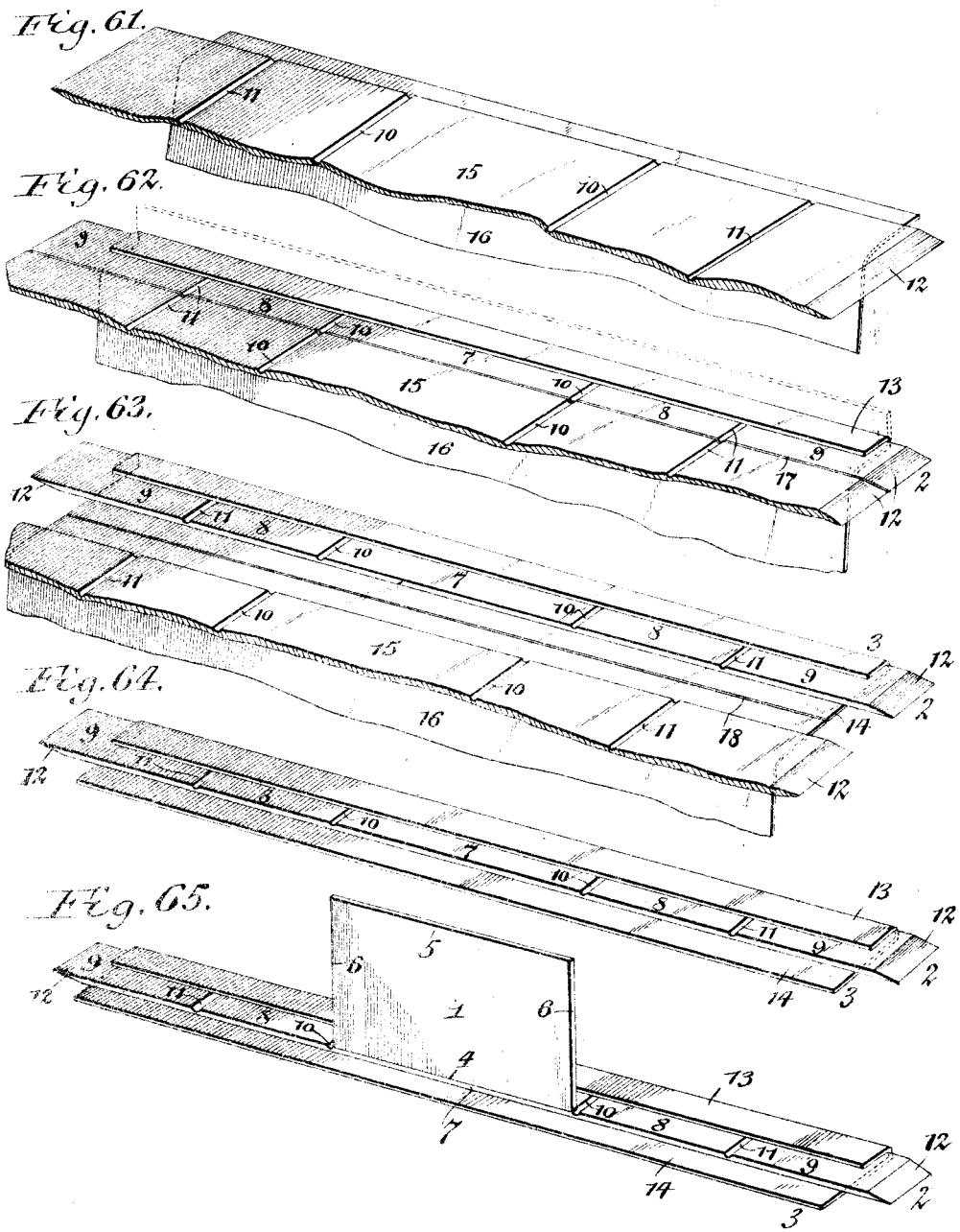

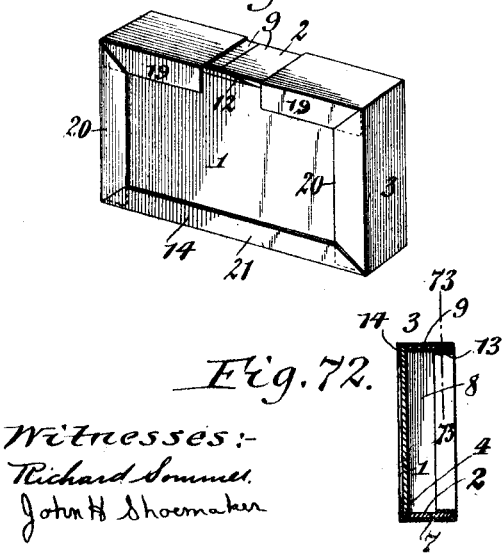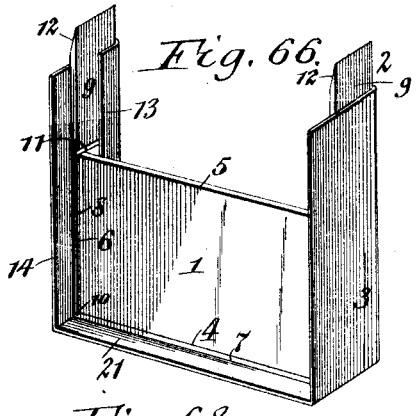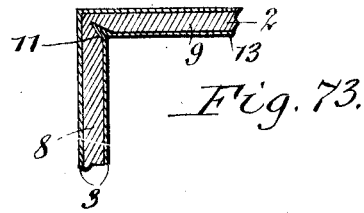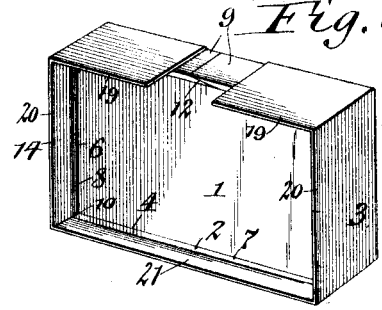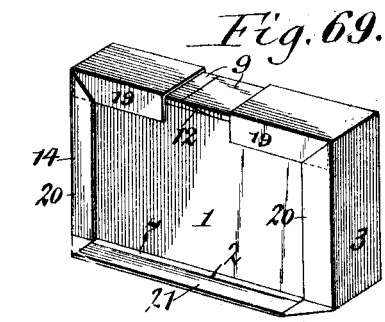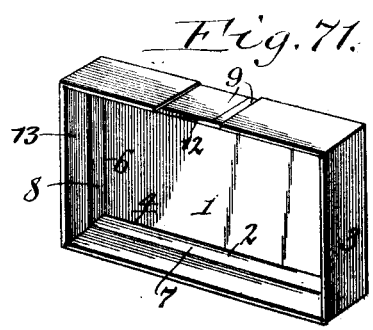

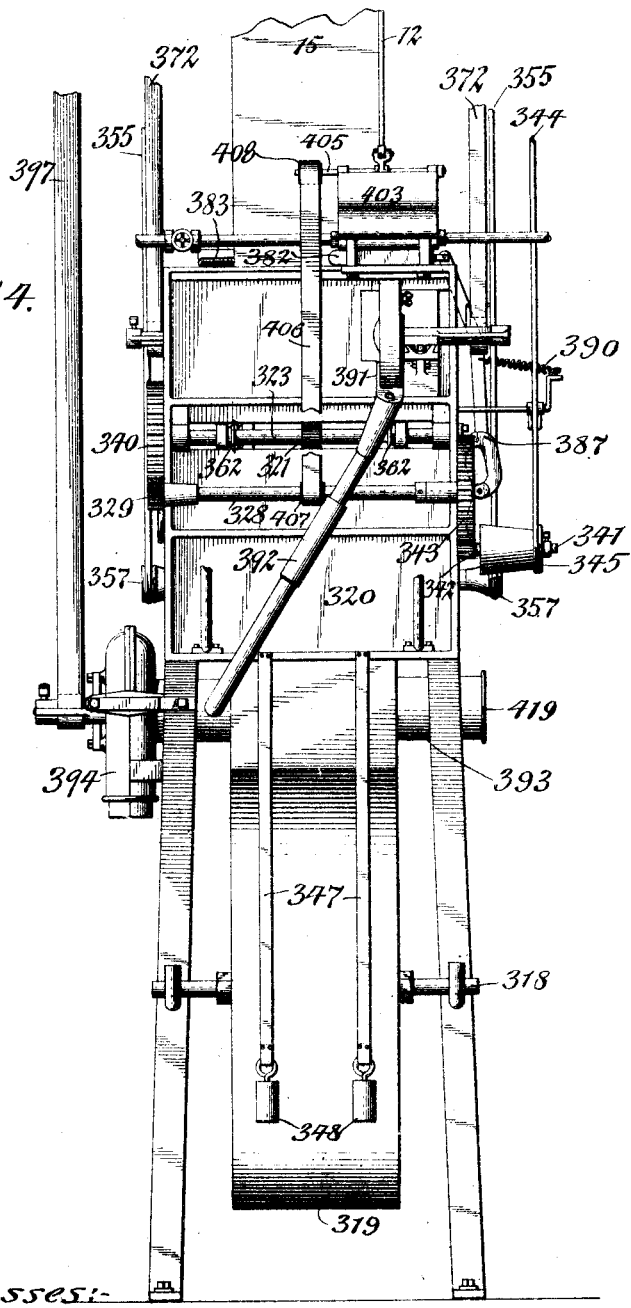

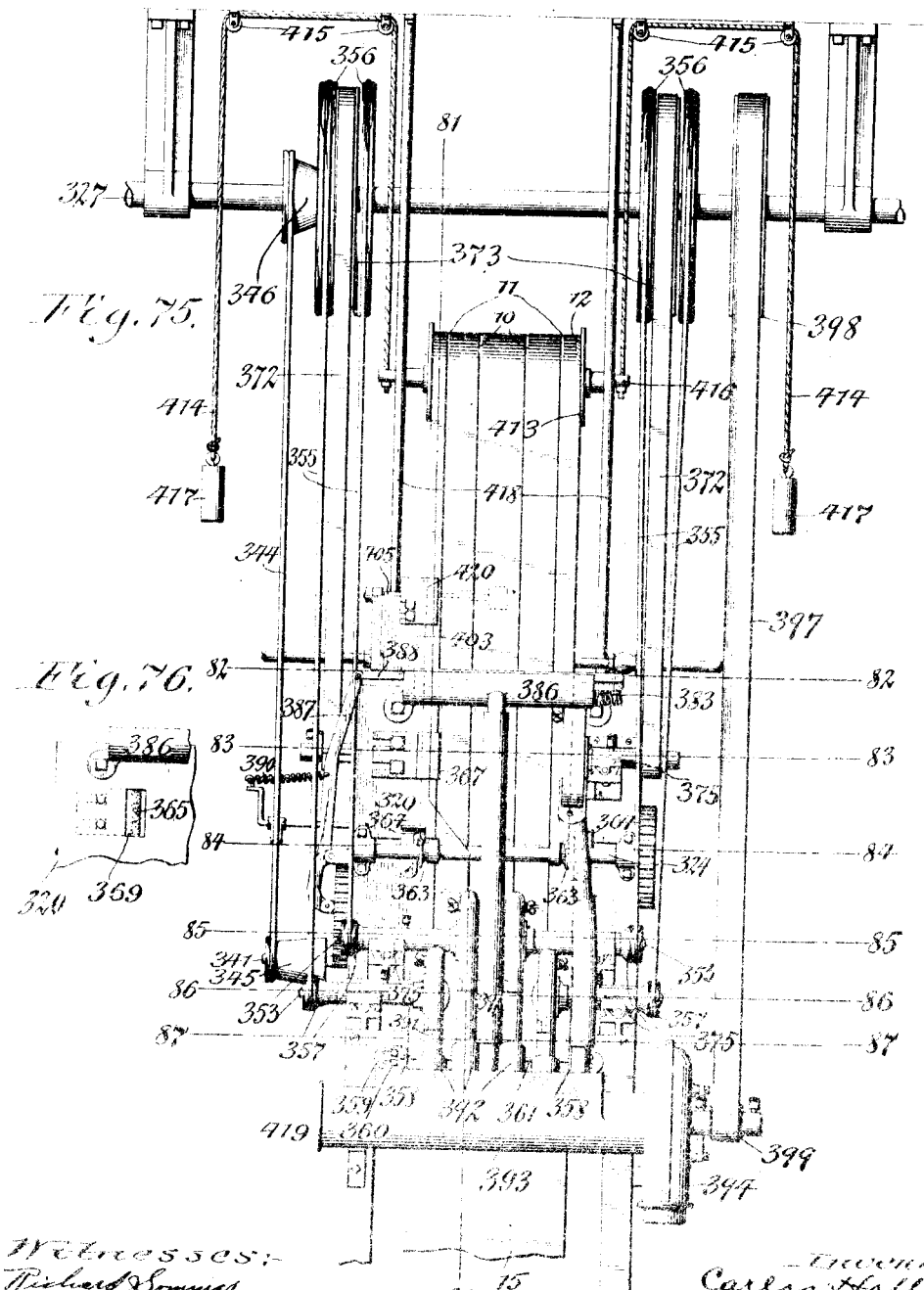

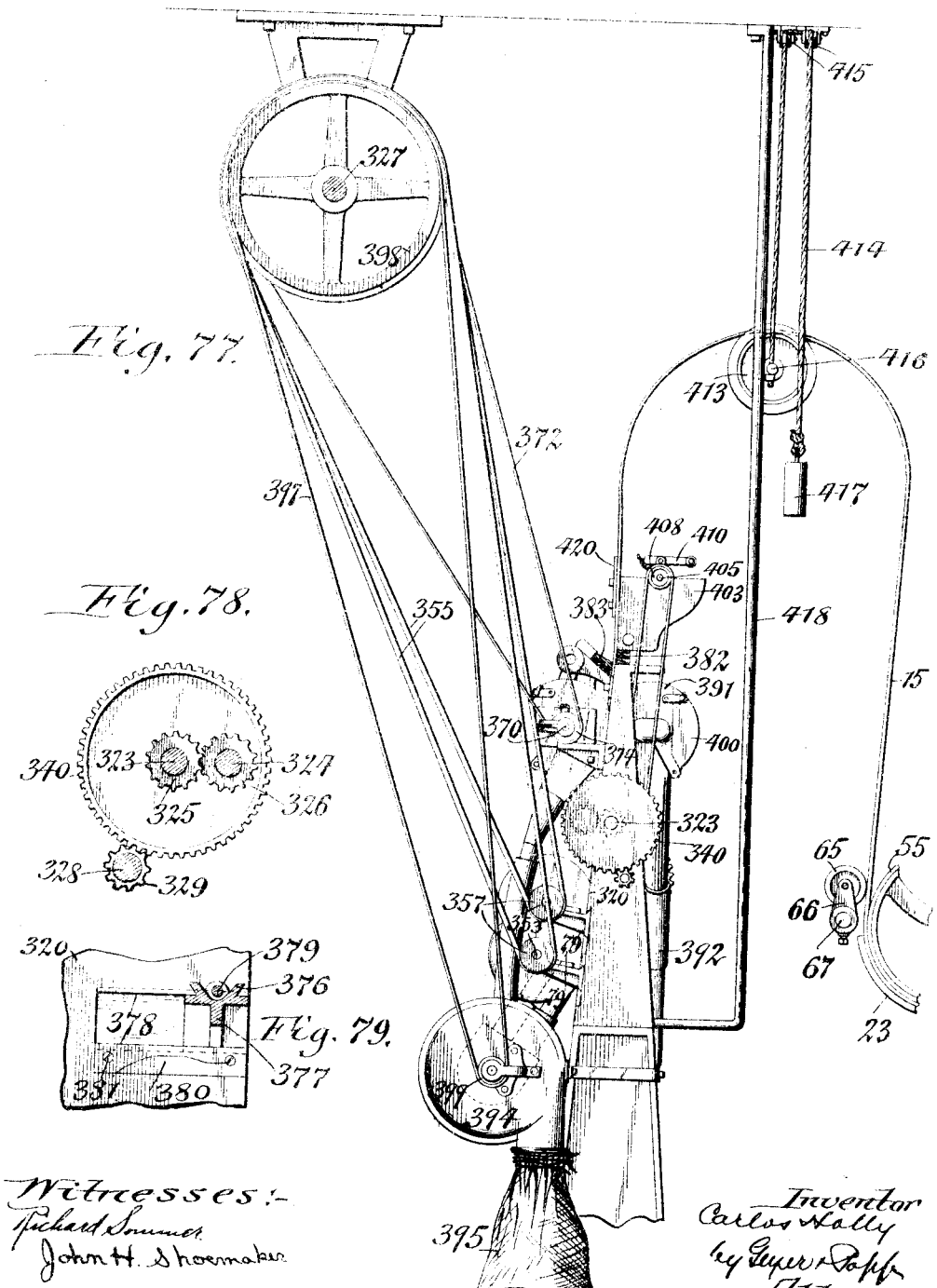

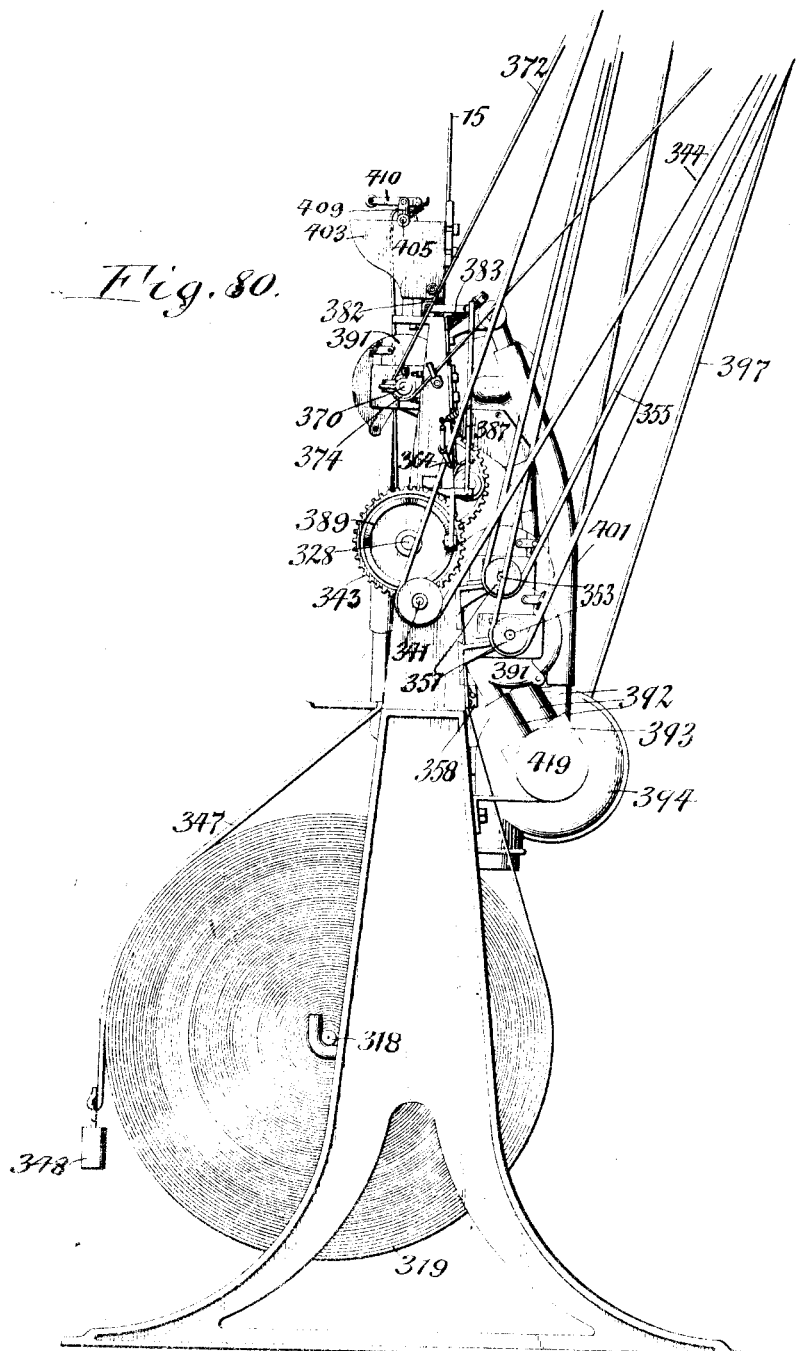

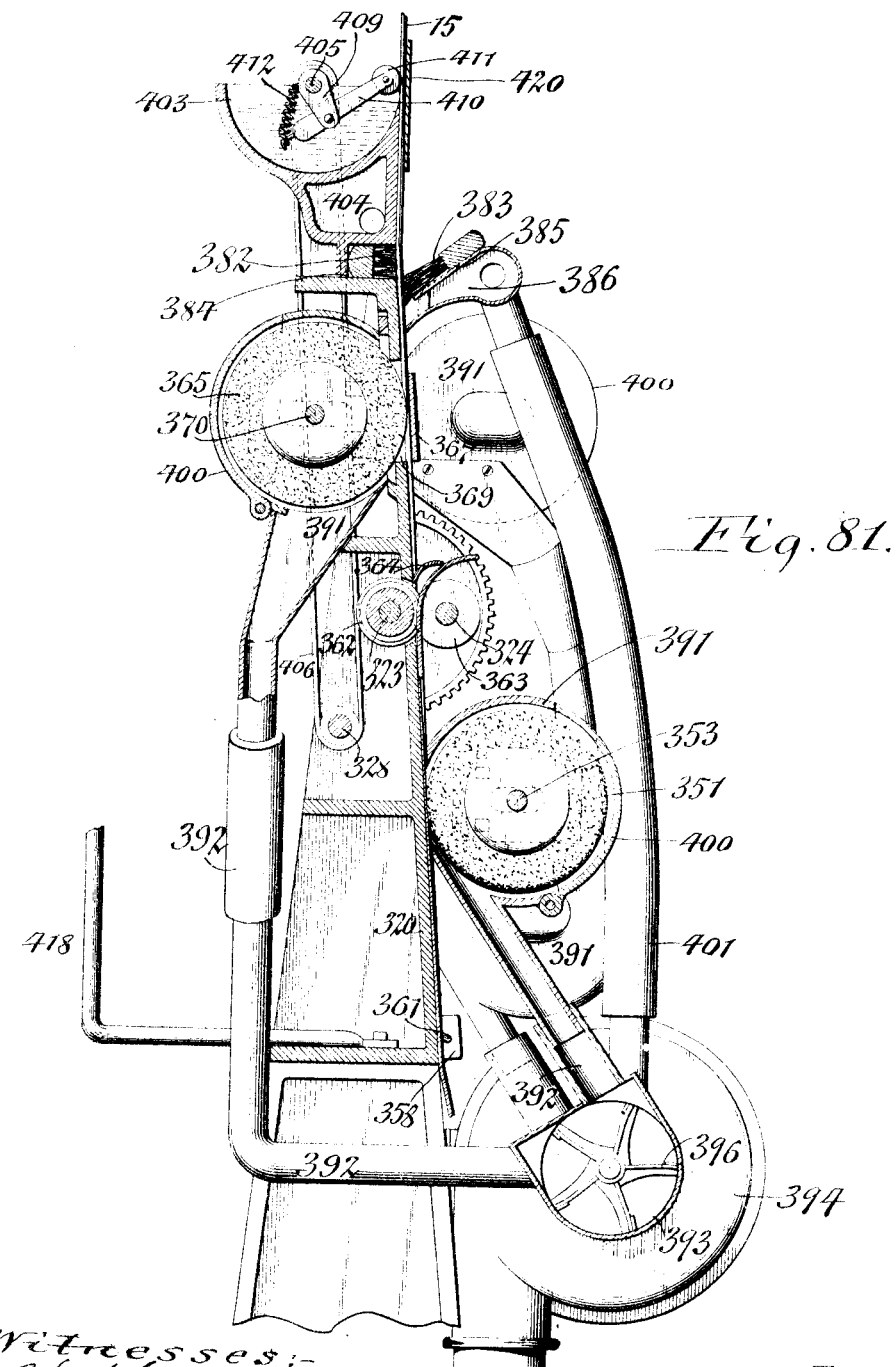

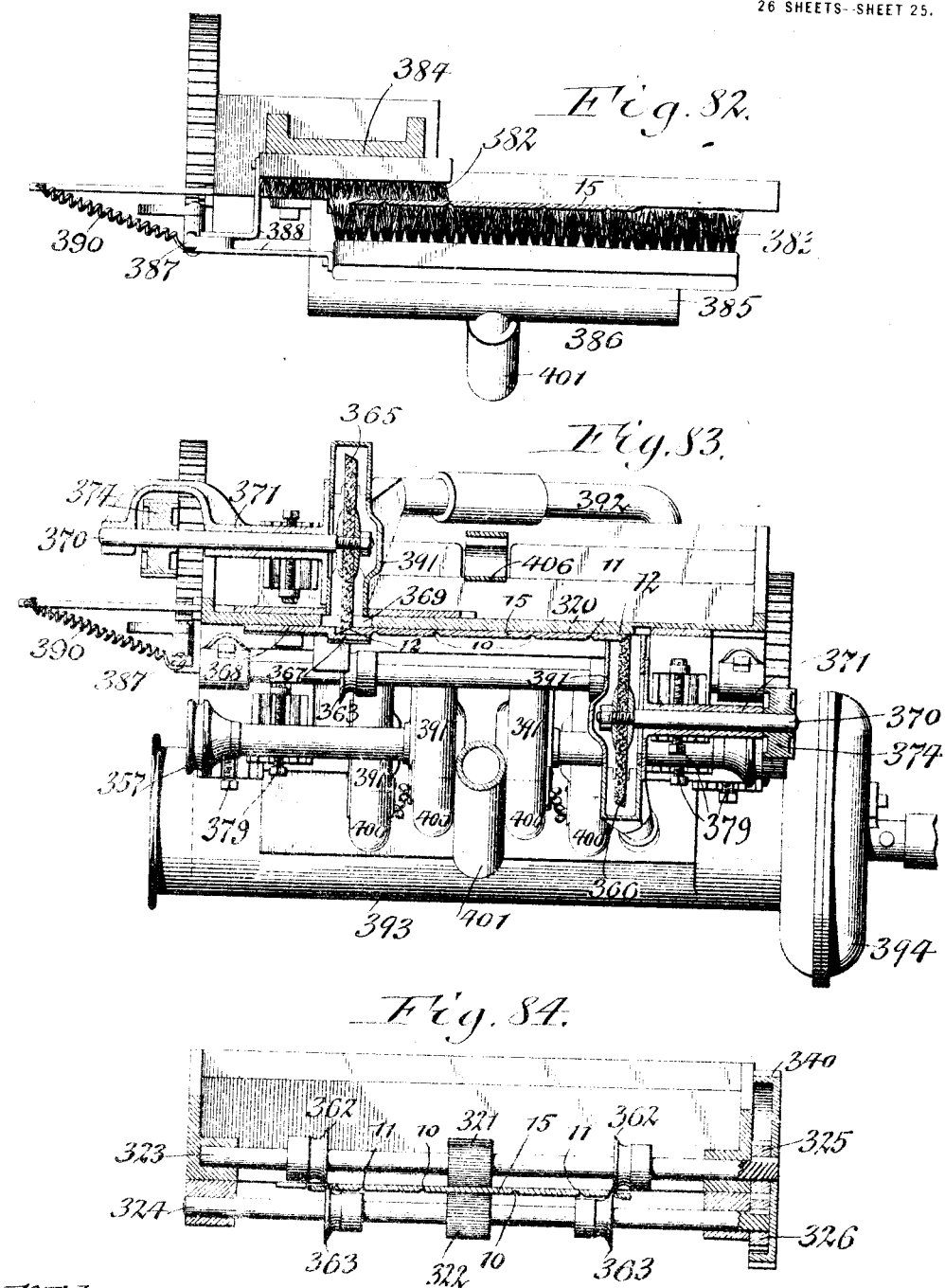

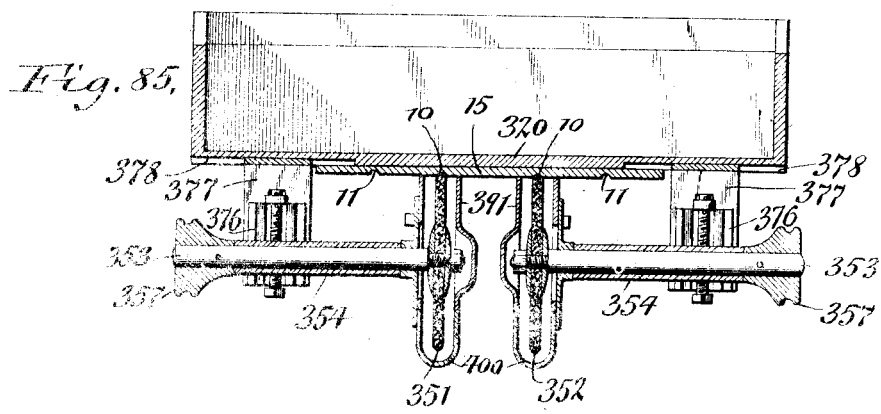
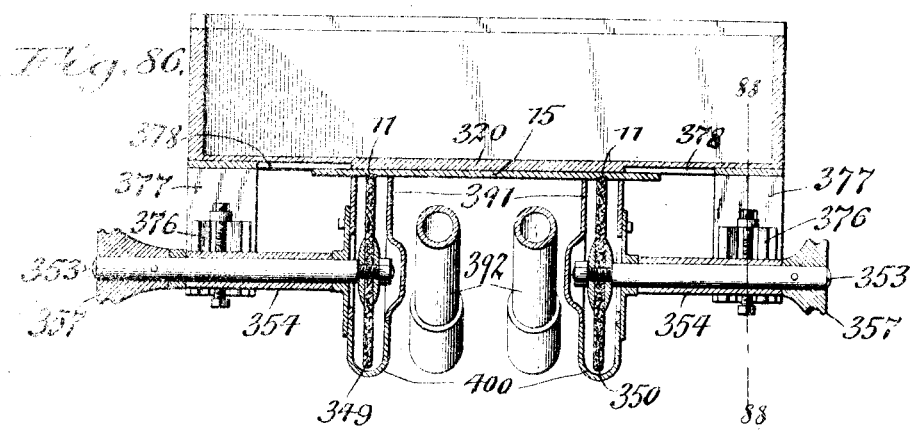
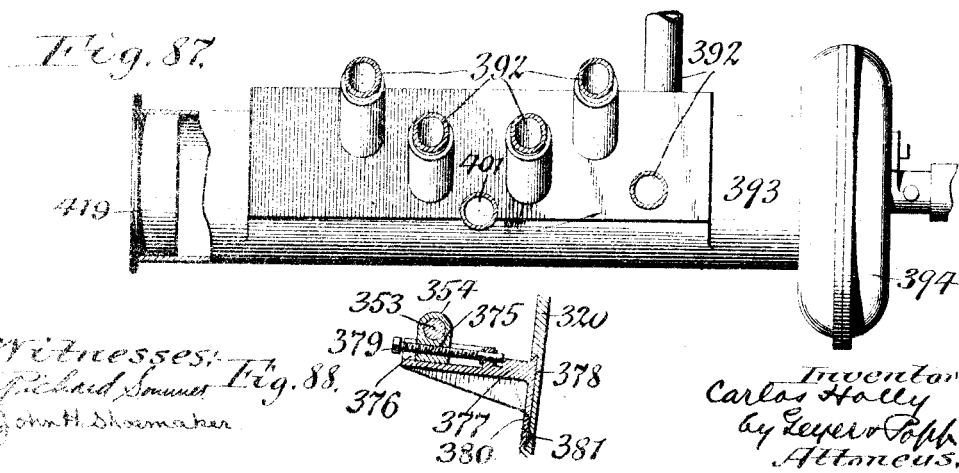

UNITED STATES PATENT OFFICE.

CARLOS HOLLY, OF LOCKPORT, NEW YORK, ASSIGNOR, BY MESNE ASSIGNMENTS, TO F. N. BURT COMPANY, LIMITED, OF TORONTO, ONTARIO, CANADA, A CORPORATION OF ONTARIO.

MACHINE FOR MAKING BOXES.

1,158,211.  Specification of Letters Patent.  Patented Oct. 26, 1915.

Application filed April 24, 1909. Serial No. 492,029.

*To all whom it may concern:*

Be it known that I, CARLOS HOLLY, a citizen of the United States, residing at Lockport, in the county of Niagara and State of New York, have invented a new and useful Improvement in Machines for Making Boxes, of which the following is a specification.

This invention relates to a machine for making boxes of paper or similar material in which the head and flange are connected by a binder which is adhesively connected with these parts.

The object of this invention is the production of a machine for making boxes of this character more expeditiously, at less cost and more perfectly than has been possible by the use of machines employed heretofore for this purpose.

Figure 28:
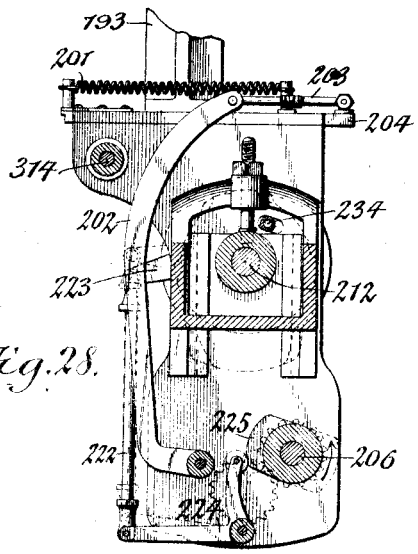
Figure 29:
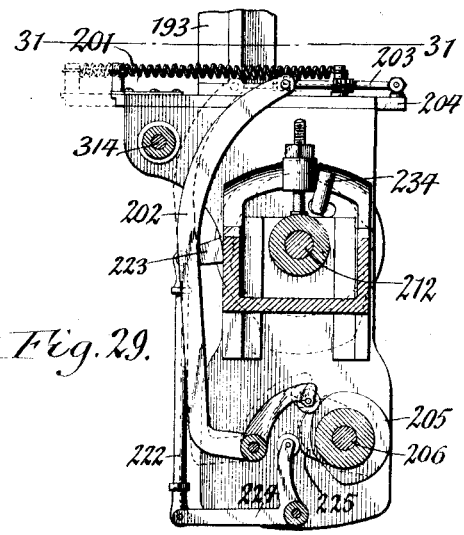
Figure 30:
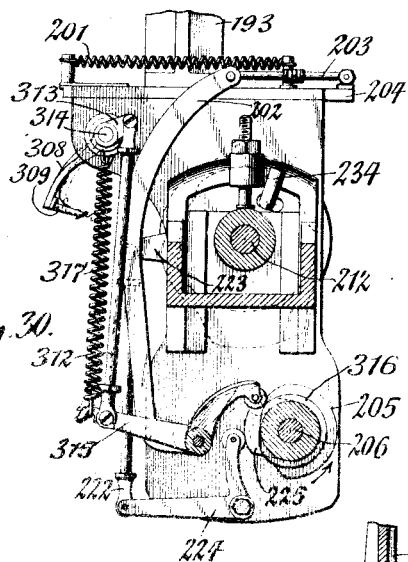
Figure 31:
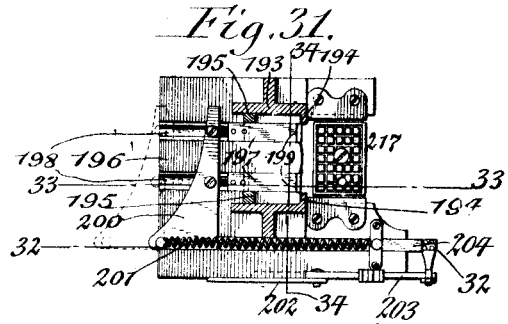
Figure 32:
Figure 34:
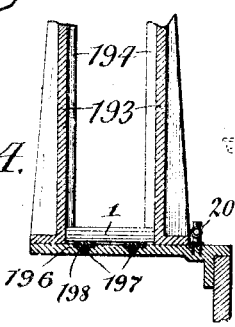
Figure 33:
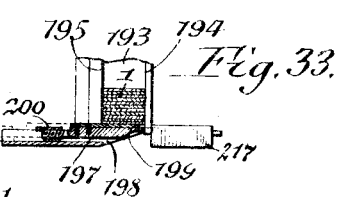
Figure 57:
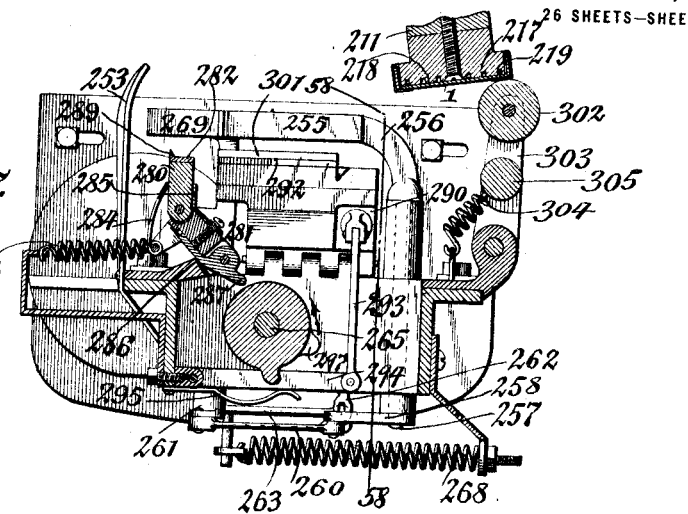
Figure 58:
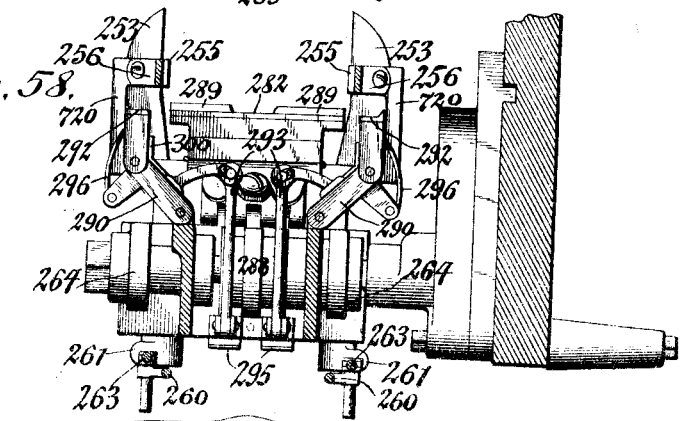
Figure 59:
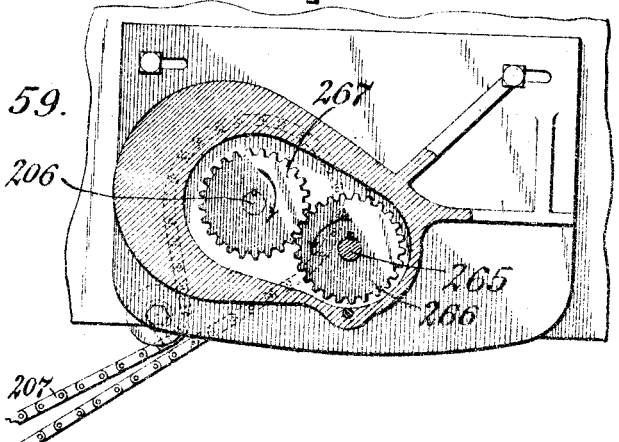

In the accompanying drawings consisting of 26 sheets: Figure 1 is a front elevation of the assembling part of my improved box-making machine. Fig. 2 is a side elevation thereof viewed from the left. Fig. 3 is a rear elevation thereof. Fig. 4 is a side elevation thereof viewed from the right. Fig. 5 is a detached elevation of the gearing whereby an intermittent rotary movement of the form-carrier is produced, and viewed from the side opposite to that shown in Fig. 4. Fig. 6 is a top plan view of the assembling part of the machine. Figs. 7 and 8 are fragmentary horizontal sections taken on lines 7—7. and 8—8, Fig. 11, respectively. Fig. 9 is a fragmentary vertical section taken in line 9—9, Fig. 3, showing the means for transmitting motion from the lower counter-shaft to the upper counter-shaft. Fig. 10 is a fragmentary vertical section, taken in line 10—10, Fig. 7. Fig. 11 is a fragmentary vertical longitudinal section, on an enlarged scale, taken in line 11—11, Fig. 1. Fig. 12 is a fragmentary vertical longitudinal section, on a still larger scale, showing the means for feeding and guiding the box-heads from the lower end of the magazine to one of the formers. Fig. 13 is a fragmentary vertical transverse section taken substantially on line 13—13, Fig. 11. Fig. 14 is a fragmentary vertical transverse section, on an enlarged scale, taken in line 14—14, Fig. 2. Fig. 15 is a fragmentary vertical transverse section taken in line 15—15, Fig. 11, looking forward, and showing the mechanism whereby intermittent rotary movement is produced for actuating the flange cutter and web cutter mechanisms. Fig. 16 is a horizontal section taken in line 16—16, Fig. 15. Figs. 17, 18 and 19 are sectional views showing different positions of the cam and adjacent parts of the mechanism whereby the binder turning and folding mechanism is operated. Fig. 20 is a detached sectional view of the cam and adjacent mechanism for moving the jaws or bars of the binder folding mechanism lengthwise of the machine. Fig. 21 is a similar view of the cam and adjacent mechanism for opening and closing the grippers whereby the assembled flange and binder are carried from the flange and binder cutter mechanisms forwardly to the position where they are transferred to the former and assembled with the head of the box. Fig. 22 is a similar view of the cam and adjacent parts for operating the feed mechanism of the flange-web. Fig. 23 is a vertical transverse section taken in line 23—23, Fig. 11. Fig. 24 is a fragmentary cross section taken in line 24—24, Fig. 26. Fig. 25 is a fragmentary vertical longitudinal section, on an enlarged scale, of the form-carrier and connected parts viewed from the right hand side. Fig. 26 is a fragmentary vertical longitudinal section, on an enlarged scale, showing the valve which controls communication between the pneumatic gripping faces of the formers and the exhaust device and the atmosphere and also the cams whereby the front and rear clamping jaws of the formers are controlled. Fig. 27 is a face view of one of the formers. Figs. 28, 29 and 30 are fragmentary vertical longitudinal sections taken substantially in line 28—30 in Fig. 23 and showing the mechanism for operating the head feeder, the former air valve, the front and rear form clamps and the box ejecting mechanism. Fig. 31 is a fragmentary horizontal section taken in line 31—31, Fig. 29. Figs. 32 and 33 are fragmentary vertical longitudinal sections taken in the correspondingly-numbered lines in Fig. 31. Fig. 34 is a fragmentary vertical transverse section taken in line 34—34 Fig. 31. Figs. 35, 36 and 37 are fragmentary vertical longitudinal sections, on an enlarged scale, showing principally in different positions the mechanism for transferring the assembled flanges and binders from the flange-web and cutting web mechanism to the formers. Fig. 38 is a perspective view of part of the gripper mechanism of the flange and binder transferring mechanism. Figs. 39, 40, 41, 42 and 43 are fragmentary vertical longitudinal sections, on an enlarged scale, showing principally in different positions the mechanism whereby the flange and binder webs are severed, and the mechanism for transferring the flanges and binders from the severing mechanisms to the former. Fig. 44 is a fragmentary side elevation, partly in section, showing the upper part of the mechanism for operating the flange-web feeding rollers, moving the binder folding bars or jaws forwardly and backwardly, and opening and closing the transferring grippers. Fig. 45 is a vertical longitudinal section of the means whereby glue is supplied for connecting the scarf joints of the box-flanges. Fig. 46 is a vertical transverse section taken in line 46—46, Fig. 45. Fig. 47 is a fragmentary vertical longitudinal section taken in line 47—47, Fig. 46, and showing the means for adjusting the glue supply roller of the flange gluing device. Fig. 48 is a fragmentary horizontal section taken substantially in line 48—48, Fig. 11, and showing the means for applying glue to the binder web. Fig. 49 is a fragmentary vertical longitudinal section taken in line 49—49, Fig. 48. Fig. 50 is a top plan view, partly in section and on an enlarged scale, showing the mechanism for folding the flange around the edge of the box-head and turning the edge of the binder against the underside of said head. Fig. 51 is a bottom plan view of this mechanism. Fig. 52 is a side elevation of this mechanism, viewed from the left-hand side. Fig. 53 is a view corresponding to Fig. 50 but showing the clamping and pressing jaws in their operative position in which the box-flange is folded around the box-head while these parts are supported on a former, the latter being shown in section on line 53—53, Fig. 54. Fig. 54 is a vertical longitudinal section in line 54—54, Fig. 53. Fig. 55 is a vertical transverse section in line 55—55, Fig. 53. Fig. 56 is a fragmentary vertical longitudinal section corresponding to Fig. 54 but showing the rear clamping jaw in engagement with the rear ends of the flange and pressing the same against the former. Fig. 57 is a vertical longitudinal section corresponding to Fig. 54, but showing the clamping and folding devices retracted and the former moved forward sufficiently to coöperate with the devices whereby the front edge portion of the binder is turned against the underside of the bottom of the head and the box is completed. Fig. 58 is a vertical transverse section taken in line 58—58, Fig. 57. Fig. 59 is a fragmentary vertical longitudinal section, taken in line 59—59, Fig. 55. Fig. 60 is a perspective view, on an enlarged scale, of the mechanism whereby the flange and binder are folded around the edge of the box-head and the attaching edge of the binder is turned against the underside of the box and connected therewith. Figs. 61, 62, 63, 64, 65, 66, 67, 68, 69, 70 and 71 are perspective views illustrating the several steps of the operation of the machine and the method of assembling and folding a head, flange and binder for producing a box. Fig. 72 is a transverse section of the completed box. Fig. 73 is a longitudinal section, on an enlarged scale, taken in line 73—73, Fig. 72, and showing principally the manner in which the corners of the flanges and the binder of the boxes are constructed. Fig. 74 is a front elevation of the rear part of the machine containing the mechanism for scoring, scarfing and trimming the flange-web and also gluing or sizing one of the scarfed edges thereof. Fig. 75 is a rear elevation of the same. Fig. 76 is a fragmentary rear elevation of the plate which supports the flange web and one of the scarfing wheels. Fig. 77 is a side elevation of the rear part of the machine viewed from the left hand side. Fig. 78 is a fragmentary vertical section, on an enlarged scale, showing part of the driving gearing for operating the cutters whereby the edges of the flange-web are trimmed. Fig. 79 is a fragmentary vertical transverse section, on an enlarged scale, in line 79—79, Fig. 77, showing one of the adjustable bearings. Fig. 80 is a side elevation of the rear part of the machine viewed from the right hand side thereof. Fig. 81 is a fragmentary vertical longitudinal section, on an enlarged scale, taken approximately in line 81—81, Fig. 75. Figs. 82, 83, 84, 85, 86 and 87 are horizontal sections taken approximately in the correspondingly numbered lines in Fig. 75. Fig. 88 is a fragmentary vertical longitudinal section taken in line 88—88, Fig. 86.

Similar characters of reference indicate corresponding parts throughout the several views.

The box which is produced by my improved method and machine consists essentially of a flat head or body 1, a marginal flange 2 extending around the edge of the head, and a binder 3 connecting the head and flange, as shown in Figs. 71 and 72, said binder also serving as a cover or finishing strip for the flange. These parts are preferably made of paper of suitable thickness as is usual in articles of this kind but if desired other materials may be used for this purpose.

The head is preferably rectangular, so that it has a front edge 4, a rear edge 5 and two side edges 6, 6. The flange consists of a strip having a central section 7, two intermediate sections 8, 8 arranged on opposite sides of its central section, and two end sections 9, 9 arranged at the extremities of the flange. On its inner face or side the flange is provided with transverse front scores or grooves 10, 10 between the central section and the intermediate sections, and with transverse rear scores or grooves 11, 11 between the intermediate sections, and the end sections, respectively, and the ends of the flange are scarfed, preferably being beveled, as shown at 12, 12, the scarf or bevel at one end being on the side opposite to that on the end of the other. The head of the box engages with its front edge against the central flange section, its side edges with the intermediate flange sections and its rear edge with the end flange sections, thereby forming the front, side and rear walls of the box. The length of the central, intermediate and combined end sections of the flange are the same as the length of the front, sides and rear edges of the head so that when these parts are assembled the front corners of the head are in line with or adjacent to the front scorings 10, 10 and the rear corners thereof are in line with or adjacent to the rear scorings 11, 11 of the flange. The scarfed portions of the end sections of the flange overlap one another and are united by paste, cement, glue or other kind of adhesive which will answer the purpose.

The binder consists of a strip which is applied lengthwise to the outer sides of the flange and turned at its upper edge 13 inwardly over the upper edge of the flange and against the inner side or face of the same while its lower edge 14 is turned inwardly against the outer or underside of the head, the binder being secured in this position to the flange and head by an adhesive of any suitable kind, such as glue, paste or cement. If desired, the binder may be of the same length as the flange but for certain kinds of boxes this is not necessary in which case the binder is of less length than the flange and terminates short of both ends of the same, so as to leave the scarf joint between the ends of the flange on the central part of the rear wall uncovered by the binder, as shown in Figs. 67—71. In its completed form the scorings or grooves of the flange are arranged or the inner sides of its corners and the sides of each groove or score are folded toward each other in bending the sections of the flange to form a corner, thereby causing the outerside of the corner to be sharp and square. In bending the sections of the flange to form the corners those portions of the folded upper edge of the binder on the inner side of the flange opposite the corners are deflected into grooves or scores when bending the flange and binder around the head, thereby forming square, sharp or finished corners on the inner sides of the box, as shown in Figs. 71 and 73.

The method of making and assembling the parts of the box just described is as follows:—The flanges are cut successively and transversely from the front end of a continuous body web or band 15 of material which is of a width equal to the length of a flange. Preparatory to thus cutting a flange from the front end of the flange web, the latter is provided on one side preferably the upper, with the scorings 10, 11 and the end scarfings 12 which extend lengthwise of the supply web but are arranged transversely relatively to the length of the flange after the same has been severed in the form of a strip from the flange web. The binder is also cut in the form of strips successively from the front end of a cover, or binder web or band 16 of this material which is of a width equal to the length of the separate binder strips. This web is coated on its inner or upper side with glue or other adhesive and engaged near its front end with the front part of the under or unscored side of the flange web and in a position parallel therewith and with the front end of the binder web projecting forwardly beyond the front end of the flange web, as shown in Fig. 61. After the binder web has been thus assembled with and pasted to the outer or underside of the flange web, the projecting front end of the binder web is folded or turned upwardly, backwardly and downwardly with its glue coated surface against the inner side of the flange web, whereby these parts are adhesively secured together in this folded condition of the binder web, as shown in Fig. 62. By means of a suitable cutter, the foremost portion of the flange web is now severed transversely at a distance in rear of the overlapping inner portion of the binder web, the severing line or cut being indicated at 17, Fig. 62, thereby forming one of the flange strips or flanges of the box and detaching the same from the web or stock from which successive flanges are cut in like manner. After a flange has been thus cut transversely from the front end of the flange web, the same is advanced together with the binder web attached thereto so as to form an intervening space or gap between the rear edge of the severed flange and the front edge of the flange web, which space or gap is bridged by that part of the binder web trailing behind the advancing flange, as shown in Fig. 63. During this forward movement of the flange and the binder web the flange web is also moved forwardly but less than the flange and binder web, so that the binder web remains with its glued surface in contact with the under or outer side of the front edge portion of the flange web, whereby the binder web is dragged with its glue coated surface past this portion of the flange web and this glue coated surface which is on the upper or inner side of the binder web is exposed between the severed flange and the front end of the flange web. After the flange and the flange web have been thus separated, that part of the binder web which bridges the space or gap between the flange and flange web is severed transversely about midway between the flange and flange web, as shown at 18 in Fig. 63. When the binder web is thus severed, a strip shaped binder is completed for use to serve as an element of a box which is to be formed and which projects with its rear edge beyond the rear edge of its companion flange. It will, of course, be evident that the point at which the binder web is to be cut so as to dispose the rear edge of the binder blank in predetermined relation to the rear edge of the flange blank, is taken into consideration in constructing the machine, being dependent more or less on the position the folded blank is to occupy in the completed article. The portion of the binder web in rear of the severing line projects forwardly beyond the front edge of the flange web, leaving these parts associated in a position corresponding to that indicated in Fig. 61, ready for turning the front edge of the binder web over the front edge of the flange web, preparatory to severing the next following flange and binder from their respective webs. There is thus produced from the plurality of webs a composite blank composed of a section of one web, the binder web, disposed on the opposite faces of a section of another web, the flange web, and across one edge of the section of the flange web, the sections being adhesively attached. These sections or blanks of the binder web and the flange web will be of different lengths, respectively, in that dimension corresponding to the length of the web from which they were produced. After the flange and binder have been thus severed from their respective webs, they are carried away while in a straight condition lengthwise, as shown in Fig. 64, to the devices which operate to assemble the flange and binder with the head of the box. This head while in a vertical position, or at right angles to the flange and binder, is placed with its front or lower edge against the inner side of the central section of the flange adjacent to its lower edge, as shown in Fig. 65. Then the intermediate sections of the flange together with the respective parts of the binder are folded inwardly against the opposite side edges of the head, as shown in Fig. 66. Next the end sections of the flange together with the respective parts of the binder are folded inwardly against the rear edge of the head thereby forming a rectangular tube element, and at the same time the scarfed parts of the flange, which have been previously coated with glue are lapped one over the other, so as to unite these end sections, as shown in Fig. 67. The rear end portions 19 of the glue coated lower edge of the binder are now folded inwardly and pasted against the under or outer side of the head, as shown in Fig. 68, then the side portions 20, 20 of this edge of the binder are in like manner turned inwardly and pasted against the under or outer side of the head, as shown in Fig. 69, and finally the front part 21 of this edge of the binder is also turned inwardly and pasted against the underside of the head, as shown in Fig. 70, thereby completing the box.

In folding the flange around the edges of the head, the opposite sides of each of the scorings are brought together and those portions of the inwardly turned upper edge portions of the binder opposite the scoring fold into the latter, as shown in Figs. 71 and 73, thereby forming sharp or square corners on the box, both on the outer and inner sides of the same, instead of round corners, as would be the case if these inner scorings were omitted. A box made in accordance with this method is stronger, neater in appearance and more perfect in construction than boxes made by the methods heretofore known and such boxes can also be produced more expeditiously and at less cost.

The machine which is shown in the drawings and whereby the above mentioned operations for making the boxes are performed, will now be described, that portion which supplies or feeds the body or flange web being constructed and operating as follows:—22, Figs. 6, 11, 35–37, 39–43, represents a horizontal cross piece which is arranged transversely in the upper rear part of the machine and forms part of the stationary main frame and which serves as a feed table for the flange web feeding mechanism. The flange web 15 which has been previously provided with the scores, 10, 11 and scarfs 12 in another machine provided for this purpose, passes downwardly along the concave side of a curved guide plate 23 arranged at the rear end of the feed table and thence horizontally forward over this table and over a cutter blade or plate 24 which is arranged upon the front edge of said table.

25, 26 represent upper and lower feed wheels or rollers which are arranged on opposite sides of the path of the flange web in a position about centrally between the front and rear edges of the feed table and have their peripheries knurled or roughened so that these surfaces of the feed wheels, which engage with the under and upper sides of the horizontally moving portion of the flange web midway of its width, obtain a firm grip upon the same and operate to feed it reliably forward when the feed wheels or rollers are turned forwardly or in the direction of the arrow in Fig. 11.

The lower feed roller 26 is arranged in a cavity formed in the upper side of the feed table 22 and is mounted on a transverse shaft 27 which is journaled in stationary bearings on the adjacent part of the frame. The upper feed roller 25 is mounted on a transverse shaft 28 which is journaled loosely at one end in a bearing on the frame so as to be capable of a slight vertical oscillation to permit the upper feed roller to adapt itself to slight variations in the thickness of the paper or other stock of which the flange web is made. The upper feed roller is yieldingly held downwardly in engagement with the upper side of the flange web so as to firmly grip the latter between the feed rollers and insure reliable feeding of the same. The preferred means for this purpose, as shown in Figs. 11, 35–37, comprise a vertically movable bearing 29 in which the free end of the upper feed roller shaft is journaled, a bracket 30 secured to the adjacent part of the main frame and provided on its lower part with a guide which controls the vertical movement of the bearing 29, and a spring 31 surrounding an upwardly projecting rod 32 on this bearing and engaging at its lower end against a shoulder on this rod and at its upper end against the bracket 30 in which the upper end of the rod 32 is guided. For the purpose of raising the upper roller a sufficient distance above the lower roller to permit of easily pushing the flange web between the same when getting the machine ready, a lifting device is provided which preferably consists of a screw nut 33 applied to the upper threaded end of the rod and adapted to bear against the upper side of the bracket 30. Upon turning the screw nut 33 in one direction the upper roller 25 is raised to clear the space between the same and the lower roller and permit the flange web to be freely inserted between these rollers and after the flange web has been thus inserted the screw nut is loosened to permit the spring 31 to press the upper roller against the web and cause the latter to be gripped between the upper and lower feed rollers.

The two feed rollers are compelled to turn in unison by means of intermeshing like gear wheels 34, 35 secured respectively to their shafts, as shown in Fig. 44, and an intermittent rotary forward movement is imparted to these wheels or rollers so that they feed the flange web forwardly step by step by a mechanism which is best shown in Figs. 2, 6, 11, 13, and 44 and which consists essentially of a gear wheel 36 secured to the shaft of the lower feed wheel 26, a pinion 37 meshing with the gear wheel 36 and provided with a ratchet wheel 38, a ratchet lever 39 pivoted concentrically with the pinion and ratchet wheel and provided with a spring pressed pawl 40 engaging with the ratchet wheel, an upright shifting rod 41 connected at its upper end with the ratchet lever 39, a transverse rock lever 42 pivoted on the lower front part of the frame and connected with the lower part of the shifting rod 41, a rotatable cam 43 engaging with its upper sides against a roller 44 on the rock lever 42 and operating to turn the ratchet lever 39 so as to turn the flange web feed rollers forwardly, and a horizontal longitudinal shaft 45 journaled in the lower part of the frame and carrying said cam 43. The idle return movement of the ratchet lever 39 is effected by gravity but may be aided by a spring, if desired.

To permit of varying the extent of the forward movement of the flange web at each step to suit the width of flange desired on the boxes, the pinion 37 may be changed for one of larger or smaller size. For this purpose this pinion is mounted on an adjustable support 46 having preferably the form of an arm pivoted to swing vertically on the frame and held adjustably in place by a screw 47 on the frame passing through a segmental slot in the adjustable arm, as shown in Fig. 44.

48 represents the main driving shaft of the machine which is journaled horizontally and transversely in bearings on the lower central part of the main frame and which may be driven by a driving belt passing around a pulley 49 at the outer end of this shaft or any other suitable means. Motion is transmitted from this driving shaft to the longitudinal shaft 45 previously referred to by means of a counter-shaft 50 journaled horizontally and transversely in the lower part of the machine below the main driving shaft and operatively connected with the latter by means of a pinion 51 on the main shaft meshing with a gear wheel 52 on the countershaft and also operatively connected with the longitudinal shaft 45 by means of intermeshing beveled gear wheels 53, 54 secured respectively to the countershaft and longitudinal shaft, as shown in Figs. 3, and 11. While the flange-web is being fed forward to the mechanism where flange strips are cut off from the front end of the same and assembled with the binder and head of a box, the flange-web is guided so as to hold it in place against lateral movement and insure its proper presentation to the mechanism which subsequently operates upon the same. This guiding mechanism is constructed as follows:

55 represents a plurality of segmental guiding blades or fingers which are arranged in front of the curved guide-plate 23 and each of which engages with its convex face in a longitudinal score or groove of the flange-web, as shown in Figs. 6, 8, 11 and 36. The several guiding blades or fingers are mounted on a horizontal rock shaft 56 journaled transversely in bearings on the adjacent part of the main frame, which shaft is rocked by means of a horizontal rock shaft 57 journaled horizontally and transversely on the lower part of the frame, an upright connecting rod 58 is connected at its upper end with a rock arm 59 projecting rearwardly from one end of the upper rock shaft 56 and at its lower end with a rock arm 60 projecting rearwardly from the lower rock shaft 57, an upright rock arm 61 secured to said lower rock shaft and engaging with a rotatable cam 62 on the countershaft, as shown in Figs. 3 and 11, and a spring 63 which connects a forwardly-projecting arm 64 on the lower rock shaft with part of the stationary frame, as shown in Fig. 2. A slack or loose joint is provided somewhere in the mechanism, whereby the movement of the cam 62 is transmitted to the guide blades 55, this being preferably effected by means of a slot 580 in the upper end of the rod 58 and receiving a pin 590 on the respective upper rock arm 59. During each rotation of the cam 62 the high part of the same upon engaging the upper right rock arm 61 causes the guiding blades or fingers to be turned backwardly by engagement of the lower end of the slot 580 with the pin 590. When the low part of this cam is presented to the rock arm 61, the spring 63 actuates the intermediate connecting mechanism, so as to move the rod 58 and disengage the lower end of its slot 580 from the pin 590 and leave the guide blades in their rearward position free to be moved forward by the pull of the flange web as the latter is subsequently fed forward by the rollers 25, 26. The means for actuating these blades or fingers are so timed that the same are moved backwardly while the feed rollers 25, 26 are at rest and by their grip upon the flange-web hold the same against backward movement, thereby permitting the feeding blades to slide backwardly in the scores or grooves of the flange-web independently of the latter, but during the forward or feeding movement of the feed rollers, the guiding blades turn forwardly in unison with the same by the pull of the flange web, thereby eliminating the friction on the flange web and the undue strain on the latter, which otherwise would be the case if the blades were stationary and the feeding rollers were obliged to pull the flange-web around the convex edges of the several blades.

In order to hold the flange-web with its scores or grooves reliably in engagement with the convex edges of the blades or fingers 55, pressing means are provided which preferably consist of a plurality of vertical rollers 65 which are arranged above the upper edge of the curved guide-plate 23 and each of which engages with the rear or unscored side of the flange-web in line with one of the scores therein and an opposing guiding and feeding blade and is yieldably held in its operative position by means of a vertically-swinging upright arm 66 carrying the presser roller at its upper end and turning loosely at its lower end on a horizontal transverse rod 67 secured to the main frame, and a coiled spring 68 surrounding said rod and connected at its opposite ends with said supporting arm and a supporting collar 69 adjustably secured to the rod.

After the flange-web issues from the front side of the feed rollers 25, 26 the same is presented to the mechanism whereby successive flange strips are cut off from the front end of the same and assembled with the binders and heads for forming the boxes. In order to reliably hold the front portion of the flange-web against displacement while the front edge thereof is being cut off and other operations are being performed, a clamping device is provided which holds the flange-web in place immediately in rear of the cutting line and in front of the feeding rollers 25, 26. This clamping or holding device, as best shown in Figs. 3, 7, 10, 11, 35, 36 and 39-43, is preferably constructed as follows:

70 represents a pair of clamping jaws which are arranged lengthwise above the feed table and lower cutter blade on opposite sides of the flange-web feeding rollers 25, 26 and which are preferably constructed from a single piece of spring steel or other metal and have their front operative ends turned downwardly to form gripping edges or flanges. At their rear ends these jaws are connected with a vertically-rocking bar 71 which is journaled transversely on the adjacent stationary part of the machine and oscillated by means of an upright connecting rod 72 connected at its upper end with an upper rock arm 73 projecting rearwardly from the rocking bar 71 and at its lower end with a lower rock arm 74 projecting rearwardly from the lower part of the frame, and a rotatable cam 75 mounted on the countershaft and engaging with the lower rock-arm 74. As the high part of the cam 75 engages the lower rock-arm 74, the clamping jaws 70 are depressed and caused to bear downwardly upon the flange-web, thereby gripping the latter between said jaws and the lower cutter blade 24, so that the same is positively held against displacement while that portion of the flange-web in front of the clamping jaws is being operated upon. When the low part of the cam 75 is presented to the lower rock lever 74, the clamping jaws are raised into their inoperative position owing to the preponderating weight of the rock arms and connecting rod which effect this raising of the clamping jaws by gravity although the same may be aided, if desired, by a spring. This operation of the clamping jaws is so timed that the flange-web is gripped while the feeding mechanism is at rest and released when the feeding mechanism is in operation, thereby insuring control of the flange-web at all times. By making the clamping jaws of spring metal the throw of the high part of the cam may be slightly in excess of that required for bringing the clamping jaws into engagement with the flange-web and thereby cause these jaws to be strained or flexed slightly after such engagement, thereby enabling this clamping device to adapt itself to slight variations in the thickness of the flange-web and reliably hold the same in place without requiring any fine adjustment of the parts and without liability of breaking or straining the same.

At the end of each forward movement of the flange-web a strip is cut off transversely from the front end or edge of the same to be subsequently associated with the head and binder strip to form a box. The preferred form of mechanism for thus severing a body blank, box-flange blank, or strip, from the front end of the flange-web is best shown in Figs. 1, 4, 7, 11, 13, 14, 15, 16, 39–43, and is constructed as follows:

76 represents a transversely and horizontally-movable carriage or slide which is arranged above the lower cutter plate or blade 24 and is guided on the underside of a cross piece 77 on the adjacent stationary part of the frame.

78 represents a circular cutter, blade or disk which is pivoted on the front side of the carriage so as to be capable of rotating in a vertical plane transversely of the machine and which coöperates with the front edge of the lower cutter blade 24 for severing a strip from the front edge or end of the flange-web which is projected by the feed mechanism in front of the cutting line. The carriage upon which this rotary cutter is pivoted is reciprocated intermittently preferably by means of a vertically-swinging upright rock lever 79 pivoted at its lower end on the main frame at the right hand side thereof and connected at its upper end with the cutter carriage by means of a link 80, a crank-shaft 81 journaled lengthwise on the frame of the machine parallel with the longitudinal shaft 45 and having the crank 82 at its front end connected by a connecting rod 83 with the upright rock lever 79, between its upper and lower ends, as shown in Fig. 13, and a mutilated master gear wheel 84 secured to the longitudinal shaft 45 and meshing with a corresponding pinion 85 secured to the adjacent part of the crank shaft, said pinion being one-half the size of the master gear wheel and provided on diametrically opposite sides with dwells or locking faces which are adapted to be engaged successively by the concentric dwell face of the master wheel and on opposite sides of said dwells with toothed segments which are adapted to be engaged successively by the toothed segment portion of the master wheel. By this means an intermittent rotary movement is imparted to the crank shaft from the longitudinal shaft 45 which rotates continuously in the same direction, each step of this movement causing the crank shaft 81 to make half a turn and to move the cutter disk 78 alternately from one side to the other of the path of the flange-web and causing the same to rest momentarily upon reaching the end of the stroke in either direction and before commencing the stroke in the opposite direction.

While the cutter disk is at rest at one end of its stroke on one side of the path of the flange-web, the latter is fed forwardly one step or space and projected beyond the severing line of the cutter-disk and blade a distance equal to the width of the flange which is desired on the box. After the flange-web has been fed forward to this extent by its feeding mechanism and has come to rest, the cutter disk sweeps transversely across the flange-web and severs a strip from the front end thereof and then comes to rest momentarily on the opposite side of the flange-web. The latter is now fed forward another step equal to the distance of a flange strip and after coming to rest the cutter disk returns again to the opposite side of the flange-web and during this movement severs another strip therefrom. It will be noted that by this operation of the cutter disk, a flange strip is cut from the flange web during each stroke of the cutter disk in either direction. For the purpose of permitting of adjusting the relation of the two cutters 24, 78, for adapting the same to the particular thickness of the flange-web and also for taking up wear upon these cutters, the lower cutter blade or plate 24 is mounted on the feed table 22, so that the same is capable of moving horizontally relatively to the upper rotary cutter. This adjustment of the lower cutter 24 is effected preferably by means of horizontal adjusting screws 86 interposed between opposite ends of its rear edge and the adjacent stationary parts of the frame, and after adjustment this blade is held in position by means of clamping screws 87 passing through longitudinal slots in this cutter blade and into the adjacent part of the feed table, as shown in Fig. 7.

The mechanisms for supplying the cover, or binder-web, assembling the same with the flange-web, severing strips from the front end thereof after the same have been attached to the flange strip, and folding the front edge of such binder strips around the front edge of the flange-strip are constructed as follows: The binder-web is preferably supplied from a roll 88 mounted on a drum or mandrel 89 which is supported horizontally on the lower front part of the frame for vertical rotation and the binder-web is unwound downwardly from the rear side of this roll, as shown in Figs. 2 and 11. From the rear side of the supply-roll the binder-web passes downwardly and then upwardly along the front side of the same forming a depending loop below the roll, thence rearwardly in zig-zag fashion alternately with its opposite side in engagement with a front horizontal tension roller 90 and a plurality of rear tension or retarding rods or bars 901, 902, 903 arranged horizontally one behind the other in a longitudinal row, thence rearwardly over the top of the periphery of a glue feeding or delivery roller 91, thence rearwardly over a scraper 92, thence upwardly around an adjusting roller 93 and through a throat or guide way formed between the front end of the flange-web feed-table 22 and a guide bar 94 arranged transversely in front of this table, and thence horizontally forward over the upper edge of this guide bar, which latter terminates with its upper edge nearly flush with the upper side of the cutter-blade 24, as shown in Figs. 11, 35-37 and 39-43. In order to relieve the devices which assemble the binder-web and flange-web from the work of unwinding the binder-web from its supply roll and thus permit such assembling mechanism to do its work without interference, means are provided whereby such unwinding of the binder-web is effected independently of the assembling device. For this purpose a loop is constantly formed below the binder-web supply-roll which provides a constant supply of binder-web which is free and easily drawn by the assembling device past the glue applying mechanism and to the position where the binder web is assembled with the flange-web and severed into strips. The means shown in the drawings are suitable and preferred for this purpose and comprise a vertically-movable pull-bar 95 which is arranged horizontally and transversely within the loop of the binder-web below its supply roll and supported at one end from the rock shaft 57 by the rock arm 64 which is connected with the spring 63 and at its opposite end by a similar rock arm 96 connected with the rock-shaft 57. During each operation of the machine, the pull bar 95 rises and falls by reason of the action of the cam 62 and spring 63 which operate to rock the shaft 57 and as the pull-bar descends it engages with the lower end of the loop and draws the same downwardly, thereby causing a sufficient amount of stock to be unwound from the roll of binder-web to keep pace with the amount which is cut off from the front end of this web in the formation of the successive binder-strips. In passing successively over and underneath the tension roller and bars or rods, a frictional resistance or tension is produced on the binder-web which operates to retard the forward movement of the binder-web, and causes the same to always remain comparatively taut in passing over the glue applying roller, scraper, adjusting roller and the guide-bar 94, and thereby enables these parts to operate properly upon this web. For the purpose of applying a further tensioning and braking effect on the binder-web a presser block 904 is provided which has a felt facing 905 on its underside whereby the same engages with the top of the binder web as the same passes between the bars 901, 903 and which has a weight 906 on its upper side for producing the desired pressure, as shown in Fig. 11.

As the binder web passes around the tension roller 90 and the several tension rods 901, 902, 903, the same is also guided so as to be held in the proper position laterally for subsequent assembling with the flange web. For this purpose two side guides 907, 908 are provided which are capable of lateral adjustment, the left guide 907 being adjustably connected with the adjacent stationary part of the machine by a transverse adjusting screw 909 and slidable on the roller 90 and rods 901, 903 which are held relatively stationary by a bracket 910 connected with one end thereof, and the right hand guide 908 being shifted transversely by connecting the same with the right end of the rod 902 which is slidable in the left guide 907 and adjustably connected therewith by a set screw 911, as shown in Fig. 48. The lower part of the glue supply roller is immersed in a bath of liquid glue contained in a supply tank or pot 97 below the delivery roller, the glue being retained in a liquid condition of the proper consistency by a heating or warming device of any suitable construction, but preferably by means of a jacket 98 which is arranged adjacent to the lower front side of the glue tank or pot and through which hot water, steam or other heating medium is circulated by any suitable means. As the binder-web is drawn rearwardly over the top of the periphery of the glue-delivery roller, the latter deposits a coat of glue on the respective side of the binder-web and the delivery roller is turned by frictional contact with this web, thereby causing the same to constantly pick up new glue and delivering the same to the following parts of the binder-web.

For the purpose of causing a greater or lesser portion of the binder-web to engage with the glue delivery roller and thus vary the amount of glue which is picked up by the web from this roller, the web-adjusting roller is provided with means whereby the same may be raised or lowered relatively to the scraper which means are also so constructed that the adjusting roller may be lifted clear of the glue-pot and delivery roller when access is required to these parts for cleaning, inspection or repairs. The means for this purpose which are preferred and which are best shown in Figs. 48 and 49 comprise a pair of rock arms 99 which are pivoted at their front ends for vertical rotation on opposite sides of the front part of the glue pot and pivotally support the adjusting roller at its opposite ends, a spring 100 connected with one of the rock arms 99 and tending normally to raise the adjusting roller, a hook or catch 101 adapted to engage with a pin or shoulder 102 on one of the adjusting roller arms and hold the latter in its lowered operative position, an elbow lever 102 pivoted on the side of the glue pot and having the hook or catch 101 pivoted on one of its arms, an adjusting rod 103 passing through a lug 104 on the side of the glue-pot and pivotally connected at its front end with the other arm of the elbow lever, a spring 105 surrounding the adjusting rod between the lug 104 on the glue-pot and a collar 106 on the rod and operating to push the rod forwardly, and a screw nut 107 applied to the threaded rear end of the adjusting rod and engaging with the rear side of the lug 104. Upon turning the screw nut 107 in one direction or the other, the same in coöperation with the spring 105 causes the adjusting rod 103 to be moved either forwardly or backwardly and thus turn the elbow lever 102 so that the adjusting roller 93 is either raised or lowered, thereby enabling the latter to be deflected more or less by the scraper and thereby vary the scarfing effect of the latter and leaving a film or coating of glue on the binder-web of the desired thickness. When the adjusting roller 93 is to be temporarily raised clear of the glue pot and delivery roller, this may be done quickly and conveniently by disengaging the catch 101 of the elbow lever from the respective arm of the adjusting roller and when the latter is again returned to its operative position the same may be as quickly held in place by reëngaging the catch of the elbow lever with the shoulder or pin on the respective adjusting roller supporting arm.

The surplus glue which is removed by the scraper from the binder-web is returned to the pot. In order to permit the scraper to be adjusted so that it is parallel with the web and leaves a film of glue thereon which is of uniform thickness all the way across the web, means are provided for adjusting this scraper relatively to the coated surface of the web. The means which are shown in Figs. 48 and 49 as an example and are suitable, consist of a bracket 108 rising from one side of the glue pot and supporting the fixed end of the scraper, a rock lever 109 pivoted on the opposite side of the glue pot and having one of its arms connected with the other movable end of the scraper, a vertical adjusting screw 110 connected at its lower end with the glue pot and passing upwardly through the other arm of the scraper adjusting lever, a spring 111 surrounding the adjusting screw between the top of the glue pot and the underside of the scraper lever and operating to turn the lever, when free, in the direction for lowering the movable end of the scraper, and a screw nut 112 which is applied to the upper threaded end of the adjusting screw and bears against the rear arm of the scraper lever which when tightened causes the scraper lever to be turned in the direction for elevating the movable end of the scraper and move the same toward the coated surface of the binder-web, thereby enabling the scraper to be placed in parallelism with the binder-web for obtaining a film of glue of uniform thickness throughout its width.

As the front end of the binder-web passes horizontally forward over the upper edge of the guide-bar 94, its glued upper side becomes attached to the underside of the adjacent front edge of the flange-web and when these two webs come to rest, the front edge of the flange-web projects forwardly beyond the cutting line of the cutters 24 and 78 equal to the width of a body blank, or box flange, and the binder-web projects forwardly beyond the front edge of the flange-web a distance equal to the width of folding edge which it is desired to fold across, or around, the outer edge of the box flange and against the inner side of the same, this relative position of the flange-web and binder web being best shown in Figs. 40 and 61. While the front edges of the flange-web and binder web are in this relative assembled position, the front or projecting edge of the binder-web is turned upwardly, rearwardly and downwardly, so as to fold this portion of the binder-web around the front edge of the flange-web and adhesively secure the same to the opposite, or upper side or face, of the flange-web which side ultimately becomes the inner side of the wall of the completed box. The mechanism whereby this last-mentioned operation is performed is best shown in Figs. 1, 11, 13, 35, 37 and 39–43, and is constructed as follows: 113 represents a bar or jaw which is arranged horizontally and transversely in front of the guide-bar 94 and performs the triple functions of a folding bar, blank pressing means, or jaw, and a cutter blade in connection with the other parts of the machine. This bar is capable of both a vertical reciprocating and also a horizontal reciprocating movement lengthwise of the machine and is arranged on the upper edge of a guiding and supporting plate 114, so that it overhangs the latter rearwardly. While a previously-assembled and completed flange strip and binder-strip are being carried forwardly away from the flange web and binder-web and the same are being fed forward in position for forming the next flange and binder, the combination bar 113 is arranged a considerable distance below the path of the front edge of the binder-web and separated therefrom by an intervening space, so as to avoid interference with the devices which carry away the completed and assembled flange-strip and binder-strip and advance the binder-web, as shown in Fig. 39. After the flange-web and binder-web have been advanced into the relative position for severing the binder-strip from the binder-web, the combination bar rises into the position indicated in Fig. 40 in which it engages with the underside of the front edge of the binder-web with its rear side vertically in line with the front edge of the flange-web, at which time the binder associated with the previous flange is severed from the binder-web by means which will be more fully described hereinafter. After the upper side of the combination bar thus engages its upper side with the underside of the front edge of the binder-web, it continues its upward movement until its underside is in line with the upper side of the flange-web, as shown in Fig. 41, whereby the projecting front end of the binder-web is turned upwardly at right angles to the adjacent body-portion of the binder web. The combination bar is now moved horizontally rearward, so that it folds or turns the front edge of the binder-web backwardly and downwardly over the upper side of the flange-web, as shown in Fig. 42. While in this position, a presser-bar, plate or jaw 115 rises with its upper side or face into engagement with the underside of the front portion of the binder-web and flange-web vertically in line with the upper combination bar and causes the folded portions of the binder web and the front edge of the flange-web within the folded portion of the binder-web to be firmly pressed together, as shown in Fig. 43, and insure a reliable connection between these parts by means of the adhesive previously applied thereto. This last-mentioned lower presser-bar also has a combined vertically reciprocating motion and a horizontally reciprocating motion lengthwise of the machine.

After the folding of the binder-web around the front edge of the flange-web and the pressing together of the same has been completed in the manner described, the lower presser bar first descends so as to release the assembled binder-flange and web and then the two bars 113, 115 are first moved horizontally forward together so as to clear the front edges of the assembled flange-web and binder-web and then are lowered into the position shown in Fig. 39, preparatory to the next folding and pressing operation.

The mechanism whereby the upper and lower bars 113, 115 are raised and lowered and moved horizontally forward and backward in the manner described, is constructed as follows: 116 represents two upright supporting bars which are secured at their upper ends to opposite ends of the lower pressing bar 115 and which engage on their lateral outer sides with guide faces or ways 117 formed on the adjacent stationary part of the machine and operating to control the movement of these bars relatively to the length of the frame, and confine them against lateral movement. At their lower ends these supporting bars are pivoted on the front ends of two vertically swinging horizontal rock arms 118 which are secured at their rear ends to a horizontal rock shaft 119 journaled transversely in the lower rear part of the machine. At its outer end the rock shaft 119 is provided with a depending rock-arm 120 which is engaged by a rotary cam 121 on the adjacent part of the lower countershaft, as shown in Figs. 2 and 17–19. When the salient or high part of the cam 121 engages with the rock arm 120, the supporting arms 118 and the parts connected therewith are raised and as this cam presents its low part to the rock arm 120, the supporting bars 116 and associated parts are lowered by gravity. The backward movement of the supporting bars and the upper and lower clamping bars 113, 115 is effected by means of springs 122 each connecting one of the supporting bars with the adjacent stationary part of the frame, but this movement of the parts is controlled by means of a vertically-turning cam 123 arranged in front of the lower part of the guide bar 94 and engaging with the rear side of the lower clamping bar 115, as shown in Figs. 11, 35–37 and 39–43. This cam is operated by means of a horizontal rock shaft 124 journaled transversely in suitable bearings on the frame and carrying the cam 123. an upright connecting rod 125 connected at its upper end with a rearwardly-projecting arm 126 on the rock shaft 124, as shown in Figs. 44 and 13, while its lower end is connected with a vertically-swinging transverse rock arm, 127, as shown in Figs. 13 and 20, and a cam 128 secured to the longitudinal shaft 45 and engaging with the rock arm 127. When the high part of the cam 128 engages with the rock arm 127, the cam 123 is turned into the position shown in Figs. 11, 39–41 in which the clamping bars 113, 115 are moved into their foremost position. As the cam 128 presents its low face to the rock arm 127, the cam 123 is caused to recede under the pull of the spring 122 and thereby permit the bars 113, 115 to move into their rearward position, as indicated in Figs. 42 and 43. The upper or combination bar 113 is guided upon the lower pressing bar, so as to be compelled to move forwardly and backwardly therewith in the machine but capable of vertical movement independently thereof, this connection being preferably effected by means of guide-screws 129 secured to the front side of the lower pressing bar and passing through vertical slots 130 in the guide plate 114 of the upper bar, as shown in Figs. 13, 39 to 43. The upper or combination bar 113 is yieldingly held in its elevated position in which it is separated from the lower presser bar by means of springs 131 engaging at one of their ends with shoulders, collars or nuts 132 on guide-rods 133 depending from the lower side of the guide-plate 114 and at their opposite ends with brackets 134 on the supporting bars in which the lower ends of the guide rods 133 slide vertically. The upward movement of the combination bar is limited by engagement of the lower ends of its slots 130 with the underside of the guide-screws 129. The upper and lower bars 113, 115 remain in this separated position while the upper bar or jaw is effecting the upward turning of the front edge of the binder-web, as indicated in Fig. 41 and while these two jaws or bars are moved rearwardly and the upper bar turns the edge of the binder-web horizontally against the upper side of the flange web, as shown in Fig. 42. When the upper bar has reached this uppermost position, further upward movement thereof independently of the lower pressing bar is prevented by means of a stop device coöperating with a stationary part of the machine, which stop device preferably consists of adjustable screw-nuts 135 arranged on threaded portions of the guide-rods 133 and adapted to engage with the undersides of stops 136 arranged on the adjacent part of the main frame, as shown in Figs. 42 and 43. After the upper folding and pressing bar or jaw 113 has been moved rearwardly into the position shown in Fig. 42, and is held against upward movement by engagement of its stops 135 engaging with the stops 136 of the frame, the lower presser bar 115 rises under the action of the cam 121 independently of the upper bar 113, as shown in Fig. 43, for pressing the assembled front edges of the flange-web and binder-web and during this movement of the lower presser bar, the springs 131 are compressed and the guide-screws 129 slide upwardly in the slots of the guide-plate 114 which carry the upper or combination bar. During the initial portion of the subsequent downward movement of the lower presser-bar, the same moves independently of the combination-bar until the guide screws 129 engage with the lower ends of the slots 130 in the guide-plate 114, then the combination-bar and lower presser bar are moved forwardly together under the action of the cam 123 so as to clear the front ends of the assembled flange web and binder-web and then the combination-bar and lower presser-bar are lowered together by the action of the cam 121 into the position shown in Fig. 39 preparatory to beginning the next cycle of operations.

After the front end of the binder-web has been folded or turned over the front edge of the flange-web in the manner described, the assembled front edges of these webs are grasped by the grippers of a carrying or transferring device, as shown in Fig. 35 and after being thus engaged by the grippers, the latter remain at rest a sufficient length of time to permit the upper rotary cutter 78 to pass transversely across the flange-web in rear of the binder-web, as shown in Fig. 39, and sever a flange-strip from the flange-web which strip has been previously adhesively connected with the binder-web in the manner heretofore described. After the flange-strip has been thus severed from the flange-web, the transferring or carrying device which still grasps the flange and binder-web moves these parts forwardly until the rear edge of the flange-strip is arranged some distance in front of the combination bar 113 and at the same time the flange-web is moved forward by its feeding mechanism but to a lesser extent than the binder-web and the flange-strip connected therewith, the extent of this forward movement of the flange-web being such that its front end overlaps the glue-coated upper horizontal portion of the binder-web in rear of the combination bar and the front end of the flange-web becomes adhesively connected with the binder-web. When the binder-web and the flange-strip reach the end of this forward step, the rear edge of the flange-strip is separated from the front edge of the flange-web by an intervening gap or space which is bridged by the unsevered portion of the binder-web between the same, as shown in Fig. 36. In this position of these parts, that portion of the binder-web between the flange-strip and flange-web is severed on a transverse line midway or nearly so between the flange-web and flange-strip, the mechanism for this purpose comprising an upper cutter 137 which operates separately from the body web cutter, one cutter severing one web and the other the other web. The cutter 137 is adapted to engage with the upper presser or combination bar 113 which latter then forms a companion lower cutter member. The latter is provided on its upper side adjacent to its front corner or edge with a horizontal transverse groove 138, and the former, having preferably the form of a rotatable disk or circular blade, is adapted to engage and reciprocate horizontally and transversely therein with its lower edge and sever the binder-web extending across the same. The upper binder-cutter 137 is pivoted on a transversely-reciprocating carriage 139 which is guided in a way on the front side of the cross piece 77 and is actuated by means of an upright rock lever 140 pivoted at its lower end on the right-hand side of the main frame and connected at its upper end by a connecting rod 141 with the binder cutter carriage 139 as shown in Fig. 13, a longitudinal crank shaft 142 journaled in the main frame parallel with the longitudinal shaft 45 on the side opposite the crank shaft 81 and having its crank 143 connected by a connecting rod 144 with the rock lever 140 between its upper and lower end, and means for imparting an intermittently-rotating movement from the central longitudinal shaft 45 to the crank-shaft 142, which means are best shown in Figs. 15 and 16, and which consist of the mutilated master-gear wheel 84 mounted on the central longitudinal shaft 45 and engaging with a corresponding pinion 145 which is one-half the size of the master-gear wheel 84 and which is provided on diametrically opposite sides with dwell-faces which are adapted to engage with the eccentric-face of the master-gear wheel and between said dwell faces with segmental gear portions which are adapted to be engaged successively by the gear-portion of the master-wheel, in the same manner in which the latter coöperates with the mutilated gear pinion 85 which reciprocates the cutter disk of the flange-web cutter mechanism. The operation of the master gear-wheel and pinion 145 is such that the latter is first turned one-half a revolution for carrying the binder-web cutting disk across the binder-web for severing the same and then remains at rest so that the binder-web cutting disk 137 is retained on one side of this web a sufficient length of time to permit the same to be fed forward an extent equal to the width of another binder-strip, then the pinion 145 is turned another half a revolution so as to carry the web-cutting disk transversely across this web to the other side thereof for severing another binder-strip, this operation being repeated continuously while the machine is at work. The relative timing of the mechanism which shifts the flange cutting disk and the binder-cutting disk is such that the flange-cutting disk is first moved across the path of the flange-web after the transferring device has taken hold of the front edges of the assembled flange-web and binder-web, as shown in Fig. 39, and after the severed flange and binder have been moved forwardly to form a gap between this flange and the flange-web, then the binder-cutter also moves transversely across the binder-web, as shown in Fig. 40, in the same direction in which the flange cutting disk has just moved, and then the flange-web cutting disk and binder-web cutting-disk return one after the other to the opposite side of the flange-web and binder-web for cutting the next following strips from these webs, these operations being repeated continuously while the machine is at work.

The transferring device which grasps the front edge of the binder and the flange assembled therewith and moves the same forwardly is the sole means for advancing the binder-web step by step and present its front end successively to the mechanism which assembles the same with the flange-web and severs a strip therefrom.

The preferred form of this transferring mechanism is best shown in Figs. 1, 6, 13, 21, 35–38, 44 and 45 and constructed as follows:—In front of the binder cutting mechanism is a reciprocatory, or oscillatory means, to successively transfer blank pairs into coöperative relation to certain composite blank folding mechanism, this transferring means being operative between the severing mechanisms described, and the composite blank folding mechanism, the latter hereinafter described. Preferably this transfer mechanism comprises two transfer grippers arranged side by side, each of which comprises a relatively stationary upper jaw 146, and a lower jaw 147 which is movable vertically toward and from the upper jaw. Each of the upper jaws is formed on or secured to the lower ends of the members of a bifurcated upright rock lever or arm 148 which swings in a vertical plane and is secured at its upper end to a horizontal rock shaft 149 journaled transversely in bearings on the adjacent upper part of the frame. This shaft is moved in the direction for carrying the gripper arms from the web-cutters forwardly by means of an upright connecting rod 150 which is connected at its upper end with a rearwardly projecting rock arm 151 on the rock shaft 149 while its lower end is connected with one arm of an elbow lever 152 and a cam 153 secured to the lower countershaft and engaging with the other arm of the elbow lever 152. The return movement of the rock shaft 149 whereby the gripper arms are moved rearwardly or toward the web-cutting mechanism is effected by means of a spring 154 which is preferably connected with the elbow lever 152 and the adjacent part of the main frame, as shown in Figs. 3 and 35. The lower jaw 147 of each transfer gripper moves with the upper jaw toward and from the web cutters and is also capable of moving vertically toward and from its companion stationary jaw for which purpose the lower gripper jaw is preferably provided on its front edge with an upwardly-projecting flange 155 which moves in vertical slots 156 formed on the adjacent lower parts of the respective gripper arm, as shown in Fig. 38. Each of the lower gripper-jaws is yieldingly held in its elevated or closed position by means of a pair of upright tension rods 157 arranged on opposite sides of the respective gripper arm and connected at their lower ends with opposite sides of the upright flange 155 of the lower gripper jaw while their upper ends pass through transverse openings in the rock shaft 149, and coiled springs 158 each surrounding the upper end of one of said tension rods and bearing with its lower end against the upper side of said rock shaft, while its upper end bears against a nut or shoulder 159 arranged at the upper end of the respective tension rod. The downward movement of each lower gripper jaw for opening the gripper is effected by means of a horizontal transverse rock shaft 160 which is journaled parallel to the rock shaft 149 in bearings carried by the latter on one side of its center, rock arms 161 secured to the gripper opening shaft 160 and each connected with one of the tension rods 157, an upright connecting rod 162 connected at its upper end with a rock arm 163 at one end of the gripper opening shaft, as shown in Figs. 13 and 38, and at its lower end with one arm of an elbow lever 164, as shown in Figs. 13 and 27, and a cam 165 secured to the central longitudinal shaft 45 and engaging with the other arm of the elbow lever 164, as shown in the last-mentioned figures.
When the cam 165 engages its high face with the elbow lever 164, the gripper opening shaft 160 is turned in the direction for moving the lower jaws of the grippers downwardly and when the low part or face of said cam is presented to said elbow lever, the springs 158 operate to raise the lower gripper jaws into their closed position and also turn the gripper opening shaft in the reverse direction. The mechanism for shifting the grippers bodily toward and from the web-cutters and also opening and closing the same is so timed that when the transfer grippers are moved rearwardly the jaws thereof are opened so as to permit the same to receive the front edge of the binder-web and flange-web between them in the rearmost position of these grippers and after the jaws of the grippers have been thus shifted into a position above and below the flange-web and binder-web, the lower jaws of the grippers are caused to rise so as to grip the flange-web and binder-web between the gripper jaws under the action of the springs 158. The transfer grippers are thus retained in their closed position while effecting the first step of their forward movement so that the binder-web and the severed flange-strip are carried forwardly therewith in position for severing the binder-web in rear of the severed flange-strip. It will now be seen that the body or flange web feeding device and the cover, or binder web, feeding device operate separately to feed these respective webs, and that the transfer grippers not only feed the cover web, but also grip the body or flange blank and form a device which, on its movement in one direction moves the body or flange blank which is adhering to the cover or binder web, and urges the body blank in a direction to draw the adhering cover web therewith, and this latter before the binder or cover blank is severed from the cover or binder web. It will also be noted that the severing mechanisms and the web feeding mechanisms heretofore described operate to produce successive pairs of superposed blanks from the said webs, a blank of one web being associated with a blank of another.

The glue for securing together the scarfed ends of the flange of a box is applied to the same preferably before the flange-strip is cut from the flange-web and the means for this purpose shown in the drawings is so organized that the glue for adhesively securing these scarfed portions of the flange is applied to that scarfed edge of the same which faces inwardly in the finished condition of the box and which is arranged at the left-hand side of the flange-web while the same is arranged within the machine. This scarf gluing mechanism is best shown in Figs. 1, 2, 3, 6, 13, 14, 46 and 47 and is constructed as follows: 166 represents a glue supply pot or tank arranged on a stationary part of the machine adjacent to the left hand side of the path of the flange-web transversely in line with the front end of the same. The glue within this pot is preferably retained in a liquid condition by means of a jacket 167 arranged below the pot and through which hot water, steam or other heating medium is circulated for heating the glue and maintaining the same of the proper consistency. Within this glue-pot is arranged a glue supply roller or wheel 168 which is mounted so as to turn vertically in a direction transversely of the machine and dip with its lower part in the bath of glue within the pot. This glue supply roller is rotated so as to stir up the glue within the pot and also for constantly bringing a fresh supply of glue to the top of the roller by means of a longitudinal shaft 169 journaled in bearings on the adjacent stationary part of the machine, and provided at its front end with a pinion 170 which meshes with a gear rim 171 on the rear part of the glue supply wheel, and a cross belt 172 passing around pulleys 173,

174 arranged on the lower countershaft and the rear end of the longitudinal shaft 169, respectively, as shown in Fig. 3.

175 indicates a glue delivery roller engaging with its underside against the periphery of the glue supply roller and secured to the shaft 169 from which the same is driven by the gears 170, 171. As the glue supply and delivery rollers are rotated in contact with or close to each other the supply roller lifts the glue from the pot to the upper side of this roller where the surplus is squeezed off and caused to run back into the pot by the delivery roller leaving only a thin film of glue adhering to the periphery of the delivery roller.

176 represents a dauber whereby glue is successively transferred from the upper part of the delivery roller to the scarfed surface of the flange-web on the upper side of its left edge and at the front end thereof preparatory to cutting off this end of the flange web to form a flange strip. This dauber is mounted on the outer arm 177 of a vertically-swinging dauber rock lever which is pivoted in a transverse position on the left end of the carriage which supports the flange cutting disk while its other arm 178 is provided with a roller or bearing member 179 which engages with the underside of a cam-rail or track 180 arranged transversely of the machine and lengthwise on the underside of the cross piece 77. The dauber-lever is yieldingly-turned in the direction for engaging its roller 179 with the cam-track by means of a spring 181 although the preponderating weight of the outer arm of this lever and the dauber mounted thereon will tend to keep the same in this position. The cam rail is provided on its outer portion with a low horizontal straight face 182 and on its inner portion with a notched recess or high face 183. While the flange cutter carriage is at the left end of its stroke, as shown in full lines in Figs. 6 and 14, the dauber is arranged toward the left of the glue delivery roller and the cam roller of the inner arm of the dauber-lever engages with the low horizontal face of the cam-rail. As the flange cutter carriage moves toward the right, the dauber is moved with its lower part over the upper part of the periphery of the glue-delivery roller and removes glue from the latter. While the dauber is moving inwardly over the glue-delivery roller and toward the respective edge of the flange-web, the same is held in an elevated position out of contact with the parts of the machine below its path by the lower straight face of the cam rail until the dauber reaches the end of its movement toward the right, at which point the roller 179 on the dauber lever stands opposite the high face or recess 183 of the cam rail and is caused to rise under the action of the spring 181 and the weight of the dauber, thereby causing the latter to descend and deposit the glue carried by its underside upon the scarfed left edge of the flange-web adjacent to its front end, the relative timing and movement of the parts being so determined that the dauber reaches the end of its motion toward the right and is dropped when the same is vertically in line with this edge of the flange-web. While the dauber is thus in its lowered position in engagement with the left edge of the flange-web, the latter is moved forwardly by its feeding mechanism, so that such a portion of the scarfed edge of the flange is coated with glue by the dauber, equal the width of two flange-strips which are subsequently cut successively from the flange-web. By this means only one operation of the scarf gluing mechanism is required for supplying the necessary glue for the scarfed joints of two flange-strips. During the initial portion of the movement of the flange cutter carriage from right to left, the roller 179 of the dauber-lever again engages the low straight face of the cam rail so as to lift the dauber clear of the adjacent lower parts of the machine and in position to sweep over the top of the glue delivery roller during the last portion of the movement in this direction. By thus holding the dauber clear of the adjacent lower parts of the machine, and only moving the same toward and from the scarfed edge of the flange-web, smearing of the machine with glue is avoided which otherwise would necessitate frequent cleaning thereof and also involve unnecessary waste of glue.

The dauber is preferably constructed in the form of a circular body or roller 184 which is provided on its periphery with a plurality of brushes or fingers 185 any one of which may be brought into the operative position on the lower side of the dauber by turning the dauber on the outer arm of the dauber-lever, for which purpose the dauber is pivotally secured upon this arm by means of a clamping screw 186 which latter when loosened permits the dauber to be turned to the required position and when tightened holds the dauber reliably in its adjusted position. By thus providing the dauber with a plurality of brushes or fingers, a finger or brush which becomes worn or excessively covered with accumulated glue can be quickly replaced by another finger without interrupting the operation of the machine. The dauber is preferably made of rubber in the form shown, but if desired, the same may be made of other material and of any other suitable form. For the purpose of permitting the dauber to be adjusted accurately relatively to the position of the scarfed left edge of the flange web, the outer arm 177 of the dauber-lever is made in sections which are adjustably connected by a slot and bolt connection 187, as shown in Fig. 14, and whereby this arm may be shortened or lengthened as required to permit the dauber thereon to properly apply the glue for the scarfed joint of the flange strips. For the purpose of increasing or decreasing the amount of glue which is supplied to the dauber, the glue supply roller is made vertically-adjustable relatively to the glue delivery roller, the means for this purpose which are shown in the drawings being preferred and consisting of two vertically-swinging adjusting levers 188 pivoted on the upper part of the scarf glue pot and carrying a horizontal rod or pin 189 on their lower arms upon which the glue delivery roller is journaled, a cross bar 190 engaging with the underside of the upper arms of the adjusting levers, two adjusting screws 191 arranged in threaded openings on the adjacent upper part of the glue pot and engaging with the upper sides of the upper arms of the adjusting levers, and an adjusting screw 192 turning loosely in an opening in the upper part of the scarf glue pot and engaging its threaded part in a threaded opening in the cross bar, as shown in Figs. 15–17. Upon tightening the screws 191 and loosening the screw 192, the adjusting levers are turned so as to raise the glue supplying roller toward the delivery roller, thereby reducing the amount of glue which is delivered, while upon reversing this movement of the screws the rollers are separated and more glue is delivered.

Upon being carried forward by the transferring mechanism, the composite blanks, composed of the pairs of assembled body blanks and cover blanks, or flanges and binders are assembled with a box head which is preferably of rectangular form. These heads are supplied from a stack contained in an upright magazine which is arranged in the upper front part of the machine and which preferably consists of two upright side walls 193 adapted to engage with opposite side edges of the heads, a pair of upright inner flanges or shoulders 194 arranged on the rear ends of the side walls and adapted to engage with the front edges of the box heads, and two upright inner shoulders 195 at the front ends of the side walls which are adapted to engage with the rear edges of the box heads, and a bottom 196 which extends across the lower end of the magazine and supports the stack of heads therein. The heads are fed or removed successively from the bottom of the stack by means of a delivery device which preferably consists of a horizontally and longitudinally-reciprocating plunger or follower composed of two sections 197 which are arranged side by side and guided in grooves 198 in the upper side of the magazine bottom, each section being provided with a rearwardly-facing shoulder 199 at its rear end and a cross piece 200 connected with the front ends of the plunger sections, as shown in Figs. 31, 33 and 34. In its retracted position, the plunger is arranged with its shoulders in front of the stack of heads in the magazine and upon moving the same rearward, these shoulders engage with the rear edge of the lowermost head in the magazine and push the same rearwardly from the bottom of the stack and out through an opening or throat which is formed at the lower rear end of the magazine and which is of such height that it permits only one head at a time to be ejected rearwardly from the magazine. After the plunger or follower has thus removed the lowermost head from the stack, it is returned to its foremost position with its shoulders in front of the stack, permitting the latter to drop and bring the next following lowermost head in position relatively to the follower to be removed thereby. The forward movement of the follower is effected by means of a spring 201 connected at one end with the side of the cross piece of the follower and at its opposite end with a stationary part of the machine, as shown in Figs. 28–32, and the backward movement of the follower is effected by means of an upright elbow lever 202 pivoted on the adjacent part of the frame and having an upper arm which is connected by a link 203 with a horizontally and longitudinally sliding bar 204 connected with the follower crosspiece, and a rotatable cam 205 engaging with the lower arm of the elbow lever 202, as shown in Figs. 29, 30 and 31. The cam 205 is secured to an upper horizontal countershaft 206 which is journaled in bearings on the adjacent part of the frame and is driven from the lower countershaft by means of a chain belt 207 passing around sprocket wheels 208, 209, secured respectively to the lower and upper countershafts, as shown best in Fig. 9.

As the box-heads are discharged successively from the underside of the stack in the magazine, they are carried one at a time rearwardly, downwardly, forwardly and upwardly in a circular path and each assembled with a flange strip and binder strip which have been previously formed by the mechanism heretofore described.

The mechanism whereby the box-heads are supported and carried during the operation of assembling the same with the flanges and binders is best shown in Figs. 1, 2, 4, 11, 12, 23 and 27, and is constructed as follows:—In front of the flange and binder forming and assembling mechanism and part of a composite blank folding mechanism is arranged a form carrier which is rotatable in an endless path in a vertical plane parallel with the length of the machine and which preferably consists of a hub 210 having a plurality of radial arms 211, four of the latter being preferably employed and arranged equidistant about the hub, as shown in Fig. 25. This carrier is secured with its hub to a horizontal shaft 212 which is journaled transversely in a bearing on the adjacent part of the main frame and is rotated intermittently with the form carrier and associated parts by any suitable mechanism so that it comes to rest at intervals with one of its arms projecting vertically upward into a position in rear of the head magazine, another projecting horizontally rearward toward the flange and binder assembling mechanism, another projecting vertically downward toward the mechanism whereby the binder and the flange are folded and adhesively connected with the head, and another projecting horizontally forward into the proper position relatively to the mechanism which ejects or discharges the completed box from the carrier. The preferred mechanism for effecting this intermittent rotary movement of the box carrier is shown in Figs. 4, 5 and 23 and comprises a mutilated pinion 213 mounted on the upper countershaft and provided on one-half of its periphery with gear teeth while the remaining half is plain and concentric, and a mutilated gear wheel 214 secured to the outer end of the rotatable carrier-shaft and provided equidistant on its periphery with four toothed segments or sections which are adapted to be engaged successively by the toothed portion of the pinion 213 and four locking faces alternating with the toothed sections and adapted to be engaged successively by the plain concentric locking face of the pinion, the relative size and construction of this pinion and gear wheel being such that the gear wheel is turned one-quarter of a rotation by the pinion during each complete rotation of the latter and the rotatable carrier is held at rest after each quarter step forward to permit of performing the successive operations of feeding a head to the carrier, carrying the head to the previously assembled flange and binder, assembling the head, binder and web, and ejecting the completed box in the manner to be hereinafter described.

An additional locking mechanism is preferably provided for holding the form carrier accurately in place while at rest which mechanism, as shown in Figs. 4 and 5, preferably consists of a locking lever 215 pivoted on the frame and provided on one of its arms with a pawl 216 which is adapted to engage with the teeth of the mutilated gear wheel 214 and a locking cam 216' formed on or secured to the mutilated pinion 213 and engaging with the other arm of the locking lever. The cam 216' is so formed that it turns the locking lever and disengages its pawl from the teeth of the gear wheel 214 just before the latter begins each step of its movement and again engages said pawl with said wheel after the same has completed each step.

At its outer end each carrier arm is provided with a blank shaping device comprising a form, former, mandrel or block 217 which in the present embodiment is of angular preferably rectangular shape and upon which the head, flange and binder of a box are assembled and connected. Each former preferably has a stop, or shoulder, 217'. These formers are preferably constructed to serve as a pneumatic gripper whereby the heads of the boxes are attached thereto, for which purpose each former has an outer flat face 218 disposed transversely of those faces of the former inclosed by the folded composite blank, as will appear, said face 218 being arranged tangentially to the axis of the rotatable carrier and provided with a plurality of air-exhausting grooves 219 which are connected with a branch exhaust passage 220 arranged radially in the respective carrier arm and which at intervals is energized or deënergized by being connected with an air exhausting device so as to cause a box head when placed on the grooved face of the former to be firmly held in engagement therewith by air pressure or to be released therefrom. Each of the formers is carried into a position in rear of the head magazine at the same time that a box-head is being discharged from the magazine, whereby this head is delivered on top of the respective former which at this time has its face arranged uppermost. Immediately after the head has been thus delivered upon the former from the magazine, the air grooves of the former and its respective branch passage are connected with the air exhaust device, causing the box-head to become pneumatically attached to the gripping face of the former. The air cavities of the former are thus connected with the exhausting device while this former is momentarily at rest in rear of the head-magazine, and remains thus connected with the air exhaust device during about two-thirds of its subsequent rotation with the rotatable carrier, so as to firmly retain a grip upon the head while presenting the same to the mechanisms which supply the flange and binder and adhesively connect these last-mentioned parts with the head. After the assembling of the head, flange and binder, as well as the relative folding and adhesive connection between the same, has been effected for completing the box, the communication between the respective former and the air exhausting device is cut off and the cavities and passages still communicating with the former are connected with the atmosphere so as to vent the same and break any partial vacuum which may exist therein, so as to subsequently permit the finished box to be easily removed from the former.

The mechanism whereby the exhausting of the air from the former and the venting of the same is effected in the manner described is best shown in Figs. 11, 27, 28 and 30 and is constructed and operated as follows: 221 represents an operating disk or frame which oscillates concentrically with the rotatable form carrier and is preferably journaled upon the shaft of this carrier, as shown in Figs. 23, 24 and 26. The oscillating movement of this operating disk in a forward direction is produced by means of an upright connecting rod 222 which is connected at its upper end with a forwardly-projecting arm 223 on the operating disk while its lower end is connected with the front arm of a lower rock lever 224 pivoted on the adjacent part of the frame, and a cam 225 secured to the upper countershaft and engaging with the rear arm of the rock lever, as shown in Figs. 28–30. The backward movement of the operating disk is produced by means of gravity aided by a spring 226 which connects the front arm of the rock lever 224 with an adjacent stationary part of the machine, as shown in Fig. 1. 227 represents an oscillating air valve which controls the connection between the air conduits of the pneumatic gripping formers and the exhaust device and also between said conduits and the outer atmosphere. This valve preferably has the form of a disk, as shown in Fig. 26, and is arranged between the right hand side of the hub of the rotatable form-carrier and the adjacent left-hand side of the operating disk, as shown in Figs. 23 and 24. The air valve is compelled to turn with the operating disk but is capable of axial or longitudinal movement relatively thereto, so that it may be held firmly in engagement with the hub of the form carrier, this connection being preferably effected by means of one or more coupling pins 228 secured to the marginal portion of the air valve parallel with the axis of the rotatable form carrier and working freely in sockets 229 in the opposing face of the operating disk, as shown in Figs. 24 and 26. The air valve is yieldingly pressed against the hub of the form carrier, so as to form an air-tight joint therewith, this pressure being preferably effected by means of one or more springs 230 seated in pockets 231 on the left hand side of the operating disk and bearing against the back or right hand side of the air valve, as shown in Figs. 24 and 26. On its front side or left-hand face the air valve is provided with a segmental cavity or air space 232 the upper or front end of which is located vertically in line or nearly so with the axis of the form carrier, while its lower or rear end terminates at about two-thirds of a circle from the front end thereof, as shown in Fig. 26. On the right hand side of the hub of the form-carrier, the same is provided with four equidistantly arranged air ports 233 which are adapted to sweep over the air exhaust cavity of the air-valve by reason of the fact that they are arranged the same distance from the center of rotation of the form carrier as said exhaust cavity. Each of these ports forms the inner end of one of the branch air passages of the form-carrier and when the same is in communication with the exhaust cavity of the air valve, the air in the respective form is exhausted and the head which has been fed upon the face of the same becomes attached thereto by atmospheric pressure. At its periphery the air-valve is provided with an exhaust-pipe or conduit 234 which communicates at its inner end with the exhaust-cavity, as shown in Figs. 23 and 26, while its outer end is connected with an air exhausting device of any suitable kind. The connection between the exhaust pipe 234 and the air exhausting device is of flexible nature so as to permit the air valve to oscillate within certain limits without disturbing the air connection between the same and the air exhausting device. As each former moves toward its uppermost position in rear of the head-magazine for receiving a head therefrom, the air exhausting device is cut off therefrom by reason of its port 233 being at this time closed or covered by the solid portion of the air valve in advance of its front end, whereby interference with the proper delivery of the box-head to the respective former by air pressure is avoided. But immediately after the former comes to rest in its uppermost position in which the head has been properly delivered thereto, the air valve is turned forwardly by the cam 225 a sufficient extent to bring the front end of its segmental cavity into register with the port 233 of the respective former, thereby causing the air to be exhausted from the latter and the head to be firmly held against the face thereof by air pressure. As the former which has just received a box-head and been connected with the air exhausting device is advanced another step, the air valve also moves in the same measure in the same direction until it reaches the position in which the solid portion of its face immediately in advance of its front end again assumes a position in which it will close the port 233 of the next following former, when the latter moves toward its uppermost position preparatory to receiving and grasping a box-head. Although the air valve returns into its rearward position the connection between its cavity and the port 233 of the preceding former remains connected owing to the segmental form of the valve cavity until this port reaches the rear end of this cavity at which time said port is covered by the solid portion of the face of the valve at the rear end of the cavity, thereby cutting off this former from the air exhausting device and releasing its pneumatic grip upon the box head. This release occurs after the flange and binder have been folded around the edge of the box head, the scarfed ends of the flange have been connected, and the rear edge portions of the binder have been turned against the outer side of the box head and pasted thereto. After the air exhausting device has been thus cut off from the former, the port 233 of the latter during its continued movement in the same direction is brought into register with a vent port 235 formed in the face of the air valve between the front and rear ends of its exhaust device cavity and leading to the atmosphere.

As the port 233 of the former during its continued forward movement is brought into register with the vent port of the air valve, the air passages of the former are placed in communication with the atmosphere, thereby breaking any partial vacuum which may still exist in the same and permit the completed box to be easily removed from the former. This venting of the former occurs as the same completes that step of its movement which brings it to the foremost position horizontally in line with the axis of the form-carrier where it remains momentarily at rest to permit the ejecting devices to perform the operation of removing the finished box from the former.

As the box-heads are fed from the lower end of the stack in the magazine, the same are guided and pressed downwardly against the face of the former which at this time is moving into position in rear of the outlet of the magazine for receiving the same, thereby insuring reliable attachment of this head to the former by means of the external air pressure which is produced by connecting the air passages of this former with the air exhausting device immediately after the former comes to rest in rear of the magazine outlet. The preferred form of guiding and pressing device for this purpose which is shown in Figs. 2, 4, 11, 12 and 23, consists of a horizontal presser roller 236 arranged transversely in rear of the outlet of the magazine with its lower part in the path of the head which is being discharged from the magazine, two vertically-movable rods 237 which carry opposite ends of the pivot of the presser roller, upright guides 238 for said rods mounted on the adjacent stationary part of the machine, springs 239 arranged in pockets within said guides and each engaging at its upper end with the bottom of said pocket and at its lower end with a shoulder on the respective guide rod for yieldingly holding the guiding and pressing roller in its lowered position, and an adjustable stop 240 for limiting the downward movement of each guide rod consisting preferably of a screw nut applied to the upper threaded end of said rod and adapted to bear against the upper end of the respective guide. As the lowermost head of the stack is discharged rearwardly from the magazine, its front edge engages with the underside of the guiding and pressing roller 236 and is directed downwardly by the same against the face of the former below the same, the head when first contacting with the former, being at an angle to the pneumatic face of the former, as clearly appears in Fig. 12, and thereafter assuming a position so as to be pneumatically gripped thereto, as by being parallel with said face. When the paper or stock from which the head is made is comparatively thin and straight, one of such guiding and pressing rollers will suffice to properly direct the heads against the faces of the formers and cause the same to adhere thereto, but when the stock from which the heads are made is comparatively thick and uneven, it is desirable to employ more than one of such guiding and pressing rollers, so as to insure proper attachment of the same to the formers, and to permit of using more than one such rollers a plurality of pairs of guide rods and associated spring and guides are provided upon which extra pressing rollers may be mounted one behind the other, two of such extra supporting devices being shown in the drawings one in front and one in rear of the guiding and pressing roller and its supporting devices which have just been described. For the purpose of preventing lateral displacement of the box heads while being fed from the magazine to the formers, two side guides 241, 241 are provided the same being arranged on opposite sides of the path of the heads in rear of the magazine in position to be engaged by the lateral edges of the box heads and supported on the adjacent stationary part of the machine, as shown in Figs. 12 and 23.

As each box-head is fed from the magazine upon the face of a former, the front edge thereof engages with a stop or gage at the front edge or side of the respective former, which gage also forms part of the mechanism whereby the central parts of the flange and binder are clamped against the front side of the form during the subsequent operation of assembling the head, flange and binder of the box. This gage mechanism, as shown in Figs. 2, 11, 12, 25 and 56 is preferably constructed as follows: 242 represents a front jaw arranged transversely at the front edge of each former and mounted on the outer arm of a rock lever 243 which is mounted on the adjacent part of the respective carrier arm so as to be capable of turning in a vertical plane on an axis parallel with that of the rotatable form carrier. Upon rocking the lever 243, the front jaw 242 is moved toward and from the front side of the former, and when this jaw engages with this side of the former the outer edge of the jaw projects outwardly beyond the face of the former, so as to operate as a gage or shoulder with which the front edge of the head engages while the same is being pushed from the bottom of the stack upon the former, as shown in Fig. 12. The front gage jaw is moved into this gaging position at this time by means of a transverse rock shaft 244 journaled in a bearing on the adjacent part of the respective carrier arm and provided with a gear segment 245 which meshes with a gear segment 246 on the inner arm of the rock lever 243, as shown in Fig. 12, and a rock arm 247 secured to the right hand end of the rock shaft 244 and engaging with a high face 248 of an annular or ring-shaped guide, track, or cam 249 secured to the adjacent inner or left-hand side of the operating disk, as shown in Figs. 11 and 25. As the form carrier advances a step, the free end of the rock arm 247 is carried over the following low face of the cam 249, thereby permitting the operating mechanism of the front jaw 242 to be turned in a reverse direction which causes this jaw to be moved forwardly or away from the front side of the former, this movement being effected by means of a spring 250 which is connected at one end with the carrier while its opposite end is connected with a rock arm 251 on the gear segment shaft 244, as shown in Figs. 1 and 2.

After a head has been fed from the magazine and attached to a former of the rotatable carrier in the manner described, the latter is advanced one step or quarter-rotation, so that this former is carried from a position in rear of the magazine to a position in front of the flange and binder assembling mechanism in which last-mentioned position it remains momentarily at rest with its face and the box-head attached thereto arranged vertically. As the respective former reaches this last-mentioned position, the box-head carried thereby is engaged at its lower or front longitudinal edge with the inner side of the central section of the box flange adjacent to its rear or lower edge, which latter together with its companion binder is at the same time moved forwardly by the transferring grippers in position to be thus engaged by the respective box-head, this movement of the grippers also serving to move the assembled strip out of the way of succeeding strips so as to provide space for the reception of the next succeeding strip. During the last portion of that step of the former in which it moves from the head-magazine to the flange and binder assembling mechanism, the rock arm 247 engages with another high face or part 252 of the cam 249, whereby the operating mechanism of the front jaw 242 causes the latter to be moved toward the opposing front side of the former and clamp the central sections of the flange and binder between this side of the respective former and its front jaw. The length of the high face 252 of the cam 249 is such that the front jaw 242 is held in this operative position and securely holds the binder and flange on the former in the proper position relatively to the head attached to this former during the subsequent operations of folding the flange and binder around the edges of the respective box-head and turning the lower or rear edge portions of the binder against the outer or underside of said head for completing the box, these operations being completed during the next following one-half rotation of the form-carrier and before the completed box reaches the foremost or front side of the carrier in position to be ejected from the former by the ejecting mechanism arranged on the front part of the machine.

While the former with the head attached thereto is moving from the magazine to the flange and binder assembling mechanism, the front jaw 242 is moved away from the adjacent front side of the former which permits this side of the former to engage with the flange held by the transferring grippers on the inner side of the central section of this flange in front of the rear or lower edge thereof. When the binder and flange have been moved from the severing and assembling mechanism forwardly into the path of the front side of the approaching former, the same remain momentarily at rest, this being effected by so constructing the cam 153 that the transfer grippers which carry the assembled flange and binder are arrested when they reach this position, thereby permitting the assembled flange and binder to be clamped in the proper position by the jaw 242 against the under or front side of the former. After the flange and binder has been thus transferred to the former, the transferring grippers are opened by the cam 165 and moved forwardly another step by the cam 153 which is of a sufficient distance to permit the jaws of these grippers to clear the respective flange and binder and permit the latter to be carried forwardly away with the associated box head to the following mechanism which completes the operation of making the box. After this particular former has moved downwardly and forwardly a sufficient distance to clear the path of the transfer grippers, the latter while in an open position are again moved backwardly by their operating mechanism and engage the front edges of the next following flange and binder which have been severed from their respective webs and assembled.

As the former moves from the flange and binder receiving position at the rear of the form-carrier, the flange and binder, or composite blank, are still in their straight condition and project with their opposite ends horizontally from opposite sides of the former and the head carried thereby, as shown by dotted lines in Fig. 50. As this former approaches the lowermost position of the form-carrier, a preliminary folding or bending of opposite ends of the flange and binder against opposite ends of the former is effected, this folding taking place on the scored or grooved lines which extend at an angle to that edge of the composite blank across which a portion of the cover or binder blank has been disposed, and after the former reaches the lowermost position and comes to rest with the box head thereon on the underside thereof and in a horizontal position, the bending or folding of the flange and binder around the former and on, that is relative to, the box head is completed, the plane of the folded flange and binder extending at an angle to the plane of the head, so as to form the sides of the box, and the turning of the rear edge-portions and the side edge-portions of the binder against the underside or outer side of the box head is effected. The mechanisms whereby these operations are performed are best shown in Figs. 1, 2, 11, 23 and 50-60, and are constructed as follows: 253 represents a pair of folding horns or deflecting-fingers which are arranged on opposite sides of the path of the end-portions of the flange and binder in advance of the position where the former comes to rest for completing the folding of the binder and flange. These horns or fingers are secured at their lower ends to the adjacent stationary part of the machine and are provided on opposing sides with inclined faces 254 which converge downwardly so that the ends of the flange and binder upon sweeping downwardly and forwardly past these fingers, engage with the inclined edges of the fingers and are turned into a position in which they project rearwardly on opposite sides of the respective former and substantially parallel relatively to each other, as shown by dotted lines in Fig. 53. The turning or bending of the binder and flange at this time takes place on the scores of the flange, or body blank and when thus bent the intermediate flange sections and the adjacent parts of the binder are arranged opposite the lateral sides of the former and the adjacent edges of the box-head. After the former comes to rest in its lower horizontal position, the folding of the intermediate sections of the flange and binder against opposite lateral sides of the former and the adjacent edges of the box-head is completed by mechanism which cooperates with the formers to fold the composite blanks in a plane parallel to that edge of the composite blank across which a portion of the binder or cover blank is disposed so that these portions or sections of the flange and binder are parallel and at right angles to the central or front flange section and engage on their inner sides adjacent to their inner edges with the respective lateral edges of the box-head on the former with the corners of the former preferably entering the grooves at the corners of the folded composite blank. The mechanism whereby this is accomplished consists of two side pressing or clamping jaws 255, 255 which are movable horizontally toward and from opposite lateral sides of the former when the latter is in position between the same, a pair of horizontally-swinging rock arms 256 upon the free rear ends of which the clamping and pressing jaws are loosely mounted, so as to permit the latter to have a slight swiveling or free movement independent of these arms and may adapt themselves to the side or intermediate flange-sections for pressing the same against the former boxhead, upright front rock shafts 257 journaled in suitable bearings on the frame on opposite sides of the path of the former adjacent to where the front corners of the former come to rest in the lowered position of the latter and each carrying at its upper end one of the rock arms 256, a lower rock arm 258 secured to the lower end of each rock shaft 257, upright rear rock shafts 259 journaled in bearings on the frame on opposite sides of the path of the former and adjacent to where the rear corners of the former come to rest in the lowermost position of the former, a link 260 connecting the lower arm of each front rock shaft with one arm of a rock lever 261 on the lower end of the rear rock shaft on the same lateral side of the path of the former, a pair of vertically-swinging rock levers 262 pivoted on the frame on opposite sides of the path of the former and each having its lower arm connected by a link 263 with the other arm of the rock lever 261 on the lower end of the rear rock shaft 259 on the same side of the path of the former, vertically-rotatable cams 264 each adapted to engage the upper arm of one of the rock levers 262 and arranged on opposite sides of the path of the former, a horizontal cam-shaft 265 journaled transversely in the adjacent stationary part of the machine and carrying the cams 264, and a gear pinion or wheel 266 secured to the cam-shaft 265 and meshing with a similar wheel 267 on the upper countershaft for transmitting movement from the main shaft to said cam shaft. This last mentioned gearing is best shown in Figs. 23, 55 and 59. While the former together with the box-head, flange and binder are carried into a position between the side clamping jaws 255, the latter are swung outwardly into a retracted position clear of said parts of the box and the former by springs 268 each of which is connected at one end with a stationary part of the machine and at its opposite end with the outer arm of the rock lever 261 on one of the rear upright rock shafts, as shown in Figs. 50, 51, 52, 57 and 60, which springs operate to move the parts which actuate the side clamping jaws in the direction opposite to that in which they are moved by the cams 264. After the box-head, flange and binder have come to rest between the side clamping jaws, the latter are moved inwardly for pressing the intermediate sections of the flange and binder against opposite sides of the former and box-head, as shown in full lines in Fig. 53, by engagement of the high faces of the cams 264 with the upper arms of the rock levers 262.

Immediately after the intermediate sections of the flange and the adjacent parts of the binder have been pressed against the sides of the former and box-head, the end sections of the same are turned inwardly or toward each other and against the back of the former and the rear edge of the box-head, so that these rear sections overlap each other with their beveled, or scarfed portions and are arranged parallel with the front wall of the box. This operation of folding or bending the rear sections of the flange and binder is effected by means of two rear folding and pressing jaws 269 which are mounted respectively on angular rear rock arms 720 arranged on the upper ends of the rear rock shafts 259. While the former together with the partially folded binder and flange are moved forwardly to their lowermost or folding position, the end folding or pressing jaws 269 are moved laterally out of the path of the former and the parts of the box mounted thereon, as shown in Fig. 50. After the former comes to rest between the side clamping or pressing jaws and the latter are pressed against opposite lateral sides of the same, the rear folding jaws also begin to swing inwardly toward each other and against the rear side of the former under the action of the same cams which operate the side pressing jaws, thereby causing the end sections of the flange to be swung toward each other and against the rear side of the former. When the rear folding jaws have completed this inward or folding movement, the same are arranged with their faces transversely in line and the rear sections of the flange have been pressed against the rear side of the former parallel with the front wall of the box, as shown in full lines in Fig. 53.

When this folding and pressing of these rear flange sections have been completed, the rear folding jaws are again swung laterally by the springs 268 together with the side clamping jaws into their retracted or inoperative position ready for operating upon the flange and binder of the next following partially completed box which is carried by the succeeding former. The relative timing of the cams 264 and the mechanism whereby the movement of the same is transmitted to the side and rear clamping jaws is such that the rear flange-section which has its scarf facing outwardly is folded against the former slightly in advance of the other end flange section which has its scarf facing inwardly in the folded position of the box, thereby avoiding interference between these flange-sections when folding them against the rear of the former.

Although these scarfed portions of the rear flange sections become adhesively connected when they are folded one over the other on account of the glue which has been previously deposited on the inwardly facing scarf by the dauber heretofore described, it is desirable to press them together for a sufficient time to permit the glue between the same to become set and reliably connect the same. The preferred means for this purpose are best shown in Figs. 1, 2, 11, 12, 25, 26 and 56 and are constructed as follows: 270 represents a central rear clamping or presser jaw which is mounted on the outer end of a rock arm 271 which is capable of swinging in a vertical plane for carrying the jaw thereof toward and from the rear side of the central portion of the former opposite which the scarf joint of the flange is located. This rock arm is secured to a horizontal rock shaft 272 which is journaled transversely in bearings on the respective carrier arm adjacent to the rear side of the former. The rocking movement of this rear clamping jaw is produced by means of a rock arm 273 secured to one end of the shaft 272 and engaging with a second guide, or track, preferably the high face or portion 274 of a cam which is formed on the operating disk, and operates to turn the same in the direction for moving the rear clamping jaw against the rear side of the former, and a spring 275 connected at one end with the form carrier and at its opposite end with another rock arm 276 on the shaft 272, as shown in Fig. 2. While the former is at rest in its lowermost position and in proper position relatively to the folding mechanism of the flange for effecting the operations of folding the flange above described, the operating disk is so turned that its high face 274 is disengaged from the actuating arm 273 whereby the respective spring 275 is permitted to hold the same in its retracted position while the side and end clamping jaws are performing their operations of clamping the flange against the former, and immediately after these last mentioned jaws have performed their clamping and folding operations the operating disk under the action of the cam 225 on the upper countershaft causes this disk to be turned sufficiently in the direction of the arrow in Fig. 26, so as to engage its high face 274 with the rock arm 273 and thereby turn the respective shaft in the direction for causing the rear clamping jaw to be moved from its retracted position into engagement with the overlapping scarfed portions of the rear flange sections lying against the rear side of the former, as shown in Figs. 11 and 56. While the operating disk is in this position in which it shifts the rear clamping jaw centrally against the rear side of the former, the form carrier moves forward another step and although this operating disk immediately thereafter returns to its former position, its cam face 274 is of such a length that it remains in engagement with the rock arm 273 and holds the rear clamping jaw 270 in its operative position against the rear side of the former during a considerable part of this step of the form-carrier, so as to hold the scarf joint of the flange pressed together and insure setting of the glue between the same. As shown in Figs. 25 and 26, this cam face 274 is of a length equal to about one-quarter of a circle and terminates at such a point that the rear clamping jaw 270 is released or withdrawn from the former before the latter reaches the end of this step, so as to leave the box free to be removed from the former by the ejecting mechanism which subsequently operates upon the same after the box reaches the end of this step of the form-carrier.

In order to permit the rear clamping jaw to adapt its flat face to the flat surface of the overlapping rear flange sections, this jaw is mounted loosely on its arm preferably by pivoting the same vertically thereto, as shown in Fig. 56. This jaw is retained approximately in its operative position on its supporting arm by means of a heel or shoulder 277 formed thereon on that side of its pivot opposite its face and adapted to engage with a coöperating shoulder or face on the adjacent part of its supporting arm, as shown in the last-mentioned figure. For the purpose of permitting accurate adjustment of the rear clamping jaw relatively to the former, the rock arm 271 supporting this jaw is preferably constructed of two sections one of which is secured to the rock shaft and carries an adjusting screw 279 bearing against the other section which is pivoted or mounted loosely on the rock shaft and carries the rear clamping jaw 270, as shown in Fig. 56. Movement around the rock shaft of the section carrying the jaw 270 is limited in one direction by a lug 271' on the section fixed to the rock shaft. Said lug also operates to positively move the jaw 270 with the section fixed to the rock shaft, when said jaw is to be removed from clamping position. Upon turning this adjusting screw forwardly or backwardly, the relation of the sections of the arm 271 may be adjusted relatively to each other for causing the rear clamping jaw to bear properly against the overlapping scarfed sections of the flange and insure a reliable adhesive connection between the same.

While the form is still in its lowermost position in which the flange and binder have been folded around the same and the box-head, the rear end portions of the binder and the side portions of the same are turned inwardly and upwardly against the under or outer side of the box-head and adhesively connected therewith. The turning and affixing of the rear edge portions of this binder is preferably effected first and the means for this purpose are best shown in Figs. 50–58 and 60 and constructed as follows: 280, 281 represent the upper and lower links of a vertically-swinging toggle lever which is arranged below the path of the box-former at the folding position of the latter, the lower link 281 being pivoted on an adjacent stationary part of the machine and the upper link 280 being pivoted at its lower end to the upper end of the lower link while its upper end is provided with an angular pressing jaw 282. The lower link of this toggle lever is yieldingly held in its rearward or retracted position by means of a spring 283 connecting the same with an adjacent stationary part of the machine and the upper link is turned at an angle to the lower link by means of a spring 284 mounted on the lower link and engaging with the upper link, so that the jaw of the upper link is below the path of the former, this movement of the upper link relatively to the lower link being limited by means of a stop 285 which is arranged on the front side of the lower link and engaged by the front side of the upper link, as shown in Fig. 57. The retracting movement of the lower link under the action of its spring 283 is limited by engagement of the rear side of this link with its stop 286 formed by the adjacent stationary part of the machine, as shown in the last-mentioned figure. Below its pivot the lower toggle-link is provided with a tail 287 which is adapted to be engaged by a rotatable cam 288 secured to the adjacent part of the cam-shaft 265. At or about the same time that the rear flange clamping jaw is moved toward the scarfed portion of the flange on the rear side of the former, the cam 288 by engaging its high face with the tail 287 of the lower toggle-link 281 causes the latter to be turned forwardly or upwardly together with the upper link carried thereby, during which upward movement the rear binder clamping jaw 282 is caused to engage its face with the downwardly-projecting rear edge portions of the binder and turn the same forwardly and upwardly against the underside of the box-head, as shown in Figs. 54 and 56. As the upper link moves toward the box-former, the flange or shoulder 289 at the rear edge of the face of the angular jaw engages with the rear side of the box-wall and arrests the further bodily movement of the upper link in this direction, whereby the continued forward movement of the rear toggle lever under the action of the cam 288 causes its toggle-links to straighten relatively to each other and press the face of the jaw 282 against the underside of the rear edge portions of the binder so that the same are firmly pressed against the underside of the head and become firmly attached thereto by means of the glue which has been previously applied to the binder in the manner heretofore described. When the links of the rear toggle lever have been thus straightened, the pivotal connection between the same is located at or near the dead center line relatively to the pivotal connection between the lower link and the stationary part of the machine, and therefore enables the cam 288 to exert a powerful pressure against the rear edges of the binder for reliably sealing or adhesively connecting the same with the box head. After the high part of the cam 288 has thus performed its operation, the toggle-links are again returned to their lowered or inoperative position by their springs. To permit of adjusting the rear central binder folding and clamping jaw, the lower toggle link 281 is preferably constructed in two sections one of which is formed integrally with or rigidly connected with the tail 287 while the other turns loosely on the lower pivot of the lower link and is provided with an adjusting screw 289' which bears against the lower section, as shown in Fig. 54. Upon turning the screw 289 backward or forward, the relation of the two sections of the lower toggle link may be adjusted so as to cause the throw of the cam 288 to engage the rear binder-clamping jaw at the proper time with the rear edge of the binder and with the desired pressure.

The central part of the shoulder on the rear binder pressing jaw is cut away so as to form a gap or clear space 278 as shown in Fig. 60, which space receives the rear flange clamping jaw 270 and permits the binder clamping jaw 282 to bear against the rear edge of the binder without interference with said rear flange clamping jaw.

The mechanism whereby the side portions of the attaching edge of the binder are folded against the underside of the box head is constructed as follows: Below the path of the former in the folding position thereof, and on opposite sides of this path, are arranged two transversely-swinging toggle-levers each of which consists of a lower toggle link 290 pivoted horizontally on the adjacent stationary part of the frame, and an upper toggle link 291 which is pivoted horizontally at its lower end to the upper end of the lower toggle-link 290 and provided at its upper end with an angular pressing, clamping or folding jaw 292. Each of the lower toggle links 290 is pivotally connected on its inner side with the upper end of an upright connecting rod 293 which latter has its lower end pivotally connected with the front end of a horizontal rock lever 294 which is pivoted at its rear end on the adjacent stationary part of the machine, so as to be capable of swinging vertically. The lower links of the side toggle levers are turned outwardly into their retracted or inoperative position indicated in Fig. 58, by means of springs 295 secured to the stationary part of the machine and bearing against the undersides of the horizontal rock lever 294, as shown in Figs. 54 and 57, and the upper links of the side toggle-levers are turned inwardly into a folded position relatively to their companion lower links by means of springs 296 which are preferably secured to the outer sides of the lower links and bear against the outer side of the companion upper links. The inward movement of the side toggle-levers for straightening the same and causing the jaws on their upper links to bear against the side edges of the binder and fold them against the underside of the box-head, is caused by two cams 297, 297, which are mounted on the cam-shaft 265 and each of which is adapted to engage with its respective rock lever 294. Each of the latter is preferably bifurcated and has its branches connected by a transverse pin 298 which serves as the bearing point with which the companion cam 297 engages for actuating this lever. The folding movement of the upper link of each side toggle-lever relatively to the companion lower link under the action of its spring 296 is limited by means of a stop 300 arranged on the lower link and adapted to be engaged by the inner side of the upper link, as shown in Fig. 58.

After the rear binder clamping jaw 282 has performed its operation, the side toggle-levers are swung upwardly and inwardly by their cams 297, thereby causing the jaws on the upper links of the side toggle levers to turn the side portions of the binder against the underside of the box-head. During the last portion of this upward movement of the side toggle levers, the shoulders 301 on the outer edge of the side presser and folding jaws engage with the outer sides of the box-walls on the former, thereby arresting the further bodily movement of the upper links of the side toggle levers and causing these toggles to become straightened, as shown in Fig. 55, whereby the faces of the jaws of the upper links are turned upwardly and press the respective portions of the binder with which they engage against the underside of the box-head, so that they become adhesively attached thereto by means of the glue thereon. When the high parts of the cams 297 clear the pins of the rock levers 294 the springs 295 operate to return the side toggle-levers to their retracted or inoperative position preparatory to acting upon the parts of the box on the next following former.

After the rear and side edge portions of the binder have been thus folded and adhesively attached to the underside of the box head, the respective former is advanced another step or quarter-turn and during this movement the front edge portion of the binder is turned against the underside of the box head for completing the box. The means for effecting the turning of this front or final portion of the binder consists of a transverse roller 302 which is yieldingly held in the path of the lower portion of the former and the parts of the box thereon, so that as the latter sweeps past this roller the same is deflected out of the path of the box and the front portion of the attaching edge of the binder is turned rearwardly against the underside of the box head, so that the same becomes adhesively connected therewith by the glue applied thereto, as shown in Fig. 57. The final pressing or folding roller 302 is thus yieldingly held in its operative position by means of two vertically swinging rock arms 303 which carry the folding pressing roller at their upper ends while their lower ends are pivoted on the adjacent stationary part of the machine, a spring 304 operating to move these arms and the roller mounted thereon upwardly and connected at its opposite ends with the adjacent stationary part of the machine and a cross bar 305 connecting the rock arms 303 and means for limiting the movement of said arms and roller under the action of the spring 304 consisting of a heel or shoulder 306 formed on one of the rock arms and engaging with a stop or shoulder 307 on the adjacent part of the stationary frame, as shown in Fig. 52. The roller 302 not only performs the function of folding and pressing the front attaching edge of the binder to the underside of the box-head but also serves to effect a final pressing of the side and rear edges of the binder against the box-head as the latter is carried past this roller, thereby insuring a reliable connection between the binder and the head.

When the former reaches the end of this step of its movement and arrives centrally on the front part of the machine with the face of the former in a vertical position, at which time the pneumatic grip of the former has been cut off from the air exhaust device and connected with the vent leading to the atmosphere, an ejecting device operates upon the completed box for removing the same from the former. The preferred form of this ejecting device is best shown in Figs. 1, 2, 4, 11 and 30 and is constructed as follows: 308 represents a vertically-swinging rock arm which is arranged above the position where the former comes to rest for ejecting the box therefrom and which is secured at its upper end to a horizontal rock shaft 314 which is journaled transversely in a bearing on the adjacent stationary part of the machine. At its lower end this rock arm has pivoted thereon a hook 309 which is capable of swinging vertically and which is yieldingly held in a depressed position by means of a spring 310 secured to the arm and bearing against the hook and which is limited in its downward movement by means of coöperating shoulders or stops 311 formed on the hook and rock arm, as shown in Fig. 11. After the former with the box thereon arrives at the discharging position relative movement between the former and the hook is effected to remove the box from the former, and preferably the rock arm 308 is swung rearwardly and the beveled underside of the bill of the hook rides over the top of the box during which movement the hook is deflected against the action of its spring and after the shoulder of the hook passes rearwardly beyond the rear edge of the box, the hook is depressed by its spring, so that it stands behind the rear edge of the box. During the subsequent forward stroke of the rock arm 308 the hook by engaging its shoulder with the rear edge of the box strips the same from the former and discharges the same upon the floor or into a suitable receptacle provided for this purpose. The forward movement of the ejector-hook for engaging with the completed box is effected by means of an upright link or connecting rod 312 which is connected at its upper end with a rock arm 313 secured to the ejector-shaft 314 while its lower end is connected with the front arm of a rock-lever 315 and a cam 316 mounted on the upper countershaft and engaging with the other arm of the last-mentioned rock lever. The backward movement of the ejector-hook is produced by means of a spring 317 connected at one end with a stationary part of the machine and at its opposite end with the front arm of the rock lever 315, as shown in Fig. 30.

After the completed box has been removed from the former at the front of the machine by the ejecting mechanism, the form-carrier is turned forward another step toward the box head feeding magazine preparatory to beginning another cycle of operations for assembling and connecting the head, flange and binder of the next box.

It will be noted that the several parts of the machine are so disposed that parts of the webs, i. e., the flanges and binders, after having been severed from their respective web supplies, are folded on lines extending substantially longitudinally of the webs; that is to say, the lines of fold in the sections which eventually become the upright corners of the flange are continuations of the folding lines of the webs when said sections are integral with said webs. This is particularly apparent in the flange web where the folding lines are positively determined by the longitudinal scores or grooves, which latter extend longitudinally of the web parallel with its line of feed. The width of the flange web is approximately the same as the peripheral extent of the folded flange, allowance being made for connecting the ends, as by the overlapping scarfed portions, although it is evident that the ends of the folded flange may be connected in any manner capable of maintaining the flange in folded condition.

Although various means may be employed for grooving, or scoring, and scarfing the flange web before the same is presented to the mechanism which cuts the same into strips and assembles the strips with the binders and heads of the boxes it is preferred to use for this purpose the mechanism which is shown in Figs. 74–88 and which is constructed as follows:—318 represents a horizontal arbor, shaft or mandrel which is journaled transversely on the rear frame section of the machine and upon which is mounted a roll 319 of flange-web. From this roll the flange-web is unwound from the rear side thereof and passes upwardly with its inner or front side over the rear side of a support 320 which is constructed in the form of an upright plate mounted on the rear frame section, thence forwardly over a take up device and thence downwardly between the presser rollers 65 and guide segments 55 preparatory to being fed to the mechanism which severs the same into strips and assembles the latter with the other parts of the boxes. The flange-web may be propelled upwardly along this supporting plate or table by various means but preferably by means of two feed rollers 321, 322 engaging with opposite sides of the central part thereof and mounted on transverse shafts 323, 324 which are journaled in bearings on the rear part of the frame section. These feed rollers are compelled to turn in unison by means of intermeshing gear wheels 325, 326 secured to corresponding ends thereof, as shown in Figs. 78 and 84, and motion is transmitted to these feed rollers from an over head driving-shaft 327 by means of a counter-shaft 328 provided with a pinion 329 at one end which meshes with a gear wheel 340 on one of the feed roller shafts, a short arbor or spindle 341 journaled transversely on the main frame parallel with the counter-shaft and provided with a pinion 342 which meshes with a gear wheel 343 on the counter-shaft and a belt 344 passing around a small cone pulley 345 on the short spindle and a large cone pulley 346 on the driving shaft. By shifting the belt 344 lengthwise on the driving shaft and engaging the same with corresponding higher or lower parts of the small and large cone pulleys the speed of the feed rollers 321, 322 may be so determined that the flange web is advanced at the same rate or approximately so as the flange web is propelled to the severing mechanism heretofore described.

In order to prevent the roll of flange-web from unwinding too freely a retarding or braking device is provided which preferably consists of one or more brake bands or straps 347 engaging with the front side of the roll of flange-web and connected at their upper ends with the adjacent part of the frame while their lower ends are provided with weights 348 whereby these weights, straps or bands are held frictionally in contact with the flange-web roll and prevent turning thereof except when the web is unwound therefrom by the action of the feed rollers 321, 322.

As the flange web passes upwardly along the supporting plate it is operated upon by the devices which produce the longitudinal scores 10 and 11 and the bevels or scarfs 12, 12 at opposite edges thereof. These scoring and scarfing operations may be effected either simultaneously or one after the other as desired but in the organization of the machine shown in Figs. 74–88 the flange-web during its upward movement is first subjected to the action of the devices which produce the outer or rear longitudinal scores 11, 11, then to the devices which produce the inner or front longitudinal scores 10 and then to the devices which produce the scarfs 12 at the opposite edges thereof. The scoring devices whereby the longitudinal scores or grooves are produced in the flange web preferably comprise a plurality of rotatable scoring wheels or disks 349, 350, 351, 352 which are constructed of emery carborundum or other abrasive material and each of which is provided with a comparatively narrow peripheral edge of convex form in cross section so that upon engaging the rear or outer side of the flange web a groove or score will be ground or cut in the latter as the same is moved past the scoring wheel, which groove is formed by actual removal of the stock or body of the flange-web and not by compression of the fibers thereof. As shown in Fig. 75 the two scoring wheels 349, 350 which produce the outer scores are arranged axially in line and spaced apart transversely of the body, or flange, web, and engage with the lower part of the flange web while the two scoring wheels 351, 352 which produce the inner scores are also arranged axially in line with each other but engage with the flange web above the outer scoring wheels, by which arrangement the scoring mechanism is distributed so as to permit of a more convenient construction and render the parts more easily accessible for adjustment, cleaning, inspection and repairing. Each of the scoring wheels is mounted on the inner end of a short transverse shaft 353 which is journaled horizontally parallel with the flat side of the flange-web in a bearing 354 on the adjacent part of the frame and is driven by means of a belt 355 passing around a large pulley 356 on the driving shaft and a small pulley 357 on the outer end of the scoring wheel shaft.

As the flange-web approaches the scoring wheels from the underside the same is guided so as to prevent lateral displacement thereof by means of two side guides or flanges 358 which engage with opposite edges of the flange web and each of which is mounted on a base plate 359 which is secured to the adjacent part of the main frame so as to be capable of transverse adjustment by means of bolts or screws 360 secured to the frame and passing through transverse slots in the base plates, as shown in Fig. 75. In rear of the outer side of the flange-web is arranged a guide rod 361 which rests with its opposite ends in openings formed in the outer parts of the guide flanges 358 and which holds the adjacent part of the flange-web in position between the side guides.

After the scoring wheels have operated upon the flange web and produced the longitudinal scores therein this web is trimmed off at its opposite longitudinal edges so that the strips cut therefrom will be of the proper length for association with the other parts of the boxes with which the same are subsequently assembled. This trimming is made necessary on account of the impracticability of making the web of the proper width in the first instance and it has therefore been found more convenient to make it somewhat wider than is necessary for producing the flange strips and to trim off this surplus before the web reaches the strips severing mechanism. This trimming mechanism is preferably located above the scoring wheels and consists of two pairs of rotatable cutting disks or wheels 362, 363 the members of each pair being arranged on opposite sides on the path of the flange-web and coöperating with each other to trim off one edge of the flange-web. These cutter disks are preferably operated by the same shafts which drive the feed rollers 321, 322, the cutters of both pairs on one side of the flange web being secured to the shaft of the feed roller on the corresponding side of the web and the two other disks of the cutters or trimming devices on the opposite side of the web being mounted on the shaft of the feed roller which is arranged on the other side of the flange web, as shown in Fig. 84.

The edge portions of the flange web upon being trimmed off by the cutters are preferably deflected outwardly or rearwardly from the machine so that they do not become mixed with the working parts of the machine and interfere with their operation. The preferred means for accomplishing this purpose consists of two upwardly and rearwardly curved deflecting plates 364 each of which is secured to the frame adjacent to one edge of the web and above the respective cutting disks adjacent to the same edge of the web, so that the same intercepts the trimming of the web and directs the same rearward from the cutters into a position where the same may be easily removed and disposed of without interfering with the machine.

After being thus trimmed the flange web is scarfed or beveled on its opposite sides and adjacent to its opposite edges by means of two scarfing devices which preferably comprise two scarfing wheels 365, 366 arranged respectively on opposite sides of the flange-web adjacent to opposite edges thereof and preferably constructed of emery, carborundum or other abrasive material, whereby these wheels upon engaging the flange-web grind off the stock or body of the flange-web at its edges. The axes of these scarfing wheels are preferably arranged parallel with the flat sides of the flange-web and the peripheries thereof are beveled to correspond with the angle which it is desired to give the bevels or scarfs on the web. While the flange-web is being operated upon by the left hand or rear scarf wheel 365 this web is supported by the adjacent flat side of the main supporting plate 320, but the other edge of the web while being operated upon by its scarfing wheels 366 on the opposite side of the web is supported during this operation on its rear side by means of an auxiliary supporting plate 367 which is secured by means of a bracket 368 on the rear side of the main supporting plate, an opening 369 being formed in the latter through which the right or front scarfing wheel projects rearwardly into engagement with the front side of the flange web, as shown in Figs. 76, 81 and 83. Each of the scarfing wheels is mounted on the inner end of a horizontal transverse shaft 370 which is journaled in a bearing 371 on the adjacent 130 part of the main frame and is driven from the overhead driving shaft by means of a belt 372 passing around a large pulley 373 secured to the main driving shaft and a small pulley 374 arranged on the outer end of the respective scarfing wheel shaft, as shown in Figs. 75, 77, 80 and 83.

For the purpose of permitting the scoring and scarfing wheels to be accurately adjusted to the proper position relatively to the flange-web for producing the scorings and the scarfings thereon at the proper places and also to permit of taking up the wear on these wheels, the bearing of the shaft of each of these wheels is mounted on the frame in such manner that the same is capable of adjustment toward and from the flat side of the flange-web and also in a direction parallel with this flat side. The preferred means for this purpose shown in the drawings consists in mounting each of these bearings on a slide 375 which is capable of moving horizontally lengthwise toward and from the face or flat side of the web and guided in a way 376 formed on a slide 377 which is capable of moving horizontally and transversely or parallel with the flat side of the web in a guideway 378 formed on the adjacent part of the main frame, as shown in Fig. 79. The longitudinally movable slide is adjusted on the companion transversely movable slide by means of a screw 379 working in a threaded opening in the longitudinally movable slide and journaled on the transversely movable slide so as to be held against axial movement, as shown in Fig. 88, whereby upon turning this screw the respective grinding wheel will be moved toward or from the flat face of the web. The transverse movement of the slide 377 in its way is effected by hand pressure and after adjustment the same is held in place by tightening one side 380 of this guideway which for this purpose is made separate from the frame and secured thereto by a clamping screw 381.

As the flange web passes upwardly beyond the scarfing devices the same is subjected to the action of a cleaning or a clearing device which operates to detach therefrom the particles of dust or fiber which have been ground off from the web by the action of the scoring and the scarfing wheels but still remain sticking or adhering thereto. This clearing device preferably consists of two horizontally vibrating or reciprocating brushes 382, 383 which engage their bristles respectively with opposite flat sides of the web above the scoring wheels, the rear brush 383 operating upon that side of the web which has the four scores and is scarfed at one edge and being comparatively long, so as to operate upon the scored and scarfed parts of the web on this side of the same, while the other brush 382 is comparatively short inasmuch as it engages with the other side of the web having only the scarf at one edge. These brushes may be supported in any suitable manner so that they are free to reciprocate transversely of the flat sides of the web, the means for this purpose shown in the drawings consisting of a guideway 384 formed in the frame and receiving the short front brush and a shelf 385 formed by the upper side of a suction head 386 and serving as a guide or support for the long rear brush. These clearing brushes may be operated by any suitable means but preferably by the means shown in Figs. 74, 75, 80 and 82 which consists of a vertically swinging rock lever 387 connected at its upper end by means of links 388 with the stocks of the clearing brushes, a cam 389 arranged on the counter-shaft 328 and engaging with the lower arm of the rock lever for turning the same in one direction, and a spring 390 connected with this lever and operating to turn the same in the opposite direction.

Means are provided for collecting the particles of stock or fiber which are removed from the flange-web in the form of dust by the scoring and scarfing wheels in order to prevent the same from becoming scattered over the machine and interfering with its operation and also vitiating the air in the room in which the machine is installed. For this purpose each of the scoring and scarfing wheels is inclosed by a hood 391 which is connected by means of a branch exhaust pipe 392 with a manifold exhaust pipe 393 from which the air is exhausted and discharged at any convenient place but preferably by means of a fan having the eye of its case 394 connected with the exhaust manifold and its blast or discharge nozzle opening into a filtering bag 395 constructed of woven fabric or similar material. As the blades 396 of this fan rotate the dust resulting from the grinding action of the scarfing and scoring wheels in forming the scarfs and grooves in the flange-web is drawn successively through the several hoods, branch pipes and exhaust manifold into the fan case and delivered from the latter into the filtering bag, the air passing through the meshes of the bag to the external atmosphere freed from the dust while the latter remains within the bag and is emptied therefrom when the same becomes sufficiently filled. The blades of the fan may be rotated in any suitable manner for instance by means of a belt 397 passing around a large pulley 398 on the driving shaft and a small pulley 399 on the fan shaft, as shown in Fig. 77. To permit of inspecting each of the scarfing and scoring wheels and also to permit of removing the same from its shaft when worn out and replacing the same by a new one without necessitating dismembering of the machine, each of the hoods is composed of a fixed section and movable section 400, the latter being connected with the fixed section preferably by pivoting the same at its lower end to the fixed section and detachably connecting its upper end with the fixed section by a fastening device of any suitable construction. Upon opening the movable hood section the respective wheel therein may be inspected or replaced by another wheel through this opening if necessary.

The dust which is removed from the web by the clearing brushes is in like manner drawn off by means of the exhaust device and separated in the filter bag from the air by means of the suction head 386 which supports the long rear brush and has its mouth arranged close to the rear face of the web adjacent to the bristles of these brushes and is connected centrally by a branch exhaust pipe 401 with the exhaust manifold, as shown in Figs. 75, 81, 82 and 83.

In order to permit of removing any dust which may accumulate in the exhaust manifold that end of the same opposite the exhaust fan is provided with a removable cover 419, as shown in Fig. 87, which affords access to the interior of this manifold for this purpose.

It has been found in practice that when the glue for uniting the scarfed ends of the flange strips is applied thereto immediately before these edges are lapped one over the other that the same do not reliably stick to each other and that this difficulty is overcome by applying the glue to these scarfed edges a sufficient length of time before the scarfed joint is formed to enable the glue to become partly dried or tacky. As has been heretofore described the dauber 176 applies the glue to that scarf of the flange web which faces upwardly upon approaching the flange severing device and that the web is dragged passed this dauber while the latter is in engagement with this upwardly facing scarf of the web, whereby the glue on this scarf is rubbed into the pores of the web lengthwise thereof a distance equal to the width of several flange strips, thereby enabling the glue to obtain a firm hold on this scarf and become somewhat tacky before the scarfed joint is produced between the ends of the flange strip. On account of the scarf on the opposite or right hand side of the web facing downwardly while approaching the flange severing mechanism it is inconvenient to apply the glue to this scarf at this place in preparation for its union with the other scarfed edge of the web. The coating of this scarfed edge with glue is therefore effected at a more convenient place before the web reaches the flange severing mechanism and the feeding device associated therewith which place is preferably so situated as will enable the glue applied thereto to become dry or nearly so before reaching the flange severing mechanism, whereby this gluing of the right hand scarf of the flange operates as a sizing therefore and causes the same to become firmly united with the left hand scarf of the flange strip which has been coated with glue at a later period and is still sufficiently moist or tacky to permit of forming a reliable joint between the scarfed ends of the flange strip. The gluing or sizing device for coating the right hand scarf of the flange web is preferably located on the rear frame section above the clearing brushes so as to give the glue applied thereto ample time to dry or become set. This gluing device is best shown in Figs. 74, 75, 77, 80 and 81 and is constructed as follows: 403 indicates a tank or pot arranged upon the upper part of the rear frame section adjacent to the right hand edge of the flange-web and adapted to contain a bath of liquid glue which is retained in a fluid condition by a heating device which preferably consists of a jacket 404 which is arranged below the tank and through which a heating medium is circulated such as hot water or steam. Above this tank is arranged a horizontal transverse shaft 405 which is journaled in stationary bearings on the adjacent part of the machine and is rotated by means of a belt 406 passing pulleys 407, 408 secured respectively to the counter-shaft 328 and the shaft of the glue pot.

409 represents a rotatable arm secured to the shaft 405 above the glue tank or pot and 410 is a lever pivoted on the arm and provided at its outer end with a rotatable roller or dauber 411 while its opposite end is connected with the arm by means of a spring 412 so as to yieldingly turn the lever in the direction for holding the dauber in its outermost position relatively to the arm. As the shaft 405 rotates the dauber 411 is moved successively through the glue in the pot and against the adjacent scarfed right edge of the flange-web, whereby glue is picked up from the tank intermittently and deposited upon this scarf. The web is held in place while the dauber is engaging with the left scarf thereof by means of a support 420 arranged in rear of the left edge of the web in line with the place of contact of the dauber 411, as shown in Figs. 75, 77 and 81. The glue deposited upon this scarf of the flange-web is comparatively thin so that is soaks into the fibers of the web and becomes dry quickly and merely operates as a sizing for subsequently insuring its firm adhesion to the other scarfed edge of the web which has been coated with glue later. In order to cause the scarfed joints when folded against each other to become firmly united the glue in the tank of the second or later gluing device is made considerably thicker or of a greater adhesive capacity than the glue in the first tank, this being necessary inasmuch as this second application of glue is principally relied upon for uniting the scarfed joint of the flange strips.

In order to give the glue applied to the right hand scarf ample time to set before the flange-web reaches the flange severing mechanism a gap is provided between the first gluing device and the flange severing mechanism through which the flange-web moves idly and while moving through this gap the flange-web is comparatively slack. This slack portion of the flange-web avoids the necessity of operating the scoring and scarfing mechanism in exact unison with the flange severing mechanism which otherwise would be difficult to maintain with precision on account of atmospheric and other conditions which affect the material or stock of the flange-web because a considerable portion of the same is exposed between the time that it is scored and scarfed and the time that it is operated upon by the flange severing mechanism.

In order to properly support this slack portion of the flange-web as it varies in length a take-up device is provided which comprises a roller 413 which supports the web between the first gluing device and the cutter feed mechanism and it is made vertically adjustable so that the same may be raised or lowered according to the amount of slack in the web. The preferred means for this purpose comprise a pair of counter-balancing ropes or cords 414 which pass with their upper intermediate portions over elevated supporting rollers 415 and are connected at their inner ends with opposite ends of a rod 416 upon which the take-up roller is journaled while their outer ends are provided with counter-balancing weights 417, as shown in Figs. 75 and 77. Upon raising or lowering these weights the take-up roller is caused to rise and fall in the same measure for adapting the same to the amount of slack in the flange web. During this upward and downward movement of the take-up roller the same is prevented from assuming an angular position relatively to the flange-web by means of stationary upright guide rods 418 which are arranged on opposite sides of the path of the web and are engaged on their corresponding sides by the opposite ends of the horizontal rod which carries the take-up roller.

The herein described construction will be found to be specially efficacious in the automatic production of small paper boxes of rectangular shape, and the primary object of the invention is the automatic production of such boxes, including the assembly of heads with the flanges and binders. It will be perceived, however, that certain parts of the machine automatically coöperate to produce elementary blanks which, by certain other coöperative parts of the machine, are further acted upon and placed in condition to form more finished elements of a complete box. This is noticeably a function of that part of the machine which assembles flanges and binders in blank form and before the folding of such blanks. The binder web not only provides thin paper blanks, portions of which are utilized to attach the heads to the folded flanges and binders, but may be of a finishing character, furnishing a cover blank for the flange or body blank, so that in the event that the assembled cover blanks and body blanks are to be utilized as box elements other than flanges, this machine offers a mechanism for making such blanks. Under such circumstances the two webs would be more accurately denominated a body web and a cover web, respectively; and the respective blanks therefrom, cover blanks and body blanks.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

I claim as my invention:

1. A machine for making boxes having a head, a flange around the head and a binder connecting the head and flange comprising means for supplying a flange web, means for supplying a binder web and assembling the same with said flange web, means for successively severing strips from said flange web to form flanges for the boxes, means for successively severing strips from said binder web to form the binders for the boxes, and means adapted to cause movement of the severed strips so as to provide space for the reception of succeeding strips.

2. A machine for making boxes having a head, a flange around the head and a binder connecting the head and flange, comprising means for supplying a flange web, means for supplying a binder web and assembling the same with said flange web, means for successively severing strips from said flange web to form flanges for the boxes, means for successively severing strips from said binder web to form the binders for the boxes, and means for supplying the heads and assembling the same with said flanges and binders.

3. A machine for making boxes having a head, a flange around the head, and a binder adhesively connected with said head and flange, comprising means for supplying a flange web, means for supplying a binder web and adhesively assembling the same with said flange web, means for successively severing strips from said flange web to form the flanges for the boxes, means for successively severing strips from said binder web to form the binders for the boxes, and means adapted to cause movement of the severed strips so as to provide space for the reception of succeeding strips.

4. A machine for making boxes having a head, a flange around the head, and a binder adhesively connected with said head and flange, comprising means for supplying a flange web, means for supplying a binder web and adhesively assembling the same with said flange web, means for successively severing strips from said flange web to form the flanges for the boxes, means for successively severing strips from said binder web to form the binders for the boxes, and means for successively supplying the heads and assembling the same with said flanges and binders.

5. A machine for making boxes having a head, a flange around the head, and a binder adhesively connected with said head and flange, comprising means for supplying a flange web, means for supplying a binder web and adhesively assembling the same with said flange web, means for severing strips from the flange web after the latter has been assembled with said binder web to form a flange for a box, means for shifting the severed flange and the binder web attached thereto so that the flange is separated from the flange web and the binder web trails in rear of the flange, means for severing strips from the binder web at a distance in rear of the flange, and means adapted to cause further movement of the severed strips so as to provide space for the reception of succeeding strips.

6. A machine for making boxes having a head, a flange around the head, and a binder adhesively connected with said head and flange, comprising means for supplying a flange web, means for supplying a binder web and adhesively assembling the same with said flange web, means for severing strips from the flange web after the latter has been assembled with said binder web to form a flange for a box, means for shifting the severed flange and the binder web attached thereto so that the flange is separated from the flange web and the binder web trails in rear of the flange, and means for severing strips from the binder web at a distance in rear of the flange to form a binder which has a rear attaching edge, and means for assembling a head with said flange and binder and securing the latter at its rear edge to the outer side of the head.

7. A machine for making boxes having a head, a flange around the head, and a binder adhesively connected with said head and flange, comprising means for supplying a flange web, means for supplying a binder web and adhesively assembling the same with said flange web, means for severing strips from the flange web after the latter has been assembled with said binder web to form a flange for a box, means for shifting the severed flange and he binder web attached thereto so that the flange is separated from the flange web and the binder web trails in rear of the flange, and means for severing strips from the binder web between the rear edge of the flange and the front edge of the flange web forming a binder having front and rear attaching edges, means for folding the front edge of said binder around the front edge of the flange, means for assembling a head with said flange and binder, means for folding said flange and binder around the edge of said head, and means for attaching the rear edge of the binder to the outer side of the head.

8. In an apparatus of the character described, in combination, means for feeding a plurality of webs and assembling portions thereof so that the front end of one projects beyond the front end of the other, means adapted to provide one of said webs with adhesive on the face adjacent the other web, and means adapted to fold the projecting end onto the front end of the other web and adhesively secure the same thereto.

9. In an apparatus of the character described, in combination, means for feeding a plurality of webs and assembling portions thereof so that the front end of one projects beyond the front end of the other, means adapted to provide one of said webs with adhesive on the face adjacent the other web, means adapted to fold the projecting end onto the front end of the other web and adhesively secure the same thereto, and means adapted to press the folded portions.

10. In an apparatus of the character described, in combination, means for feeding a plurality of webs and assembling portions thereof so that the front end of one projects beyond the front end of the other, means adapted to provide one of said webs with adhesive on the face adjacent the other web, and means adapted to fold the projecting end around the front end of the other web and adhesively secure the same thereto.

11. In an apparatus of the character described, in combination, means for feeding a plurality of webs and assembling portions thereof so that the front end of one projects beyond the front end of the other, means adapted to provide one of said webs with adhesive on the face adjacent the other web, means adapted to fold the projecting end around the front end of the other web and adhesively secure the same thereto, and means adapted to press the interfolded portions.

12. In an apparatus of the character described, in combination, a plurality of sources of continuous web supply, means adapted to feed the webs from said sources and assemble portions thereof so that the front end of one projects beyond the front end of the other, means adapted to provide one of said webs with adhesive on the face adjacent the other, means adapted to fold the projecting end onto the front end of the other web and adhesively secure the same thereto, and means adapted to sever the assembled portions from the respective webs after their assembly.

13. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, means adapted to sever the assembled portion from one web, means adapted to space the severed section from its web, and means adapted to feed said latter web into assembly position in contact with the other web.

14. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, means adapted to sever the assembled portion from one web, means adapted to move the severed section and the other web so as to space the section from its web and feed the other web, and means adapted to feed the web from which the section has been severed into assembly position in contact with the other web.

15. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, means adapted to sever the assembled portion from one web, means adapted to space the severed section from its web, means adapted to feed said latter web into assembly position in contact with the other web, and means adapted to sever the assembled portion from the latter web.

16. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, means adapted to sever the assembled portion from one web, means adapted to move the severed section and the other web so as to space the section from its web and feed the other web, means adapted to feed the web from which the section has been severed into assembly position in contact with the other web, and means adapted to sever the assembled portion from the latter web.

17. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, means adapted to sever the assembled portion from one web, means adapted to space the severed section from its web, means adapted to feed said latter web into assembly position in contact with the other web, and means adapted to sever the assembled portion from the latter web on a line between said section and its web.

18. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, comprising a translatable folder movable transversely of the plane of the assembled portions, means adapted to sever the assembled portion from one web, means adapted to space the severed section from its web, and means adapted to feed said latter web into assembly position in contact with the other web.

19. In an apparatus of the character described, in combination, means for supporting a plurality of webs and assembling portions thereof so that the front end of one projects beyond the front end of the other, means adapted to provide one of said webs with adhesive on the face adjacent the other, means adapted to fold the projecting end onto the front end of the other web and secure the same thereto, comprising a translatable folder movable transversely of the plane of the assembled portions and then longitudinally thereof to position opposite the webs, a presser element, means whereby the folder and the presser element are caused to press the folded parts therebetween means adapted to sever the assembled portion from one web, means adapted to space the severed section from its web, and means adapted to feed said latter web into assembly position in contact with the other web.

20. In an apparatus of the character described, in combination, a plurality of sources of continuous web supply, means adapted to feed the webs from said sources and assembled portions thereof so that the front end of one projects beyond the front end of the other, means adapted to provide one of said webs with adhesive on the face adjacent the other, means adapted to fold the projecting end around the front end of the other web and adhesively secure the interfolded parts, means adapted to sever the assembled portion from one web after its assembly with the other web, means adapted to move the severed section and the other web so as to space the section from its web and feed the other web, and means adapted to feed the web from which the section has been severed into contact with the other web.

21. In an apparatus of the character described, in combination, a plurality of sources of continuous web supply, means adapted to feed the webs from said sources and assemble portions thereof so that the front end of one projects beyond the front end of the other, means adapted to provide one of said webs with adhesive on the face adjacent the other, means adapted to fold the projecting end around the front end of the other web and adhesively secure the interfolded parts, means adapted to sever the assembled portion from one web after its assembly with the other web, means adapted to move the severed section and the other web so as to space the section from its web and feed the other web, means adapted to feed the web from which the section has been severed into contact with the other web, and means adapted to sever the assembled portions from the latter web.

22. In an apparatus of the character described, in combination, a plurality of sources of continuous web supply, means adapted to feed the webs from said sources and assemble portions thereof so that the front end of one projects beyond the front end of the other, means adapted to provide one of said webs with adhesive on the face adjacent the other, means adapted to fold the projecting end around the front end of the other web and adhesively secure the interfolded parts, means adapted to sever the assembled portion from one web after its assembly with the other web, means adapted to move the severed section and the other web so as to space the section from its web and feed the other web, means adapted to feed the web from which the section has been severed into contact with the other web, and means adapted to sever the assembled portions from the latter web on a line between said section and its web.

23. In an apparatus of the character described, in combination, a plurality of sources of continuous web supply, means adapted to feed the webs from said sources and assemble portions thereof so that the front end of one projects beyond the front end of the other, means adapted to provide one of said webs with adhesive on the face adjacent the other, means adapted to fold the projecting end around the front end of the other web and adhesively secure and press the interfolded parts, means adapted to sever the assembled portion from one web after its assembly with the other web, means adapted to move the severed section and the other web so as to space the section from its web and feed the other web, and means adapted to feed the web from which the section has been severed into contact with the other web.

24. In a device of the character described, in combination, a plurality of sources of continuous web supply, means for supporting said webs in position so that the end of one projects beyond the end of another, and means for folding the projecting end around the end of the other.

25. A box machine comprising, in combination, a source of continuous flange web supply, a source of continuous binder web supply, means for feeding said flange web, means for feeding said binder web and assembling the same with the flange web so that the front end of the binder web projects beyond the front end of the flange web, means for folding the front end of the binder web around the front end of the flange web, and means adapted to independently sever the assembled portions from the respective webs after their assembly.

26. In an apparatus of the character described, in combination, a plurality of sources of continuous web supply, means adapted to feed a web from one of said sources into assembly relation with a web from the other source, means adapted to fold the front end of one web over the front end of the other web, and means adapted to feed the web from the other source comprising mechanism adapted to grasp the assembled webs.

27. In an apparatus of the character described, in combination, a plurality of sources of continuous web supply, means adapted to feed a web from one of said sources into assembly relation with a web from the other source, means adapted to fold the front end of one web over the front end of the other web, and means adapted to feed the web from the other source comprising a reciprocatory pair of grippers adapted to grasp the front end of the assembled webs.

28. In an apparatus of the character described, in combination, a plurality of sources of continuous web supply, means adapted to feed a web from one of said sources into assembly relation with a web from the other source, means adapted to fold the front end of one web over the front end of the other web, and means adapted to feed the web from the other source comprising a reciprocatory pair of grippers adapted to grasp the front end of the assembled webs, the grippers being spaced apart, and gripping the web at points within the edges of the webs.

29. In an apparatus of the character described, in combination, a plurality of sources of continuous web supply, means adapted to feed a web from one of said sources into assembly relation with a web from the other source, means adapted to fold the front end of one web over the front end of the other web, means adapted to sever the assembled portion from one web, gripper mechanism, and means adapted to cause the gripper mechanism to grasp and hold said web stationary while being severed.

30. In an apparatus of the character described, in combination, a plurality of sources of continuous web supply, means adapted to feed a web from one of said sources into assembly relation with a web from the other source, means adapted to fold the front end of one web over the front end of the other web, means adapted to sever the assembled portion from one web, gripper mechanism, means adapted to cause the gripper mechanism to grasp and hold said web stationary while being severed, means to operate the gripper mechanism to feed the severed section and the web assembled therewith a greater relative amount than the feed of the other web, and means adapted to sever the other web.

31. In an apparatus of the character described, in combination, means adapted to assemble portions of a plurality of webs, a folder, means adapted to move the folder transversely of the plane of the webs to fold the webs one on another, a plurality of formers movable in an endless path, a gripper, cutting mechanism adapted to sever the assembled portions of the webs from the webs, means adapted to cause the gripper to move the assembled sections into the path of the formers, and means adapted to hold the assembled sections on the formers.

32. In an apparatus of the character described, in combination, means adapted to assemble portions of a plurality of webs so that the front end of one projects beyond the front end of another, a folder, means adapted to move the folder transversely of the plane of the webs to fold the projecting end on the end of the other, a plurality of formers movable in an endless path, means adapted to move the formers so that they respectively remain at rest adjacent the assembled webs, mechanism adapted to sever the assembled portions of the webs from the webs, a gripper, means adapted to cause the gripper to grasp the folded portion of the webs and move the sections into the path of the formers, a clamping jaw carried by each former, and means to operate said jaws to clamp the sections to the former in position.

33. In an apparatus of the character described, in combination, means adapted to assemble portions of a plurality of webs so that the front end of one projects beyond the front end of the other, a combined folder and presser, means adapted to move the folder and presser transversely of the plane of the webs and longitudinally thereof to fold the projecting end over the end of the other web, a plurality of formers movable in an endless path, each former comprising a pivoted clamping jaw, means adapted to intermittently move the formers so that they successively come to rest adjacent the assembled portions of the webs, a reciprocatory gripper adapted to grip the folded portions of the webs and advance the same into the path of the former, cutting mechanism adapted to sever the assembled portions of the webs from the webs, means adapted to move the clamping jaw away from the former to provide a space for reception of the sections, and means adapted to cause said jaw to clamp the sections to the former while the former is at rest.

34. In an apparatus of the character described, in combination, means adapted to successively sever assembled portions from the ends of assembled webs, a folder movable transversely of the plane of the webs adapted to interfold the ends of the webs, a plurality of formers intermittently movable in an endless path transversely of the plane of said webs, mechanism adapted to grip the interfolded ends of the webs and transfer the assembled sections into the path of the formers, means whereby the formers are brought to rest in substantial contact with the sections carried by the gripping mechanism, means adapted to cause the gripping mechanism to release the sections, and means to hold the sections on the formers before the release of the gripping mechanism.

35. In an apparatus of the character described, in combination, means adapted to successively sever assembled portions from the ends of assembled webs, a folder movable transversely of the plane of the webs adapted to interfold the ends of the webs, a plurality of formers intermittently movable in an endless path transversely of the plane of said webs, a pair of reciprocatory grippers one on each side of the path of the formers, adapted to transfer the sections to the formers, and a clamp carried by each former to hold the sections thereon.

36. A box making machine, comprising means for feeding a flange web, means for feeding a binder web and assembling the same with the flange web so that the front end of the binder web projects beyond the front end of the flange web, and means for folding the front end of the binder web around the front end of the flange web, comprising a bar having a movement around the front edge of the flange web.

37. A box making machine, comprising means for feeding a flange web, means for feeding a binder web and assembling the same with the flange web so that the front end of the binder web projects beyond the front end of the flange web, means for folding the front end of the binder web around the front end of the flange web comprising a bar, and means for moving said bar across the front end of the flange web and then lengthwise of the same.

38. A box making machine, comprising means for feeding a flange web, means for feeding a binder web and assembling the same with the flange web so that the front end of the binder web projects beyond the front end of the flange web, means for folding the front end of the binder web around the front end of the flange web and also pressing together the folded part of the binder web and the flange web.

39. A box making machine, comprising means for feeding a flange web, means for feeding a binder web and assembling the same with the flange web so that the front end of the binder web projects beyond the front end of the flange web, means for folding the front end of the binder web around the front end of the flange web and also pressing together the folded part of the binder web and the flange web, comprising a combined folding and presser bar adapted to move around the front edge of the flange web to one side thereof for folding the binder web thereon, and a presser bar movable toward and from the opposite side of the flange web and the folded part of the binder web.

40. A box making machine, comprising means for feeding a flange web, means for feeding a binder web and assembling the same with the flange web so that the front end of the binder web projects beyond the front end of the flange web, means for folding the front end of the binder web around the front end of the flange web and also pressing together the folded part of the binder web and the flange web, comprising an upper folding and presser bar movable vertically across the front of the flange web and lengthwise over the top of the same, a lower presser bar movable toward and from the underside of the binder web in line with the combined folding and presser bar, means for raising and lowering said bars, and means for moving said bars lengthwise of said webs.

41. A box making machine, comprising means for feeding a flange web, means for feeding a binder web and assembling the same with the flange web so that the front end of the binder web projects beyond the front end of the flange web, means for folding the front end of the binder web around the front end of the flange web and also pressing together the folded part of the binder web and the flange web, comprising an upper folding and presser bar movable vertically across the front of the flange web and lengthwise over the top of the same, a lower presser bar movable toward and from the underside of the binder web in line with the combined folding and presser bar, means for raising and lowering said bars, means for moving said bars lengthwise of said webs, and means for limiting the upward movement of the upper bar with the lower bar.

42. A box making machine, comprising means for feeding a flange web, means for feeding a binder web and assembling the same with the flange web so that the front end of the binder web projects beyond the front end of the flange web, means for folding the front end of the binder web around the front end of the flange web and also pressing together the folded part of the binder web and the flange web, comprising an upper folding and presser bar movable vertically across the front of the flange web and lengthwise over the top of the same, a lower presser bar movable toward and from the underside of the binder web in line with the combined folding and presser bar, upright supporting arms carrying said lower bar, rock arms to which said supporting arms are pivoted, a spring for moving said lower bar rearwardly, a cam operating to move the lower bar forwardly, means for causing the upper bar to move horizontally with the lower bar, means for yieldingly holding the upper bar in its elevated position relatively to the lower bar, and a stop device which limits the upward movement of the upper bar and permits the lower bar to move upwardly independently of the upper bar.

43. In an apparatus of the character described, in combination, means adapted to support a plurality of assembled webs so that their ends project beyond the supporting means, one end extending beyond the other, and a cutter adapted to sever one web on a line outside the edge of said support.

44. In an apparatus of the character described, in combination, means adapted to support a plurality of assembled webs so that their ends project beyond the supporting means, one end extending beyond the other, a cutter adapted to sever one web on a line outside the edge of said support, and a second cutter adapted to sever the other web within said edge.

45. In an apparatus of the character described, in combination, a cutter, means adapted to feed a web relatively to said cutter, a second cutter spaced from the first, means adapted to feed a second web relatively to the second cutter, web guiding means adapted to assemble the ends of the webs as they are fed, means to alternately operate said cutters, and mechanism whereby said feeding means is caused to operate to feed said webs different amounts between the operations of the cutters.

46. In an apparatus of the character described, in combination, means adapted to support a plurality of webs so that their ends are assembled and project beyond the supporting means, one end extending beyond the other, and means adapted to alternately sever first one assembled portion and then the other from their respective webs.

47. In an apparatus of the character described, in combination, means adapted to support a plurality of webs so that their ends are assembled and project beyond the supporting means, one end extending beyond the other, means adapted to fold the projecting end of one web around the end of the other, and means adapted to alternately sever first one assembled portion and then the other from their respective webs.

48. In an apparatus of the character described, in combination, means adapted to support a plurality of webs so that their ends are assembled and project beyond the supporting means, one end extending beyond the other, a folding bar, means to move said bar to fold the projecting end of one web around the other, and means adapted to alternately sever first one assembled portion and then the other from their respective webs.

49. In an apparatus of the character described, in combination, means adapted to support a plurality of webs so that their ends are assembled and project beyond the supporting means, one end extending beyond the other, means adapted to alternately sever first one assembled portion and then the other from their respective webs, a folding bar comprising a cutter platen, means to move said bar against one web to support the same while being cut, and means to then move said bar to fold the projecting end of one web around the end of the other.

50. In an apparatus of the character described, in combination, means adapted to support a plurality of webs so that their ends are assembled and project beyond the supporting means, one end extending beyond the other, means adapted to alternately sever first one assembled portion and then the other from their respective webs, a folding bar comprising a cutter platen, means to move said bar against one web to support the same while being cut, means to then move said bar to fold the projecting end of one web around the end of the other, and a presser bar adapted to move toward and from said folding bar to press the folded parts.

51. A box making machine, comprising means for feeding a flange web, means for feeding a binder web and assembling the same with said flange web, a movable gripper adapted to engage the flange web and binder web, a cutter mechanism for severing the flange web in rear of the binder for forming a flange strip, means for moving said gripper forward with the binder web and flange strip after the latter has been severed from the flange web, and a cutter mechanism for severing the binder web in rear of the flange strip.

52. A box making machine, comprising means for feeding a flange web, means for feeding a binder web and assembling the same with said flange web, a movable gripper adapted to engage the flange web and binder web, a cutter mechanism for severing the flange web in rear of the binder for forming a flange strip, means for moving said gripper forward with the binder web and flange strip after the latter has been severed from the flange web, and a cutter mechanism for severing the binder web in rear of the flange strip, comprising a bar arranged below the binder web and a rotary cutter arranged above the binder web and movable transversely over the bar and across the binder web.

53. A box making machine, comprising means for feeding a flange web, means for feeding a binder web and assembling the same with said flange web, a movable gripper adapted to engage the flange web and binder web, a cutter mechanism for severing the flange web in rear of the binder for forming a flange strip, means for moving said gripper forward with the binder web and flange strip after the latter has been severed from the flange web, and a cutter mechanism for severing the binder web in rear of the flange strip, comprising a bar arranged below the binder web, a rotary cutter arranged above the binder web and movable transversely over the bar and across the binder web, a carriage supporting said rotary cutter, a rock lever connected with said carriage, a crank shaft having its crank connected with said lever, and means for intermittently rotating said crank shaft.

54. A box making machine, comprising means for feeding a flange web, means for feeding a binder web and assembling the same with said flange web, a movable gripper adapted to engage the flange web and binder web, a cutter mechanism for severing the flange web in rear of the binder for forming a flange strip, means for moving said gripper forward with the binder web and flange strip after the latter has been severed from the flange web, and means for folding the front end of the binder web around the front end of the flange web and severing the binder web in rear of the flange strip comprising a folding and cutter bar movable vertically and lengthwise relatively to the front ends of the flange web and binder web, and a transversely movable cutter adapted to move over the binder web and coöperate with said bar while the latter is below the binder web for severing the same.

55. In a device of the character described, in combination, a rocking support having a fixed gripper, and provided with a slot, a movable gripper having a guide engaging the slot, tension rods attached to the movable gripper and passing through the rocking support, springs coöperating with the tension rods to close the grippers, and means connected to the support to open the grippers.

56. A box making machine, comprising means for feeding a flange web, means for feeding a binder web and assembling the same with the flange web, cutting means for severing strips from the assembled parts of the flange web and binder web, and a carrying device whereby said strips are carried away from said cutting means.

57. A box making machine, comprising means for feeding a flange web, means for feeding a binder web, and assembling the same with the flange web, cutting means for severing strips from the assembled parts of the flange web and binder web, and a carrying device whereby said strips are carried away from said cutting means, comprising a gripper having a relatively stationary upper jaw, a rock arm carrying the upper jaw, and a lower jaw movable toward and from the upper jaw and guided on said arm.

58. A box making machine, comprising means for feeding a flange web, means for feeding a binder web and assembling the same with the flange web, cutting means for severing strips from the assembled parts of the flange web and binder web, and a carrying device whereby said strips are carried away from said cutting means comprising a gripper having a relatively stationary upper jaw, a rock arm carrying the upper jaw, a lower jaw movable toward and from the upper jaw and guided on said arm, and means for raising and lowering the lower jaw comprising a tension rod connected with said lower jaw, a spring operating to hold said rod yieldingly upward, a rock lever journaled at one side of the axis of said gripper rock arm, and a rock arm secured to said rock shaft and connected with said tension rod.

59. In a device of the character described, in combination, web feeding mechanisms, web severing mechanisms spaced apart, means to operate one of said severing mechanisms, means to subsequently operate the feeding mechanisms unequal amounts, means to subsequently operate another of the severing mechanisms, and means to cause said severing mechanisms to operate at different times.

60. In a device of the character described, in combination, means adapted to position webs in superposed relation comprising mechanisms to feed said webs, cutting mechanisms spaced apart in the line of movement of the webs and adapted to operate on said webs, means to operate one of said cutting mechanisms, means to subsequently operate the feeding mechanisms unequal amounts, means to subsequently operate another of the cutting mechanisms and means to cause said cutting mechanisms to operate at different times.

61. In a device of the character described, in combination, a plurality of severing mechanisms, a plurality of mechanisms adapted to feed a plurality of webs past said severing mechanisms, and means for causing the operation of the feeding mechanisms simultaneously, and the alternate operation of the severing mechanisms.

62. In a device of the character described, in combination, means to feed webs into assembled position, means to fold the end of one web around another, means to glue the folded portion to the part it surrounds, and means to sever the webs at unequal distances from the edge.

63. In a device of the character described, in combination, means to feed webs into assembled position, means to apply glue to one web, means to fold the end of one web around another and thereby secure the same together, and means to sever the webs at unequal distances from the assembled edge.

64. In a device of the character described, in combination, means to feed webs into superposed position, means to fold the end of one web around another, means to glue the folded portion to the part it surrounds, and means to sever the webs at unequal distances from the assembled edge.

65. In a device of the character described, in combination, means to feed webs into superposed position, means to provide the surface of one web with glue, means to fold the glued web around another and secure the ends together, and means to sever the webs at unequal distances from their assembled edges.

66. In a device of the character described, in combination, a plurality of web supply means, means to feed the webs into assembled position from the web supplies, means to fold the end of one web around another, means to glue the folded portions to the part it surrounds, and means to sever the webs at unequal distances from the edge.

67. In a device of the character described, in combination, a plurality of web supply means, means to feed the webs into superposed position, means to provide an inner surface of one of the webs with glue, means to fold the glued web around another, and means to sever the webs at unequal distances from the assembled edge.

68. In a device of the character described, in combination, a support movably mounted intermediate its ends, and having a glue carrier at one side of said mounting, a fixed guide adapted to coöperate with said arm at the other side of said mounting, and means for moving the support.

69. In a device of the character described, in combination, a support pivotally mounted intermediate its ends, and provided with a glue carrier and a roller at opposite sides of its pivot, respectively, a fixed guide coöperating with the roller and means to move the support.

70. In a device of the character described, in combination, a glue carrier, means to move the same, and guiding means therefor having a straight face terminating short of the extent of the path of movement.

71. In a device of the character described, in combination, a pivotally mounted glue carrier, means to translate the carrier, and guiding means for the carrier having a straight face terminating short of the extent of the path of movement.

72. In a device of the character described, in combination, a movable carriage, an arm pivotally connected thereto, a dauber on the arm, a fixed guide, and means whereby the arm is pressed against the guide in the movements of the carriage.

73. In a device of the character described, in combination, a movable carriage, an arm pivotally connected thereto, a dauber and a guide roller mounted respectively on opposite sides of the pivot, a guide with which the roller coöperates, said guide having a recess, and means for moving the carriage in relation to the guide.

74. In a device of the character described, in combination, a movable carriage, a support pivoted thereto intermediate its ends, a dauber and a guide roller on the support on opposite sides of the pivot, respectively, a guide with which the roller coöperates, said guide having a recess, and means for moving the carriage in relation to the guide.

75. In a device of the character described, in combination, a fixed guideway, a support slidable thereon, a rock arm on the support, a glue carrier on the arm, means for moving the support, and means for governing the movement of the rock arm.

76. In a device of the character described, in combination, a stationary support, a guide thereon, a slidable carriage, a glue carrier pivoted thereto, and adapted to contact the guide, means to move the carriage, and a spring to press the glue carrier against the guide.

77. In a device of the character described, in combination, a glue reservoir, a glue delivery roller, a supporting lever fulcrumed on the reservoir, a glue supply roller journaled in the supporting lever and means to move the supporting lever to adjust the rollers toward and from each other.

78. In a device of the character described, in combination, a glue reservoir, a glue delivery roller, spaced supporting levers, a glue supply roller journaled in the levers, an adjusting screw, and a cross bar engaged by the screw, and adapted to be moved to adjust the rollers toward and from each other.

79. In a device of the character described, in combination, a table, means for feeding a web on said table, a carriage adapted to reciprocate across said table, and provided with a glue carrier out of contact with said table, and means whereby the glue carrier is applied to the edge of the web.

80. In a device of the character described, in combination, a table, a guide, means for feeding a web along said table, a carriage adapted to reciprocate in said guide across said table, a rock arm carried by said carriage and provided with a glue carrier, and means to oscillate the rock arm to move the glue carrier into and out of contact with the web.

81. In a device of the character described, in combination, a table, a guide, means for feeding a web along said table, a carriage adapted to reciprocate in said guide across said table, a rock arm on said carriage, and provided with a glue carrier and a cam roller, and a cam track with which the cam roller coöperates, and whereby the glue carrier is caused to move into and out of contact with the web.

82. In a device of the character described in combination, means for applying glue to a web, means for feeding the web while applying glue thereto, and means for severing a plurality of glued strips between each application of glue.

83. In a device of the character described, in combination, a glue carrier, means for bringing the carrier into contact with a web, means for feeding the web while in contact, and means for severing a plurality of glued strips between each contact of the carrier with the web.

84. In a device of the character described, in combination, a reciprocating glue carrier, means for bringing the carrier into contact with a web, means for feeding the web while in contact, and means for severing a plurality of glued strips between each contact of the carrier with the web.

85. In a device of the character described, in combination, web feeding mechanism, a cutter adapted to reciprocate across the web in substantially the plane thereof, a glue carrier carried by the cutter, and means whereby the reciprocation of the cutter causes the glue carrier to move into and out of contact with the web.

86. A box making machine, comprising means for feeding a flange web, means for severing strips successively from the flange web comprising a movable blade and a stationary blade, and means for applying glue on the edge of the flange web, comprising a glue delivery roller arranged at the side of the path of said web, a dauber movable alternately into engagement with said delivery roller and the edge of said web, a glue supply roller coöperating with the delivery roller, a glue pot adapted to contain a supply of glue into which the supply roller dips, and means for turning said rollers and means for adjusting the stationary blade relatively to the movable blade.

87. A box making machine, comprising means for feeding a flange web, means for severing strips successively from the flange web, and means for applying glue on the edge of the flange web comprising a glue supplying device arranged at one side of the path of the web, and a dauber movable from said glue supplying device to the edge of said web.

88. A box making machine, comprising means for feeding a flange web, means for severing strips successively from the flange web, and means for applying glue on the edge of the flange web, a glue delivery roller arranged on one side of the path of the web, a transversely movable carriage, and a dauber mounted on the carriage and adapted to engage alternately with the delivery roller and the edge of the web.

89. A box making machine comprising means for feeding a flange web, means for severing strips successively from the flange web, and means for applying glue on the edge of the flange web comprising a glue delivery device arranged on one side of the path of the web, a dauber adapted to engage alternately with said glue delivery device and the edge of the web, and means for holding said dauber out of contact with intervening parts of the machine while the same moves toward and from the edge of the web and permits the dauber to engage with the edge of the web when the same reaches said edge.

90. A box machine, comprising means for feeding a flange web, means for severing strips successively from the flange web, and means for applying glue on the edge of the flange web comprising a transversely movable carriage, a glue delivery roller arranged on one side of the path of the web, a rock lever pivoted on said carriage, a dauber mounted on one arm of said lever and adapted to engage alternately with said delivery roller and the edge of said web, and a cam rail which is engaged by the opposite arm of the rock lever and which operates to turn the rock lever so as to hold the dauber out of contact with the intervening parts of the machine while moving toward and from the edge of the web and permits the dauber to engage the edge of the web when the same reaches said edge.

91. A box making machine, comprising means for feeding a flange web, means for severing strips successively from the flange web, and means for applying glue on the edge of the flange web comprising a glue delivery roller arranged at the side of the path of said web, a dauber movable alternately into engagement with said delivery roller and the edge of said web, a glue supply roller coöperating with the delivery roller, a glue pot adapted to contain a supply of glue into which the supply roller dips, and means for turning said rollers.

92. A box making machine, comprising means for feeding a flange web, means for severing strips successively from the flange web, and means for applying glue on the edge of the flange web comprising a glue delivery roller arranged at the side of the path of said web, a dauber movable alternately into engagement with said delivery roller and the edge of said web, a glue supply roller coöperating with the delivery roller, a glue pot adapted to contain a supply of glue into which the supply roller dips, and means for turning said rollers comprising a gear rim arranged on the glue supply roller, and a shaft carrying the delivery roller and provided with a pinion meshing with said gear rim.

93. A box making machine, comprising means for feeding a flange web, means for severing strips successively from the flange web, and means for applying glue on the edge of the flange web comprising a glue delivery roller arranged at the side of the path of said web, a dauber movable alternately into engagement with said delivery roller and the edge of said web, a glue supply roller coöperating with the delivery roller, a glue pot adapted to contain a supply of glue into which the supply roller dips, and means for adjusting said supply roller vertically in said pot.

94. A box making machine, comprising means for feeding a flange web, means for severing strips successively from the flange web, and means for applying glue on the edge of the flange web comprising a glue delivery roller arranged at the side of the path of said web, a dauber movable alternately into engagement with said delivery roller and the edge of said web, a glue supply roller coöperating with the delivery roller, a glue pot adapted to contain a supply of glue into which the supply roller dips, and means for adjusting said supply roller vertically in said pot, comprising rock levers supporting said supply roller, and adjusting screws for shifting said levers.

95. A box making machine, comprising means for feeding a flange web, means for severing strips successively from the flange web, and means for applying glue on the edge of the flange web, comprising a glue supplying device, and a dauber movable alternately into engagement with said glue supplying device and the edge of the web and consisting of a circular body having a peripheral row of brushes, and a movable support on which said dauber is capable of rotary adjustment.

96. A box making machine, comprising means for feeding a flange web, means for severing strips successively from the flange web comprising a transversely movable cutter, a carriage supporting said cutter, and means for applying glue on the edge of the flange web comprising a glue supplying device arranged adjacent to the edge of the web, and a dauber mounted on said carriage and movable alternately to the glue supplying device and the edge of the web.

97. In an apparatus of the character described, in combination, means adapted to feed a plurality of continuous webs so that their end portions are superposed, means adapted to coat one of said webs with adhesive on the face adjacent the other web, means adapted to interfold the front ends of said webs, means adapted to alternately sever first one web then the other in rear of their interfolded portions, and means adapted to fold the superposed sections on lines extending substantially longitudinally of said webs and connect the opposite ends of the sections.

98. In an apparatus of the character described, in combination, means adapted to assemble the ends of a plurality of webs so that their end portions are superposed with the front end of one in advance of the front end of the other, means adapted to coat one of said webs with adhesive on the face adjacent the other web, means adapted to fold the projecting end over the front end of the other web and press the interfolded portions, means adapted to sever the uncoated web on one side of the interfolded portion, means adapted to intermittently feed said webs unequal amounts, means adapted to apply adhesive to the edge of the severed web while being fed, and means adapted to sever the other web on the same side of the interfolded portions as the first web.

99. In a device of the character described, in combination, a rotary shaft carrying a blank support and a mutilated gear, a second mutilated gear meshing with the first, and a pawl operatively connected with the second gear and adapted to engage and disengage the first gear to lock the same in its periods of rest.

100. In an apparatus of the character described, in combination, a series of formers each comprising a pneumatic gripper face, means adapted to move said formers in an endless path, means adapted to support a plurality of blanks, means whereby blanks from said support are delivered to said gripper faces of said formers, and means comprising a blank clamping jaw adapted to position said blanks on said faces.

101. In an apparatus of the character described, in combination, a series of formers each comprising a pneumatic gripper face, means adapted to move said formers in an endless path, means adapted to support a plurality of blanks, means whereby blanks from said support are delivered to said gripper faces of said formers, means adapted to press said blanks against said faces, and means comprising a blank clamping jaw adapted to position said blanks on said faces.

102. In an apparatus of the character described, in combination, a series of formers each comprising a pneumatic gripper face, means adapted to intermittently move said formers in an endless path, means adapted to support a plurality of blanks, and means whereby blanks from said support are delivered to said gripper faces while the formers are in motion.

103. In an apparatus of the character described, in combination, a series of formers each comprising a blank receiving pneumatic gripper face, an exhaust device, means adapted to connect said blank receiving gripper face to said exhaust device after said blanks have been delivered, means adapted to intermittently move said formers in an endless path, means adapted to support a plurality of blanks, and means whereby blanks from said support are delivered to said gripper faces while the formers are in motion.

104. In an apparatus of the character described, in combination, a series of formers each comprising a pneumatic gripper face, means adapted to intermittently move said formers in an endless path, means adapted to support a plurality of blanks, means whereby blanks from said support are delivered to said gripper faces while the formers are in motion, and means adapted to press said blanks against said faces when being delivered thereto.

105. In an apparatus of the character described, in combination, a series of formers each comprising a blank receiving pneumatic gripper face, an exhaust device, means adapted to connect said blank receiving gripper face to said exhaust device after blanks have been delivered thereto, means adapted to intermittently move said formers in an endless path, means adapted to support a plurality of blanks, means whereby blanks from said support are delivered to said gripper faces while the formers are in motion, and means comprising a spring pressed roller adapted to guide and press said blanks against said faces when being delivered thereto.

106. In an apparatus of the character described, in combination, a series of formers, means adapted to intermittently move the formers in an endless path, clamping jaws, one for each former, movable with each former and toward and from the same, an oscillatory cam, operative devices between the cam and said jaws, and means to position said cam so as to successively position said jaws away from the formers at one position of rest of said formers, thereafter move said jaws into clamping position relative to the formers while the formers are in said position of rest, and maintain said jaws in said clamping position while said formers are in a succeeding position of rest.

107. In an apparatus of the character described, in combination, a series of formers, means adapted to intermittently move the formers in an endless path, clamping jaws one for each former, movable with each former and toward and from the same, each jaw comprising a gage, and means adapted to position said jaws so as to dispose the gages across a face of the formers in one position of rest of said formers, thereafter position said jaws away from the formers at a succeeding position of rest of said formers, thereafter move said jaws into clamping position relative to the formers while the formers are in said succeeding position of rest, and maintain said jaws in said clamping position while said formers are in another succeeding position of rest.

108. In an apparatus of the character described, in combination, a series of formers, means adapted to intermittently move the formers in an endless path, presser jaws, one for each former, movable with each former and toward and from the same, an oscillatory cam, operative devices between the cam and said jaws, and means to operate said cam so as to successively position said jaws away from the formers at one position of rest of said formers, thereafter move said jaws into pressing position relative to the formers while the formers are in said position of rest, and position said jaws out of pressing position when the formers are in a succeeding position of rest.

109. In an apparatus of the character described, in combination, a series of formers, means adapted to intermittently move the formers in an endless path, presser jaws, one for each former, movable with each former and toward and from the same, an oscillatory cam, operative devices between the cam and said jaws, and means to operate said cam so as to successively position said jaws away from the formers at one positon of rest of said formers, thereafter move said jaws into pressing position relative to the formers while the formers are in said position of rest, maintain the jaws in pressing position while the formers are moving from said position of rest, and position said jaws out of pressing position when the formers are in a succeeding position of rest.

110. In an apparatus of the character described, in combination, a series of formers, means adapted to intermittently move the formers in an endless path, each former comprising a passageway providing a pneumatic gripper face, means adapted to cause said faces to pneumatically retain blanks after the formers have come to one position of rest and means adapted to fold other blanks relatively to said pneumatically gripped blanks to form an article.

111. In an apparatus of the character described, in combination, a series of formers, means adapted to intermittently move the formers in an endless path, each former providing a face adapted to pneumatically grip a blank, an exhaust mechanism, means adapted to control communication between said faces and the exhaust mechanism comprising an oscillatory valve, means to oscillate said valve and means adapted to fold other blanks relatively to said pneumatically gripped blanks to form an article.

112. In an apparatus of the character described, in combination, a series of formers, each former comprising a face adapted to pneumatically grip a blank, passageways leading from each of said faces, means adapted to move said formers in an endless path, an exhaust mechanism with which each passageway is adapted to be connected a valve adapted to simultaneously maintain communication between certain of said passageways and said exhaust mechanism and cut off communication between said exhaust mechanism and another of said passageways and means adapted to fold other blanks relatively to said pneumatically gripped blanks to form an article.

113. In an apparatus of the character described, in combination, a series of formers, each former comprising a face adapted to pneumatically grip a blank, passageways leading from each of said faces, means adapted to move said formers in an endless path, an exhaust mechanism with which each passageway is adapted to be connected, an oscillatory valve adapted to simultaneously maintain communication between certain of said passageways and said exhaust mechanism and cut off communication between said exhaust mechanism and another of said passageways and means adapted to fold other blanks relatively to said pneumatically gripped blanks to form an article.

114. In an apparatus of the character described, in combination, a series of formers comprising faces adapted to pneumatically grip blanks, means to intermittently move the formers in an endless path, an exhaust device adapted to communicate with each of said faces, means to cut off communication with each successive gripper face at a predetermined point in the path of the formers, thereafter establish communication with each successive gripper face at a stationary point in the path, and thereafter maintain such latter communication up to the point of cut off first mentioned and means adapted to fold other blanks relatively to said pneumatically gripped blanks to form an article.

115. In an apparatus of the character described, in combination, a series of formers comprising faces adapted to pneumatically grip blanks, means to intermittently move the formers in an endless path, an exhaust device, means comprising an oscillatory valve adapted to cut off communication with each successive gripper face at a predetermined point in the path of the formers, thereafter establish communications with each successive gripper face at a different point in the path, and thereafter maintain such latter communication up to the point of cut off first mentioned and means adapted to fold other blanks relatively to said pneumatically gripped blanks to form an article.

116. In an apparatus of the character described, in combination, a rotary carrier comprising a series of pneumatic gripper faces movable in an endless path, separate passages respectively leading from said faces and having ports in the surface of the carrier, a movably mounted element providing a chamber with which said ports are adapted to successively register as the carrier rotates, an exhaust device communicating with said chamber, and means to move said element to cause said ports to successively register with said chamber at a predetermined point in the path of rotation of the carrier.

117. In an apparatus of the character described, in combination, a rotary carrier comprising a series of pneumatic gripper faces movable in an endless path, separate passages respectively leading from said faces and having ports in the surface of the carrier, a movably mounted element providing a chamber with which said ports are adapted to successively register as the carrier rotates, an exhaust device communicating with said chamber, means whereby movement of said element in one direction causes said ports to successively register with said chamber at a predetermined point in the path of rotation of the carrier, and whereby movement in the opposite direction positions said element to cut off communication between the exhaust device and the next approaching port.

118. In an apparatus of the character described, in combination, a rotary carrier comprising a series of pneumatic gripper faces movable in an endless path, separate passages respectively leading from said faces and having ports in the surface of the carrier, a movably mounted element providing a chamber with which said ports are adapted to successively register as the carrier rotates, an exhaust device communicating with said chamber, means whereby movement of said element in one direction causes said ports to successively register with said chamber at a predetermined point in the path of rotation of the carrier, and whereby movement in the opposite direction positions said element to cut off communication between the exhaust device and the next approaching port without cutting off the communication between said chamber and said immediately preceding port.

119. In an apparatus of the character described, in combination, a rotary carrier comprising a series of pneumatic gripper faces movable in an endless path, separate passages respectively leading from said faces and having ports in the surface of the carrier, a rotatably mounted plate comprising solid and chambered portions in alinement with the path of said ports, an exhaust device communicating with said chamber portion, and means to oscillate said plate at predetermined intervals.

120. In an apparatus of the character described, in combination, a rotary carrier comprising a series of pneumatic gripper faces movable in an endless path, separate passages respectively leading from said faces and having ports in the surface of the carrier, a rotatably mounted plate yieldingly pressed against the carrier and comprising solid and chambered portions in alinement with the path of said ports, an exhaust device communicating with said chambered portion, and means to oscillate said plate at predetermined intervals.

121. In an apparatus of the character described, in combination, a rotary carrier comprising a series of pneumatic gripper faces, separate passages connecting said faces with separate ports in a lateral face of the carrier, a plate concentrically mounted relatively to the carrier, said plate having a portion adapted to close successive ports, and a cavity adapted to be in simultaneous registry with a plurality of said ports less than the whole number of said ports, means adapted to exhaust air from said cavity, and means adapted to oscillate said plate so as to successively place ports in registry with said cavity.

122. In an apparatus of the character described, in combination, a rotary carrier comprising a series of pneumatic gripper faces, separate passages connecting said faces with separate ports in a lateral face of the carrier, means adapted to intermittently rotate said carrier, a plate, concentrically mounted relatively to the carrier, said plate having a portion adapted to close successive ports, and a cavity adapted to be in simultaneous registry with a plurality of said ports less than the whole number of said ports, means adapted to exhaust air from said cavity, and means adapted to oscillate said plate so as to successively place ports in registry with said cavity between successive movements of the carrier.

123. In an apparatus of the character described, in combination, a rotary carrier comprising a series of pneumatic gripper faces, separate passages connecting said faces with separate ports in a lateral face of the carrier, means adapted to intermittently rotate the carrier, a concentrically mounted oscillatory disk bearing against said lateral face, said disk comprising a segmental chamber adapted to be in simultaneous registry with a plurality of said ports less than the whole number of ports, an air vent in said disk intermediate the ends of said chamber, and means adapted to rotate said disk in one direction when the carrier is at rest and to rotate the same in the opposite direction when the carrier is in motion.

124. In an apparatus of the character described, in combination, a series of formers, means adapted to intermittently move the formers in an endless path, a clamping jaw and a presser jaw for each former, movable with each former and toward and from the same, and means comprising an oscillatory track adapted to govern the position of the jaws relative to the respective formers.

125. In an apparatus of the character described, in combination, a series of formers, means adapted to intermittently move the formers in an endless path, a clamping jaw and a presser jaw for each former, movable with each former and toward and from the same, each jaw having devices adapted to coöperate with a cam track in order to operate said jaws, means comprising an oscillatory cam track relative to which said jaws move, and means to oscillate said track relative to said jaws.

126. In an apparatus of the character described, in combination, a series of formers, means adapted to intermittently move the formers in an endless path, a pivoted clamping jaw and a pivoted presser jaw for each former, movable with each former and toward and from the same, each jaw having devices adapted to coöperate with a cam track in order to operate said jaws, means comprising an oscillatory cam track relative to which said jaws move, and means to oscillate said track relative to the said jaws.

127. In an apparatus of the character described, in combination, a series of formers comprising pneumatic gripper faces, means adapted to intermittently move the formers in an endless path, a clamping jaw for each former, movable with each former and toward and from the same, an exhaust device adapted to communicate with each of said faces, means adapted to cut off communication between the exhaust device and each successive gripper face at a predetermined point in the path of the formers, thereafter establish communication with each successive gripper face at a stationary point in the path, thereafter maintain such latter communication up to the point of cut off first mentioned, means adapted to position said jaws away from the formers at one position of rest of said formers, thereafter move said jaws into clamping position while the formers are in said position of rest and maintain said jaws in said clamping position while said formers are in a succeeding position of rest.

128. In an apparatus of the character described, in combination, a series of formers comprising pneumatic gripper faces, means adapted to intermittently move the formers in an endless path, a clamping jaw for each former, movable with each former and toward and from the same, an exhaust device adapted to communicate with each of said faces, means adapted to cut off communication between the exhaust device and each successive gripper face at a predetermined point in the path of the formers, thereafter establish communication with each successive gripper face at a stationary point in the path, thereafter maintain such latter communication up to the point of cut off first mentioned, means adapted to position said jaws away from the formers at one position of rest of said formers, thereafter move said jaws into clamping position while the formers are in said position of rest and maintain said jaws in said clamping position while said formers are in a succeeding position of rest, said last mentioned means comprising a cam track.

129. In an apparatus of the character described, in combination, a series of formers comprising pneumatic gripper faces, means adapted to intermittently move the formers in an endless path, a clamping jaw for each former, movable with each former and toward and from the same, an exhaust device adapted to communicate with each of said faces, means adapted to cut off communication between the exhaust device and each successive gripper face at a predetermined point in the path of the formers, thereafter establish communication with each successive gripper face at a stationary point in the path, thereafter maintain such latter communication up to the point of cut off first mentioned, means adapted to position said jaws away from the formers at one position of rest of said formers, thereafter move said jaws into clamping position while the formers are in said position of rest and maintain said jaws in said clamping position while said formers are in a succeeding position of rest, said last-mentioned means comprising an oscillatory cam.

130. In an apparatus of the character described, in combination, a series of formers, comprising pneumatic gripper faces, means adapted to intermittently move the formers in an endless path, a clamping jaw for each former, movable therewith and toward and from the same, separate air passages leading from said faces, an exhaust device, an oscillatory valve having a chamber communicating with said exhaust device and adapted to successively establish communication between said exhaust device and said passages through said chamber, and means comprising an oscillatory cam adapted to position said jaws away from the formers at one position of rest of said formers, thereafter move said jaws into clamping position while the formers are in said position of rest and maintain said jaws in said clamping position while said formers are in a succeeding position of rest.

131. In an apparatus of the character described, in combination, a series of formers comprising pneumatic gripper faces, means adapted to intermittently move the formers in an endless path, a clamping jaw and a presser jaw for each former, movable therewith and toward and from the same, means adapted to successively deliver blanks on said faces at a stationary point in the path of movement of the formers, an exhaust device adapted to communicate with each of said faces, means adapted to cut off communication between the exhaust device and each successive gripper face at a predetermined point in the path of the formers, thereafter establish communication with each successive gripper face at said stationary point in the path, thereafter maintain such latter communication up to the point of cut off first mentioned, means to successively deliver blanks between the clamping jaws and their respective formers, means to fold said blanks around said formers, and means to cause said presser jaws to press a folded portion of the blank.

132. In an apparatus of the character described, in combination, a series of formers comprising pneumatic gripper faces, means adapted to move the formers in an endless path, a clamping jaw and a presser jaw for each former, movable therewith and toward and from the same, an oscillatory cam device adapted to move said jaw in one direction relative to the formers, resilient means adapted to move said jaws in the opposite direction relative to the formers, an exhaust device adapted to communicate with each of said faces, means comprising an oscillatory valve adapted to cut off communication between the exhaust device and each successive gripper face at a predetermined point in the path of the formers, thereafter establish communication with each successive gripper face at a stationary point in said path, and thereafter maintain said communication up to the point of cut off first mentioned.

133. In an apparatus of the character described, in combination, a plurality of blank supply devices, a plurality of formers, means adapted to move the formers in an endless path past said supply devices, each of said formers comprising a gripper adapted to retain a blank from one of said supplies on the formers, a plurality of clamp jaws for each former, a blank folding device, and an oscillatory cam device adapted to cause the operation of said clamp jaws to respectively retain a blank on each former from said other supply, and retain said latter blanks in folded condition thereon.

134. In an apparatus of the character described, in combination, a head supply device, a flange and binder supply device, folding jaws, a plurality of formers, means to move the formers intermittently and bring them to rest adjacent said supply devices and folding jaws, means comprising a clamp jaw movable with each former and toward and from the same, adapted to retain heads and flanges and binders on said formers from said supplies, an oscillatory cam device adapted to operate said clamp jaws, and means to operate said folding jaws to fold the flanges and binders around said heads.

135. In an apparatus of the character described, in combination, a head supply device, a flange and binder supply device, folding jaws, a plurality of formers, means to move the formers intermittently in an endless path and bring them to rest adjacent said supply devices and folding jaws, each of said formers comprising a pneumatic gripper face, a clamp jaw for and movable with each former and toward and from the same, an oscillatory cam device adapted to operate said clamp jaws, an exhaust device adapted to be connected to each of said pneumatic gripper faces, an oscillatory valve adapted to control communication between said gripper faces and said exhaust device, and means adapted to operate said folding jaws.

136. In an apparatus of the character described, in combination, a head supply device, a flange and binder supply device, folding jaws, a plurality of formers, means to move the formers intermittently in an endless path and bring them to rest adjacent said supply devices and folding jaws, each of said formers comprising a pneumatic gripper face, a clamp jaw and a presser jaw for and movable with each former and toward and from the same, an oscillatory cam device adapted to operate said clamp jaws and said presser jaws, an exhaust device adapted to be connected to each of said pneumatic gripper faces, an oscillatory valve adapted to control communication between said gripper faces and said exhaust device, and means adapted to operate said folding jaws.

137. In an apparatus of the character described, in combination, a head supply device, a flange and binder supply device, folding jaws, a plurality of formers, means to move the formers intermittently in an endless path and bring them to rest adjacent said supply devices and folding jaws, each of said formers comprising a pneumatic gripper face, a clamp jaw and a presser jaw for and movable with each former and toward and from the same, oscillatory cams adapted to operate each of said jaws, said cams being connected to move as one, an exhaust device adapted to be connected to each of said pneumatic gripper faces, an oscillatory valve movable with said cams adapted to control communication between said gripper faces and said exhaust device, and means adapted to operate said folding jaws.

138. In an apparatus of the character described, in combination, a flange and binder supply device, folding jaws, a plurality of formers, means adapted to intermittently move said formers in an endless path and bring them successively to rest adjacent the flange and binder supply device, said formers respectively comprising a clamp jaw movable therewith and toward and from the same, an oscillatory cam adapted to operate said clamp jaw, and means adapted to operate said folding jaws.

139. In an apparatus of the character described, in combination, a flange and binder supply device, folding jaws, a plurality of formers, means adapted to intermittently move said formers in an endless path and bring them successively to rest adjacent the flange and binder supply device and said folding jaws, said formers respectively comprising a clamp jaw and a presser jaw movable therewith and toward and from the same, oscillatory cams adapted to operate said clamp and said presser jaws, and means adapted to operate said folding jaws.

140. In an apparatus of the character described, in combination, a flange and binder supply device, folding jaws an ejector device, a plurality of formers, means adapted to intermittently move said formers in an endless path and bring them successively to rest adjacent the flange and binder supply device and folding jaws and ejector device, said formers respectively comprising a clamp jaw and a presser jaw movable therewith and toward and from the same, an oscillatory cam adapted to operate said clamp and said presser jaws, means to operate said folding jaws, and means to operate said ejector device so as to cause the same to move the folded element over successive formers.

141. In an apparatus of the character described, in combination, a series of formers, means adapted to intermittently move the formers in an endless path, clamping jaws, one for each former, pressing jaws one for each former, each of said jaws being movable with each former, and toward and from the same, a cam adapted to operate said jaw, means to position said cam so that the movement of the formers relative thereto causes movement of said clamping jaws in one direction relative to the formers, and means whereby movement of said cam relative to the movement of said formers causes movement of the other jaws relative to said formers without causing movement of said first mentioned jaws.

142. In a device of the character described, in combination, a movable support for blanks, and pneumatic means to grip blanks thereto comprising a passageway opening into the blank seat, a valve having a chamber in the path of said passageway, means to reduce the air pressure in said chamber, and means to automatically move the valve to determine the time at which the passageway communicates with the chamber.

143. In a device of the character described, in combination, a movable support for blanks, and pneumatic means to grip blanks thereto comprising a passageway opening into the blank seat, an oscillatory valve having a chamber in the path of said passageway, means to reduce the air pressure in said chamber, and means to move the valve to determine the time at which the passageway communicates with the chamber.

144. In a device of the character described, in combination, a movable support for blanks, and pneumatic means to grip blanks thereto comprising a passageway opening into the blank seat, an oscillatory valve having a segmental chamber in the path of said passageway, means to reduce the air pressure in said chamber, and means to move the valve to determine the time at which the passageway communicates with the chamber.

145. In a device of the character described, in combination, a rotary blank support comprising a plurality of blank supporting chambered surfaces, means for operating upon a blank carried by said support, exhaust mechanism, an oscillatory valve to successively establish communication between the exhaust mechanism and the chambers, and means adapted to automatically oscillate said valve.

146. In a device of the character described, in combination, a rotary shaft, a carrier connected thereto, and comprising independent blank supporting faces having air openings, air exhaust mechanism, passageways leading therefrom to said air openings, a valve mounted on said shaft, and adapted to open and close said passageways, and means to operate said valve.

147. In a device of the character described, in combination, a rotary shaft, a carrier connected thereto, and comprising independent blank supporting faces having air openings, air exhaust mechanism, passageways leading therefrom to said air openings, a valve mounted on said shaft, and adapted to open and close said passageways, and means to oscillate said valve.

148. In a device of the character described, in combination, a rotary carrier having a plurality of chambered surfaces, with air conduits leading thereto, an oscillatory valve mounted concentrically therewith, and provided with a segmental chamber in the path of the air conduits, and means to reduce the air pressure in said valve chamber, whereby the chambered surfaces are adapted to successively grip and retain blanks fed thereto, as the carrier rotates.

149. In a device of the character described, in combination, a rotary carrier comprising blank receiving faces having pneumatic gripper means associated therewith, an oscillatory disk mounted concentrically with the carrier, and an air valve between the carrier and the disk and connected to oscillate with the disk and adapted to control the pneumatic gripper means.

150. In a device of the character described, in combination, a rotary carrier comprising blank receiving faces having pneumatic gripper means associated therewith, an oscillatory disk mounted concentrically with the carrier, an air valve between the carrier and the disk and connected to oscillate with the disk and adapted to control the pneumatic gripper means, and means to yieldingly press the valve against the carrier.

151. In a device of the character described, in combination, a rotary carrier comprising blank receiving faces having pneumatic gripper means associated therewith, an oscillatory disk mounted concentrically with the carrier, an air valve between the carrier and the disk and connected to oscillate with the disk and adapted to control the pneumatic gripper means, an arm on the disk, a rock lever, a link connecting the arm and rock lever, and a cam to operate the rock lever.

152. In a device of the character described, in combination, a rotary carrier, and pneumatic gripper mechanism coöperating therewith to secure blanks thereto, comprising an oscillatory disk, an air valve having a chamber facing the carrier, a sliding pin connection between the air valve and the disk, and a spring on the disk and engaging the valve to press the valve against the carrier.

153. In a device of the character described, in combination, a rotary carrier comprising a plurality of peripheral chambered seats, with independent air conduits leading thereto, said conduits having ports in the side of the carrier, a valve having a chamber located in the path of the ports, means for exhausting the air from the valve chamber, means for rotating the carrier, and means for oscillating the valve to determine the time of communication between the valve chamber and the several ports.

154. In a device of the character described, in combination, a rotary carrier, comprising a plurality of peripheral chambered seats, with independent air conduits leading thereto, said conduits having ports on the side of the carrier, a valve having a chamber located in the path of the ports, means for exhausting the air from the valve chamber, means for rotating the carrier, means for oscillating the valve to determine the time of communication between the valve chamber and the several ports, and a vent opening in the valve in the path of the ports.

155. In a device of the character described, in combination, a carrier, a stop arm pivoted thereto, and having gear teeth, a second arm having teeth engaging those of the first arm, and a cam engaged by the second arm to operate the stop arm.

156. A box making machine, comprising means for assembling flanges and binders, means for supplying heads, comprising an upright magazine adapted to contain a stack of heads, and a reciprocating follower adapted to remove the heads successively from the underside of the stack, and a carrier which receives said head from said stack and presents the same to its companion flange and binder.

157. A box making machine, comprising means for assembling flanges and binders, means for supplying heads, and means for carrying the heads from said supplying means to the flanges and binders comprising a rotatable pneumatic gripper having an air passage terminating in a port, and a valve having a cavity which is adapted to be connected with an air exhausting device and with which the port of the gripper passage is adapted to register at intervals.

158. A box making machine comprising means for assembling flanges and binders, means for supplying heads and means for carrying the heads from said supplying means to the flanges and webs comprising a rotatable pneumatic gripper having an air passage terminating in a port, and a valve having a cavity which is adapted to be connected with an air exhausting device and with which the port of the gripper passage is adapted to register at intervals and also with a vent port with which said gripper port is adapted to register.

159. A box making machine, comprising means for assembling flanges and binders, means for supplying heads and means for carrying the heads from said supplying means to said flanges and binders comprising a rotatable pneumatic gripper adapted to hold the heads and having an air passage which terminates in a port, and a movable air valve which controls the connection between said pneumatic gripper and an air exhausting device.

160. A box making machine, comprising means for assembling flanges and binders, means for supplying heads, and means for carrying the heads from said supplying means to said flanges and binders comprising a rotatable pneumatic gripper adapted to hold the heads and having an air passage which terminates in a port, and an oscillating air valve which turns concentrically with the pneumatic gripper and whereby the passages in the latter are connected with and disconnected from air exhausting devices.

161. A box making machine, comprising means for assembling flanges and binders, means for supplying heads and means for carrying the heads from said supplying means to said flanges and binders comprising a rotatable pneumatic gripper adapted to hold the heads and having an air passage which terminates in a port, and an oscillating air valve which turns concentrically with the pneumatic gripper and whereby the passages in the latter are connected with and disconnected from an air exhausting device, means for rotating said gripper intermittently and allowing the same to rest adjacent to said head supplying means, an air exhaust pipe, and a movable air valve which cuts off communication between said air exhaust pipe and the gripper port as the gripper moves toward the head receiving position and establishes communication between said gripper port and the exhaust pipe after the gripper reaches the head receiving position.

162. A box making machine, comprising means for assembling flanges and binders, means for supplying heads and means for carrying the heads from said supplying means to said flanges and binders, comprising a rotatable pneumatic gripper adapted to hold the heads and having an air passage which terminates in a port in its hub, an air exhaust pipe, an oscillating air valve turning concentrically with said gripper and having a cavity which is connected with said air exhaust pipe and is adapted to register with the port of the gripper, an operating disk or member turning concentrically with the gripper, means for causing said air valve to oscillate with said disk but permitting axial movement of the valve independently of the operating disk, and springs operating to hold said valve yieldingly in engagement with the hub of the gripper.

163. A box making machine, comprising means for supplying a head flange and binder and means for folding said flange and binder around the edges of the head comprising a movable former on which the head, flange and binder are assembled, a jaw for clamping the central part of the flange and binder on the former, a rotatable carrier on which the former is mounted, and means for moving said jaw into and out of operative position relatively to the former, comprising a rock lever which is pivoted on the carrier one arm of which supports said jaw while its other arm is provided with a gear segment, another rock lever pivoted on said carrier and provided on one of its arms with a gear segment which meshes with the segment of the first mentioned lever, and a cam over which the other arm of the last mentioned lever is moved.

164. A box making machine, comprising means for supplying a head, flange and binder and means for folding said flange and binder around the edges of the head comprising an intermittently movable former on which the head, flange and binder are assembled, a jaw for holding the central part of the flange and binder against the front side of the former, a pair of jaws for pressing the intermediate part of the flange and binder against the lateral sides of the former while the former is at rest, and a pair of jaws for pressing the ends of the flange and binder against the rear side of the former while the former is at rest.

165. A box making machine, comprising means for supplying a head, flange and binder and means for folding said flange and binder around the edges of the head comprising a movable former on which the head, flange and binder are assembled, a jaw for holding the central part of the flange and binder against the front side of the former, a pair of jaws for pressing the intermediate part of the flange and web against the lateral sides of the former, a pair of jaws for pressing the ends of the flange and binder against the rear side of the former, and means for actuating said side jaws comprising a pair of transversely swinging rock arms carrying said side jaws, rock shafts carrying said rock arms, and means for actuating said rock shafts.

166. A box making machine, comprising means for supplying a head, flange and binder and means for folding said flange and binder around the edges of the head comprising a movable former on which the head, flange and binder are assembled, a jaw for holding the central part of the flange and binder against the front side of the former, a pair of jaws for pressing the intermediate part of the flange and binder against the lateral sides of the former, and a pair of jaws for pressing the ends of the flange and binder against the rear side of the former, and means for actuating said rear jaws comprising transversely swinging rock arms supporting said rear jaws, rock shafts carrying said rock arms, and means for actuating said rock shafts.

167. A box making machine, comprising means for supplying a head, flange and binder and means for folding said flange and binder around the edges of the head comprising a movable former on which the head, flange and binder are assembled, a jaw for holding the central part of the flange and binder against the front side of the former, a pair of jaws for pressing the intermediate part of the flange and binder against the lateral sides of the former, a pair of jaws for pressing the ends of the flange and binder against the rear side of the former, and means for actuating said side and rear jaws comprising two front rock arms carrying the side jaws, two front rock shafts carrying the front rock arms, two rear rock arms carrying the rear jaws, two rear rock shafts carrying the rear rock arms, two rock levers secured respectively to the rear rock shafts, links connecting said rock levers with arms on the front rock shafts, a pair of actuating levers connected with the rock levers on the rear rock shafts, and rotatable cams engaging with the rear rock shaft.

168. A box making machine, comprising means for supplying a head, flange and binder and means for folding said flange and binder around the edges of the head comprising a movable former on which the head, flange and binder are assembled, a jaw for holding the central part of the flange and binder against the front side of the former, a pair of jaws for pressing the intermediate part of the flange and web against the lateral sides of the former, a pair of jaws for pressing the ends of the flange and binder against the rear side of the former, a rotatable carrier on which said former is mounted, a clamping jaw for holding the overlapping ends of the flange against the rear side of the former, and means for operating said clamping jaw comprising a rock shaft journaled on the carrier and provided with two arms one of which supports said rear clamping jaw, and a cam over which the other one of said arms moves and is shifted thereby.

169. A box making machine, comprising means for supplying a head, flange and binder, means for folding said flange and binder around the edges of the head, and means for turning the edge of said binder against the under side of said head comprising a toggle lever having a link pivoted on a fixed pivot and another link pivoted on the first mentioned link and provided with a jaw adapted to engage with the edge of the binder.

170. A box making machine, comprising means for supplying a head, flange and binder, means for folding said flange and binder around the edges of the head, and means for turning the edge of said binder against the under side of said head comprising a jaw having a face adapted to engage with the edge of the binder and press the same against the outer side of the head, and a shoulder adapted to engage with the outer side of the flange and binder.

171. A box making machine, comprising means for supplying a head, flange and binder, means for folding said flange and binder around the edges of the head, and means for turning the edge of said binder against the under side of said head comprising a pair of side toggle levers provided with jaws adapted to engage with the side edges of the binder, a rear toggle lever provided with a jaw adapted to engage with the rear edge of the binder, and means for folding and straightening the links of said levers.

172. A box making machine, comprising means for supplying a head, flange and binder, means for folding said flange and binder around the edges of the head, and means for turning the edge of said binder against the under side of said head comprising a pair of side toggle levers provided with jaws adapted to engage with the side edges of the binder, a rear toggle lever provided with a jaw adapted to engage with the rear edge of the binder, and means for folding and straightening the links of said levers, comprising rock levers connected with the relatively fixed links of the side toggle levers, rotatable cams engaging with said levers, a rotatable cam engaging with a tail on the relatively fixed link of the rear toggle lever, and springs operating to hold said toggle levers in their retracted folded position.

173. A box making machine, comprising means for supplying a head, flange and binder, a movable former upon which said parts are assembled, folded and connected, and means for ejecting the finished box from the former, comprising a rock arm, and a hook yieldingly mounted on the rock lever and adapted to trip over the box when moved by the arm in one direction and to engage the box and remove the same from the former upon being moved by the arm in the opposite direction.

174. A box making machine, comprising means for supplying a head, flange and binder, an intermittently movable former upon which said parts are assembled, folded and connected, and means for ejecting the finished box from the former while the former is at rest, comprising a rock arm, and a hook yieldingly mounted on the rock arm and adapted to trip over the box when moved by the arm in one direction and to engage the box and remove the same from the former upon being moved by the arm in the opposite direction.

175. A box making machine, comprising means for supplying a head, flange and binder, a movable former upon which said parts are assembled, folded and connected, and means for ejecting the finished box from the former, comprising a rock arm, a hook yieldingly mounted on the rock lever and adapted to trip over the box when moved by the arm in one direction and to engage the box and remove the same from the former upon being moved by the arm in the opposite direction, and means for operating the rock arm comprising a rock shaft carrying the rock arm, a rock lever connected with another arm on the rock shaft, and a rotatable cam engaging with the rock lever.

176. A box making machine comprising means for feeding a flange web, means for scoring, scarfing and trimming said web, means for severing flange strips successively from said flange-web, means for supplying binders, means for supplying heads, and means for assembling said flange-strips, binders and heads.

177. A box making machine comprising means for supplying a flange-web, means for severing said flange-web into strips and automatically assembling the same with heads and binders, and means for sizing the edge of said web in transit to said severing means.

178. A box making machine comprising means for supplying a flange web, means for severing said flange web into strips and assembling the same with heads and binders, and means for scoring, scarfing and sizing said web in transit to said severing means.

179. A box making machine comprising means for supplying a flange web, means for scoring the same lengthwise, means for severing the same into strips and assembling the same with binders and heads, and means for supporting the slack in said web between said scoring means and said severing and assembling means.

180. A box making machine comprising means for supplying a flange web, means for scoring the same lengthwise, means for severing the same into strips and assembling the same with binders and heads, and means for supporting the slack in said web between said scoring means and said severing and assembling means comprising a vertically movable roller supporting said web, and counter-balancing means connected with said roller.

181. A box making machine comprising means for supplying a flange web, means for scoring the same lengthwise, means for severing the same into strips and assembling the same with binders and heads, and means for supporting the slack in said web between said scoring means and said severing and assembling means, comprising a vertically movable roller supporting said web, a guide for said roller cords connected at one end with said roller, pulleys over which said cords pass, and counter-weights arranged on the other ends of said cords.

182. A box making machine comprising means for propelling a flange-web, means for scarfing the edge of the web, means for severing the same into strips and assembling the latter with heads and binders, and means for applying sizing to that scarf of the web section between the scarfing means and the severing means.

183. In an apparatus of the character described, in combination, means for supplying heads, a source of web supply, means adapted to feed web from said source, and means adapted to fold the web on the heads on lines extending substantially longitudinally of the web.

184. In an apparatus of the character described, in combination, means for supplying heads, a source of web supply, means adapted to feed web from said source, and means adapted to fold the web on the heads on lines parallel to its length.

185. In an apparatus of the character described, in combination, means for supplying heads, a source of continuous web supply, means adapted to feed web from said source, and means adapted to fold sections of the web on the heads on lines extending substantially longitudinally of the web.

186. In an apparatus of the character described, in combination, means for supplying heads, a plurality of sources of continuous web supply, means adapted to feed webs from said sources, and means adapted to fold sections of the web on the heads on lines extending substantially longitudinally of the webs.

187. In an apparatus of the character described, in combination, means for supplying heads, a plurality of sources of continuous web supply, means adapted to feed webs from said sources, and means adapted to fold sections of the webs on the heads on lines parallel to the length of the webs.

188. In an apparatus of the character described, in combination, a source of continuous web supply, means adapted to feed web from said source, means adapted to provide folding lines substantially longitudinally in said web, means for supplying heads, and means adapted to fold sections of the web on the head on said folding lines.

189. In an apparatus of the character described, in combination, a plurality of sources of continuous web supply, means adapted to feed web from said sources, means adapted to provide folding lines substantially longitudinally in one of said webs, means for supplying heads, and means adapted to fold sections of said webs on the heads on said folding lines.

190. In an apparatus of the character described, in combination, a plurality of sources of continuous web supply, means adapted to feed web from said sources, means adapted to provide folding lines substantially longitudinally in one of said webs, means adapted to adhesively assemble sections of said webs, means for supplying heads, and means adapted to fold said sections on said heads on said folding lines.

191. In an apparatus of the character described, in combination, a plurality of sources of continuous web supply, means adapted to feed web from said sources, means adapted to provide folding scores substantially longitudinally in one of said webs, means adapted to adhesively assemble sections of said webs, means for supplying heads, and means adapted to fold said sections on said heads on said folding lines.

192. In an apparatus of the character described, in combination, means for supplying heads, a source of continuous web supply having longitudinal folding scores, means adapted to feed web from said source, and means adapted to fold the web on the heads at the scored portion.

193. In an apparatus of the character described, in combination, means for supplying heads, a source of web supply having longitudinal folding lines, means adapted to longitudinally feed the web from said source, and means adapted to fold sections of the web on the heads at the folding lines.

194. In an apparatus of the character described, in combination, means for supplying heads, a plurality of sources of web supply having longitudinal folding lines, means adapted to feed the webs comprising mechanism to longitudinally feed the lined web, means adapted to assemble sections of said webs, and means adapted to fold the sections on the heads at the folding lines.

195. In an apparatus of the character described, in combination, means for supplying heads, a source of web supply, means adapted to provide folding lines in said web longitudinally thereof, means adapted to feed the web longitudinally, and means adapted to fold sections of the web on the heads on the folding lines.

196. In an apparatus of the character described, in combination, means for supplying heads, a plurality of sources of continuous web supply, means adapted to longitudinally score one of said webs, means adapted to feed the webs comprising mechanism to longitudinally feed the scored web, means adapted to assemble sections of said web, and means adapted to fold the sections on the heads on the scores.

197. In an apparatus of the character described, in combination, means for supplying heads, a plurality of sources of continuous web supply, means adapted to feed said webs into position having a portion of one extending beyond the other, means adapted to fold one portion on the other and secure the same thereto, means adapted to sever sections comprising the folded portion from the webs, and means adapted to fold the sections on the heads on lines extending substantially longitudinally of the webs.

198. In an apparatus of the character described, in combination, means for supplying heads, a plurality of sources of continuous web supply, means adapted to provide and assemble sections of said webs with portions of one extending beyond opposite ends of another, and means adapted to fold the assembled sections on the heads on lines extending substantially longitudinally of the webs, and the extended portions against the sections and heads respectively.

199. In an apparatus of the character described, in combination, means for supplying heads, a plurality of sources of continuous web supply, means adapted to feed said webs into position having a portion of one extending beyond the other, means adapted to sever one web, means adapted to space the severed section from the web, means adapted to sever the other web intermediate said first-mentioned web and severed section to provide a second extended portion, and means adapted to fold the severed sections of the webs on the heads on lines extending substantially longitudinally of the webs, and the extended portions against the heads and sections respectively.

200. In an apparatus of the character described, in combination, means for supplying heads, a plurality of sources of continuous web supply, means adapted to feed web from said sources and assemble the end portions thereof, a plurality of formers movable in an endless path, and means adapted to assemble heads and sections of the webs on the respective formers.

201. In an apparatus of the character described, in combination, means for supplying heads, a plurality of sources of continuous web supply, means adapted to feed web from said sources and interfold the ends thereof, a plurality of formers, means to rotatably translate the formers in an endless path, and means adapted to assemble heads and sections of the webs into boxes on the respective formers.

202. In an apparatus of the character described, in combination, means for supplying heads, a plurality of sources of continuous web supply, means adapted to feed web from said sources and adhesively attach the advancing ends thereof, a plurality of formers, means to rotatably translate the formers in an endless path, means adapted to retain heads and sections of the webs on the formers, and means adapted to fold the sections on the heads and secure the same together.

203. In an apparatus of the character described, in combination, means for supplying heads, a plurality of sources of continuous web supply, means adapted to feed web from said sources, means adapted to guide the ends of said webs into superposed relation, a plurality of formers, means to rotatably translate the formers in an endless path, means to sever the webs, means adapted to retain heads and sections of the web on the formers, and means adapted to fold the sections on the heads on lines extending substantially longitudinally of the webs and secure the same together.

204. In an apparatus of the character described, in combination a plurality of formers adapted to move in an endless path, gripper jaws coöperating with the formers, a head supply, means adapted to transfer heads to the formers and hold them thereon, a plurality of sources of continuous web supply, means adapted to feed webs from said sources and adhesively assemble the ends thereof, means adapted to sever said webs, means adapted to transfer sections of the webs into the path of the heads, and cause the sections to be gripped by the jaws and formers, and means adapted to fold the sections on the heads on lines extending substantially longitudinally of the webs.

205. In an apparatus of the character described, in combination, means for supplying and feeding a continuous flange web, means for supplying and feeding a continuous binder web and assembling the same with the flange web so that the front end of the continuous binder web projects beyond the front end of the continuous flange web, and movable means for folding the front end of the binder web around the front end of the flange web while each web is continuous with its respective supply.

206. In an apparatus of the character described, in combination, a table, means for feeding a web along said table, a carriage adapted to reciprocte across the table, a glue carrier movably mounted on the carriage, a glue supply apart from the table, means adapted to move the carriage to cause the glue carrier to transfer glue from the supply adjacent the web, and means to cause the glue carrier to contact with the web as the web is fed.

207. In an apparatus of the character described, in combination, means adapted to grip a blank, a plurality of formers adapted to move in an endless path, means to retain other blanks on the formers, means to cause relative movement between the gripping means and the formers to transfer one blank into assembly position relatively to another on the former, and means to release the gripping means.

208. In an apparatus of the character described, in combination, means adapted to grip a blank, a plurality of formers adapted to move in an endless path, means to retain other blanks on the formers, means to move the gripping means to transfer the gripped blank to position adjacent a former, and means to release the gripping means.

209. In an apparatus of the character described, in combination, means adapted to grip a blank, a plurality of formers adapted to move in an endless path, means to retain other blanks on the formers, means coöperating with each former to grip blanks thereto, means to move the first mentioned gripping means to position the blank carried thereby adjacent the blank carried by the former, means to cause the former gripping means to hold the blanks in relative position, and means to release the first-mentioned gripping means.

210. In an apparatus of the character described, in combination, a plurality of formers, means to move the same in an endless path, a plurality of web supplies, means to adhesively assemble sections of the webs at a point outside the path of the formers, and a single reciprocatory means adapted to transfer the assembled blanks to each former.

211. In an apparatus of the character described, in combination, a plurality of formers, means to move the same in an endless path, a plurality of web supplies, means to adhesively assemble sections of the webs at a point outside the path of the formers, a gripper, and means to oscillate the gripper between the assembly position and the path of the formers.

212. In an apparatus of the character described, in combination, a plurality of formers, means to move the same in an endless path, means adapted to assemble flanges and binders at a point outside the path of the formers, means to retain heads on the formers, and reciprocatory means adapted to transfer the flanges and binders to the heads on the formers.

213. In an apparatus of the character described, in combination, a plurality of formers, means to move the same in an endless path, means adapted to assemble flanges and binders at a point outside the path of the formers, means to retain heads on the formers, and a single reciprocatory means adapted to transfer the flanges and binders to the heads on the formers.

214. In an apparatus of the character described, in combination, a plurality of formers adapted to move in an endless path, means adapted to retain box heads on said formers, a single reciprocatory means for successively transferring flanges and binders from a supply to each former, and means adapted to fold the flanges and binders around the heads and secure the same thereto.

215. In an apparatus of the character described, in combination, a plurality of formers, means to intermittently move the formers in an endless path, a single reciprocatory blank gripping mechanism, means to operate the gripping mechanism to deliver a blank to each former, a head supply, means to successively move heads from the supply to the respective formers when the latter are at rest, and mechanism to secure the heads and blanks comprising means to fold the latter around the heads when the former is at rest.

216. In an apparatus of the character described, in combination, a former, means to move the former intermittently, means for supplying a head and flange and binder to said former, means for folding the flange and binder on the head, and mechanism for turning the edge of the binder against the head when the former is at rest.

217. A machine for making boxes having a head, a flange around the head, and a binder connecting the head and flange comprising means for supplying a flange web, means for supplying a binder web and assembling the same with said flange web, means for successively severing strips from said flange web to form flanges for the boxes, means for successively severing strips from said binder web to form the binders for the boxes, translatable formers, and means for supplying the heads and assembling the same with said flanges and binders on said formers.

218. A machine for making boxes having a head, a flange around the head, and a binder connecting the head and flange comprising means for supplying a flange web, means for supplying a binder web and assembling the same with said flange web, means for successively severing strips from said flange web to form flanges for the boxes, means for successively severing strips from said binder web to form the binders for the boxes, translatable formers, means for supplying the heads and assembling the same with said flanges and binders on said formers, and means adapted to cause movement of the severed strips so as to provide space for the reception of a succeeding strip.

219. In a device of the character described, in combination, means for supplying heads, a plurality of sources of web supply, means adapted to feed web from said sources and assemble portions thereof, a plurality of formers movable in an endless path, and means adapted to assemble heads and sections of the web on said formers comprising pneumatic grippers on said formers adapted to retain one of the elements to be assembled.

220. In a device of the character described, in combination, means for supplying heads comprising a stationary head support, a plurality of sources of web supply, means adapted to feed web from said sources and assemble portions thereof, a plurality of formers movable in an endless path, and means adapted to assemble heads and sections of the web on said formers comprising means adapted to deliver heads from said support to said formers, and pneumatic gripper faces on said formers adapted to retain said heads on said formers.

221. In an apparatus of the character described, in combination, a movable carrier comprising a pneumatic gripping face and means comprising a yielding deflector adapted to cause a blank to first contact with said face at an angle thereto as said carrier moves and thereafter assume position parallel with said face.

222. A box-making machine, comprising means for assembling flanges and binders, means for supplying heads, an intermittently movable former for moving said heads from the supplying means to said flanges and binders having a pneumatic gripper for holding said heads, and means adapted to fold a flange and binder around a head at a position of rest of said former.

223. A box-making machine, comprising means for assembling flanges and binders. means for supplying heads, an intermittently movable former for moving said heads from the supplying means to said flanges and binders having a pneumatic gripper for holding said heads, means adapted to fold a flange and binder around a head at a position of rest of said former, and a valve whereby said pneumatic gripper is adapted to be connected with and disconnected from an air exhausting device.

224. In an apparatus of the character described, in combination, an angular former, means adapted to apply a combined body and cover blank to said former said blank comprising spaced grooves in the body portion spanned by the cover portion, and means coöperating with said former to fold said blank at the groove portions and around said former and cause portions of said cover to enter said grooves.

225. In an apparatus of the character described, in combination, an angular former, means adapted to apply a combined body and cover blank to said former, said blank comprising spaced grooves in the body portion spanned by the cover portion, said grooves being produced by the removal of the material of the body portion of the blank, and means coöperating with said former to fold said blank at the groove portions and around said former and cause portions of said cover to enter said grooves.

226. In an apparatus of the character described, in combination, an angular former, means adapted to dispose an angular head on one face of said former, means adapted to apply a combined body and cover blank to said former, said blank comprising spaced grooves in the body portion spanned by the cover portion, said grooves being produced by the removal of the material of the body portion of the blank, and means coöperating with said former to fold said blank at the groove portions and around said former and said head and cause portions of said cover and corners of said head to enter said grooves.

227. In an apparatus of the character described, in combination, a former, a pair of folding jaws adjacent opposite sides of said former, a folding jaw adjacent a third side of said former, and means adapted to move said jaws toward and from said respective sides of said former, comprising rock shafts on which the respective jaws of said pair of jaws are loosely mounted.

228. In an apparatus of the character described, in combination, a former, a folding device comprising a toggle lever having a link pivoted on a fixed pivot and another link pivoted on the first-mentioned link and provided with a jaw, and means adapted to operate said toggle to cause said jaw to move toward and from a face of said former.

229. In an apparatus of the character described, in combination, a former, a folding device comprising a toggle lever having a link pivoted on a fixed pivot and another link pivoted on the first-mentioned link and provided with a jaw having a folding flange, and means adapted to operate said toggle to cause said jaw to move toward and from a face of said former.

230. In an apparatus of the character described, in combination, a former, means adapted to hold a plurality of blanks on said former comprising a pneumatic gripper, means adapted to fold one of said held blanks relative to another to form an article, comprising a pair of folding jaws movable toward and from opposite sides of said former, a pair of folding jaws movable toward and from a third side of said former, and means adapted to so move said jaws.

231. In an apparatus of the character described, in combination, a former, means adapted to intermittently move the same in an endless path, means adapted to hold a plurality of blanks on said former comprising a pneumatic gripper, means adapted to fold one of said blanks relative to another to form an article on said former, comprising a pair of folding jaws the members of which are respectively disposed adjacent opposite sides of said former, and means adapted to move said jaws toward respective sides of said former at a point of rest in said endless path.

232. In an apparatus of the character described, in combination, a former, means adapted to intermittently move the same in an endless path, means adapted to hold a plurality of blanks on said former comprising a pneumatic gripper, means adapted to fold one of said blanks relative to another to form an article on said former, comprising a pair of folding jaws the members of which are respectively disposed on opposite sides of the path of said former, means adapted to move said jaws toward respective sides of said former at a point of rest in said endless path, and means carried by said former adapted to retain said folded blank in folded condition.

233. In an apparatus of the character described, in combination, a former, means adapted to intermittently move the same in an endless path, means adapted to hold a plurality of blanks on said former comprising a pneumatic gripper, means adapted to fold one of said blanks relative to another to form an article on said former, comprising a pair of folding jaws the members of which are respectively disposed on opposite sides of the path of said former, means adapted to move said jaws toward respective sides of said former at a point of rest in said endless path, a pivoted jaw carried by said former adapted to retain said folded blank in folded condition, and means to move said jaw toward and from said former.

234. In an apparatus of the character described, in combination, a former, means adapted to intermittently move the same in an endless path, means adapted to hold a plurality of blanks on said former comprising a pneumatic gripper, means adapted to fold one of said blanks relative to another to form an article on said former, comprising a pair of folding jaws the members of which are respectively disposed on opposite sides of the path of said former, means adapted to move said jaws toward respective sides of said former at a point of rest in said endless path, a third folding jaw disposed adjacent the same point of rest as said pair of jaws, and means adapted to move said third jaw toward a face of said former which is disposed transversely of said endless path.

235. In an apparatus of the character described, in combination, a former, means adapted to intermittently move the same in an endless path, means adapted to hold a plurality of blanks on said former comprising a pneumatic gripper, means adapted to fold one of said blanks relative to another to form an article on said former, comprising a pair of folding jaws the members of which are respectively disposed on opposite sides of the path of said former, means adapted to move said jaws toward respective sides of said former at a point of rest in said endless path, a third folding jaw disposed at the side of said endless path and adjacent the same point of rest as said pair of jaws, and means adapted to move said third jaw toward a face of said former which is disposed transversely of said endless path.

236. In an apparatus of the character described, in combination, a former, means adapted to intermittently move the same in an endless path, means adapted to hold a plurality of blanks on said former comprising a pneumatic gripper face, means adapted to cause a blank to be deposited on said gripper face at a point of rest in said endless path, means adapted to transfer another blank to said former at a different point in said endless path, and means adapted to fold one of said blanks around the other to form an article.

237. In an apparatus of the character described, in combination, a former adapted to move in an endless path and comprising a pneumatic gripping face disposed peripherally of said path, folding jaws adapted to coöperate with the sides of said former, a folding jaw adapted to coöperate with said pneumatic gripping face, and means adapted to move said jaws relative to said sides and face respectively.

238. In an apparatus of the character described, in combination, a former adapted to move in an endless path and comprising a pneumatic gripping face disposed peripherally of said path, rock shafts, folding jaws loosely attached to said rock shafts, respectively, adapted to coöperate with the sides of said former, a folding jaw adapted to coöperate with said pneumatic gripping face, and means adapted to move said jaws toward and from said sides and face respectively.

239. In an apparatus of the character described, in combination, a former adapted to move in an endless path and comprising a pneumatic gripping face disposed peripherally of said path, a pair of folding jaws adapted to coöperate with the sides of said former, a pair of folding jaws adapted to coöperate with said pneumatic gripping face, the members of one pair being connected to the members of the other pair, and means adapted to move said jaws toward and from said sides and faces respectively.

240. In an apparatus of the character described, in combination, a former adapted to move in an endless path and comprising a pneumatic gripping face disposed peripherally of said path, rock shafts, links connecting said rock shafts in pairs, folding jaws carried by said rock shafts and adapted to coöperate with the sides of said former, and means adapted to rock said shafts.

241. In an apparatus of the character described, in combination, a former adapted to move in an endless path and comprising a pneumatic gripping face disposed peripherally of said path, rock shafts, links connecting said rock shafts in pairs, folding jaws carried by said rock shafts and adapted to coöperate with the sides of said former, and means adapted to rock said shafts, the jaws of a pair of connected rock shafts being arranged to effect folding one after the other.

242. In an apparatus of the character described, in combination, a former adapted to move in an endless path and comprising a pneumatic gripping face disposed peripherally of said path, rock shafts, links connecting said rock shafts in pairs, folding jaws carried by said rock shafts and adapted to coöperate with the sides of said former, means adapted to rock said shafts, the jaws of a pair of connected rock shafts being arranged to effect folding one after the other, a pair of folding jaws adapted to coöperate with the opposite sides of said pneumatic gripping face, and means to operate said latter jaws.

243. In an apparatus of the character described, in combination, a former adapted to move in an endless path and comprising a pneumatic gripping face disposed peripherally of said path, rock shafts, links connecting said rock shafts in pairs, folding jaws carried by said rock shafts and adapted to coöperate with the sides of said former, means adapted to rock said shafts, the jaws of a pair of connected rock shafts being arranged to effect folding one after the other, a pair of folding jaws adapted to coöperate with the opposite sides of said pneumatic gripping face, means to operate said latter jaws, comprising a pair of levers, respectively connected to said latter jaws, and cams adapted to operate said levers.

244. In an apparatus of the character described, in combination, an intermittently movable former, a pair of folding jaws adapted to move toward and from opposite sides of said former when the latter is stationary, a third folding jaw movable into and out of the path of said former, and means adapted to effect said movement of said jaws.

245. In an apparatus of the character described, in combination, an intermittently movable former, a pair of folding jaws adapted to move toward and from opposite sides of said former when the latter is stationary, a third folding jaw movable into and out of the path of said former, and rock shafts on which said jaws are mounted adapted to effect said movements of said jaws.

246. In an apparatus of the character described, in combination, a movable former, a pair of folding jaws adapted to move toward and from opposite sides of said former, a second pair of folding jaws adapted to move into and out of the path of said former, rock shafts to which said jaws are respectively connected, means connecting the rock shafts of one pair of jaws to those of the other in pairs, means adapted to rock said shafts, a pair of folding jaws adapted to move toward and from the end of said former at opposite sides thereof, rock levers to which said last mentioned jaws are connected, and means adapted to rock said levers one before the other.

247. In an apparatus of the character described, in combination, a movable former, a pair of folding jaws adapted to move toward and from opposite sides of said former, a second pair of folding jaws adapted to move into and out of the path of said former, rock shafts to which said jaws are respectively connected, means connecting the rock shafts of one pair of jaws to those of the other in pairs, means adapted to rock said shafts, a pair of toggles each comprising a folding jaw, adapted to move toward and from the end of said former at opposite sides thereof, rock levers to which said toggles are connected, and means adapted to rock said levers one before the other.

248. In an apparatus of the character described, in combination, a movable former, a pair of folding jaws adapted to move toward and from opposite sides of said former, a second pair of folding jaws adapted to move into and out of the path of said former, rock shafts to which said jaws are respectively connected, means connecting the rock shafts of one pair of jaws to those of the other in pairs, means adapted to rock said shafts, a pair of folding jaws adapted to move toward and from the end of said former at opposite sides thereof, rock levers to which said last mentioned jaws are connected, means adapted to rock said levers one before the other, a third folding jaw adapted to move toward and from the end of said former at a third side thereof, and cam means adapted to operate said third jaw.

249. In an apparatus of the character described, in combination, a movable former, a pair of folding jaws adapted to move toward and from opposite sides of said former, a second pair of folding jaws adapted to move into and out of the path of said former, rock shafts to which said jaws are respectively connected, means connecting the rock shafts of one pair of jaws to those of the other in pairs, means adapted to rock said shafts, a pair of folding jaws adapted to move toward and from the end of said former at opposite sides thereof, rock levers to which said last mentioned jaws are connected, means adapted to rock said levers one before the other, a third folding jaw comprising a third toggle adapted to move toward and from the end of said former at a third side thereof, and cam means adapted to operate said third toggle.

250. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, and mechanism adapted to fold said composite blank on lines transverse to said edge into a tubular element.

251. In an apparatus of the character described, in combination, a plurality of web feeding mechanisms, a plurality of mechanisms adapted to sever blanks from said webs, web folding mechanism, web grooving mechanism, and means whereby the aforesaid mechanisms automatically coöperate to form a composite blank composed of a section of one web disposed on the opposite faces of a grooved section of another web and across one edge thereof.

252. In an apparatus of the character described, in combination, a plurality of web feeding mechanisms, a plurality of mechanisms adapted to sever blanks from said webs, one of said webs having longitudinal grooves, web folding mechanism, means whereby the aforesaid mechanisms automatically coöperate to form a composite blank composed of a section of one web disposed on the opposite faces of a section of the grooved web and across one edge thereof, and mechanism adapted to fold said composite blank on lines transverse to said edge into a tubular element, said last mentioned mechanism comprising an angular former the corners of which enter the grooves of the folded composite blank.

253. In an apparatus of the character described, in combination, a plurality of web feeding mechanisms, a plurality of mechanisms adapted to sever blanks from said webs, web folding mechanism, web grooving mechanism, means whereby the aforesaid mechanisms automatically coöperate to form a composite blank composed of a section of one web disposed on the opposite faces of a grooved section of another web and across one edge thereof, and mechanism adapted to fold said composite blank on the grooved lines and transverse to said edge into a tubular element.

254. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, and mechanism comprising an angular former adapted to fold said composite blank on lines transverse to said edge into a tubular element.

255. In an apparatus of the character described, in combination, a plurality of web feeding mechanisms, a plurality of mechanisms adapted to sever blanks from said webs, web folding mechanism, web grooving mechanism, means whereby the aforesaid mechanisms automatically coöperate to form a composite blank composed of a section of one web disposed, on the opposite faces of a grooved section of another web and across one edge thereof, and mechanism adapted to fold said composite blank on the grooved lines and transverse to said edge into a tubular element, said last mentioned mechanism comprising an angular former around which said composite blank is folded.

256. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, mechanism comprising an angular former adapted to fold said composite blank on lines transverse to said edge into a tubular element, a discharging device, and means adapted to cause relative movement between said former and said device to remove the folded composite blank from said former.

257. In an apparatus of the character described, in combination, a plurality of web feeding mechanisms, a plurality of mechanisms adapted to sever blanks from said webs, web folding mechanism, web gluing mechanism, means whereby the aforesaid mechanisms automatically coöperate to form a composite blank composed of a section of one web adhesively disposed on the opposite faces of a section of another web and across one edge thereof, mechanism, comprising an angular former, adapted to fold said composite blank on lines transverse to said edge into a tubular element, a discharging device, and means adapted to cause relative movement between said former and said discharging device to remove the folded composite blank from said former, one of said web feeding mechanisms comprising a reciprocatory element adapted to move the blank severed from one web while adhering to the other web, thereby intermittently feeding said latter web.

258. In an apparatus of the character described, in combination, feeding mechanism comprising devices adapted to separately feed webs, severing mechanism adapted to separately sever said webs, web folding mechanism, shaping means comprising a former, means whereby the aforesaid mechanisms automatically coöperate to form a composite blank composed of a section of one web disposed on the opposite faces of a section of the other web and across one edge thereof, and means adapted to coöperate with said former to fold said composite blank in a plane parallel to said edge.

259. In an apparatus of the character described, in combination, body web feeding means, cover web feeding means adapted to operate separately from the body web feeding means, gluing means, body web severing means, cover web severing means adapted to operate separately from the body web severing means, cover web folding means, means whereby the aforesaid means automatically coöperate to form a composite blank comprising an adhesively attached superposed body blank and cover blank with a portion of the cover blank disposed on opposite faces of the body blank and around one of the edges thereof, an angular former, and means adapted to coöperate with said former to fold said composite blank in a plane parallel to said edge around which said portion of the cover blank is disposed, into a tubular element.

260. In an apparatus of the character described, in combination, body web feeding means, cover web feeding means adapted to operate separately from the body web feeding means, gluing means, body web severing means, cover web severing means adapted to operate separately from the body web severing means, cover web folding means, means whereby the aforesaid means automatically coöperate to form a composite blank comprising an adhesively attached superposed body blank and cover blank with a portion of the cover blank disposed on opposite faces of the body blank and around one of the edges thereof, an angular former, and means adapted to coöperate with said former to fold said composite blank in a plane parallel to the edge around which said portion of the cover blank is disposed, into a tubular element, said cover web feeding means comprising a movable device adapted to move said body blank and thereby feed said cover web before said cover blank is severed from said cover web.

261. In an apparatus of the character described, in combination, body web feeding means, cover web feeding means adapted to operate separately from the body web feeding means, gluing means, body web severing means, cover web severing means adapted to operate separately from the body web severing means, cover web folding means, and means whereby the aforesaid means automatically coöperate to sever a blank from said body web and adhesively attach one face of said blank to said cover web, thereafter severing said cover web to produce a cover blank, said cover web feeding means comprising a movable device adapted to move said body blank and thereby feed said cover web before said cover blank is severed from said cover web, said folding means being arranged to cause a portion of the cover blank to be disposed around one edge of the body blank and against the opposite face thereof.

262. In an apparatus of the character described, in combination, body web feeding means, cover web feeding means adapted to operate separately from the body web feeding means, gluing means, body web severing means, cover web severing means adapted to operate separately from the body web severing means, cover web folding means, and means whereby the aforesaid means automatically coöperate to sever a blank from said body web and adhesively attach one face of said blank to said cover web, thereafter severing said cover web to produce a cover blank, said cover web feeding means comprising a reciprocatory device adapted to move said body blank and thereby feed said cover web before said cover blank is severed from said cover web, said folding means being arranged to cause a portion of the cover blank to be disposed around one edge of the body blank and against the opposite face thereof.

263. In an apparatus of the character described, in combination, body web feeding means, cover web feeding means adapted to operate separately from the body web feeding means, gluing means, body web severing means, cover web severing means adapted to operate separately from the body web severing means, cover web folding means, and means whereby the aforesaid means automatically coöperate to sever a blank from said body web and adhesively attach one face of said blank to said cover web, thereafter severing said cover web to produce a cover blank, said cover web feeding means comprising a reciprocatory gripper adapted to move said body blank and thereby feed said cover web before said cover blank is severed from said cover web, said folding means being arranged to cause a portion of the cover blank to be disposed around one edge of the body blank and against the opposite face thereof.

264. In an apparatus of the character described, in combination, body web feeding means, cover web feeding means adapted to operate separately from the body web feeding means, gluing means, body web severing means, cover web severing means adapted to operate separately from the body web severing means, cover web folding means, means whereby the aforesaid means automatically coöperate to sever a blank from said body web and adhesively attach one face of said blank to said cover web, thereafter severing said cover web to produce a cover blank, said cover web feeding means comprising a reciprocatory device adapted to move said body blank and thereby feed said cover web before said cover blank is severed from said cover web, said folding means being arranged to cause a portion of the cover blank to be disposed around one edge of the body blank and against the opposite face thereof, an angular former, and means adapted to coöperate with said former to fold the adhesively attached blanks on lines at an angle to said edge of the body blanks.

265. In an apparatus of the character described, in combination, body web feeding means, cover web feeding means adapted to operate separately from the body web feeding means, gluing means, body web severing means, cover web severing means adapted to operate separately from the body web severing means, cover web folding means, blank pressing means, and means whereby the aforesaid means automatically coöperate to sever a blank from said body web and adhesively attach one face of said blank to said cover web and press the same thereagainst, thereafter severing said cover web to produce a cover blank, said cover web feeding means comprising a movable device adapted to move said body blank and thereby feed said cover web before said cover blank is severed from said cover web, said folding means being arranged to cause a portion of the cover blank to be disposed around one edge of the body blank and against the opposite face thereof.

266. In an apparatus of the character described, in combination, feeding mechanism comprising devices adapted to separately feed a pair of webs, blank folding mechanism comprising a former, severing mechanisms, one for each web, and means whereby said feeding and severing mechanisms operate to successively produce pairs of superposed blanks from said respective webs, the blanks of a pair being of different length in that dimension corresponding to the length of the webs from which they were produced, respectively, and one of said feeding mechanisms comprising means operative intermediate said severing mechanism and said folding mechanism adapted to successively transfer the blank pairs into coöperative relation with said folding mechanism.

267. In an apparatus of the character described, in combination, feeding mechanism comprising devices adapted to separately feed a pair of webs, blank folding mechanism comprising a former, severing mechanisms, one for each web, and means whereby said feeding and severing mechanisms operate to successively produce pairs of superposed blanks from said respective webs, the blanks of a pair being of different length in that dimension corresponding to the length of the webs from which they were produced, respectively, and one of said feeding mechanisms comprising oscillatory means operative intermediate said severing mechanism and said folding mechanism adapted to successively transfer the blank pairs into coöperative relation with said folding mechanism.

268. In an apparatus of the character described, in combination, feeding mechanism comprising devices adapted to separately feed a pair of webs, blank folding mechanism comprising a former, severing mechanisms, one for each web, web folding mechanism, means whereby said feeding, severing and web folding mechanisms coöperate to successively produce, from said webs, pairs of superposed blanks having a portion of one blank disposed on opposite faces of a companion blank and across an edge thereof, and means adapted to successively transfer the blank pairs into coöperative relation with said blank folding mechanism.

269. In an apparatus of the character described, in combination, feeding mechanism comprising devices adapted to separately feed a pair of webs, blank folding mechanism comprising a former, severing mechanisms, one for each web, web folding mechanism, means whereby said feeding, severing and web folding mechanisms coöperate to successively produce, from said webs, pairs of superposed blanks having a portion of one blank disposed on opposite faces of a companion blank and across an edge thereof, the blanks of a pair being of different length in that dimension corresponding to the length of the webs from which they were severed, respectively, and means adapted to successively transfer the blank pairs into coöperative relation with said blank folding mechanism.

270. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, mechanism adapted to fold said composite blank on lines transverse to said edge into a tubular element, said last-mentioned mechanism comprising an angular former having a pneumatic gripper face disposed transversely of the former faces inclosed by the folded blank, means adapted to feed a blank to said gripper face, means to energize and deënergize said gripper face at predetermined times, and means adapted to fold a portion of one of said folded blanks against said pneumatically gripped blank.

271. In an apparatus of the character described, in combination, a plurality of web feeding mechanisms, a plurality of mechanisms adapted to sever blanks from said webs, web folding mechanism comprising a combined folding and pressing bar, a pressing jaw movable toward and from the pressing face of said bar and mechanism adapted to move said bars transversely of the path of said webs, means whereby the aforesaid mechanisms automatically coöperate to form a composite blank composed of a section of one web disposed on the opposite faces of a section of another web and across one edge thereof, and mechanism adapted to fold said composite blank on lines transverse to said edge into a tubular element.

272. In an apparatus of the character described, in combination, a plurality of web feeding mechanisms, a plurality of mechanisms adapted to sever blanks from said webs, web folding mechanism comprising a combined folding and pressing bar, a pressing jaw movable toward and from the pressing face of said bar and mechanism adapted to move said bars transversely and longitudinally of the path of said webs, means whereby the aforesaid mechanisms automatically coöperate to form a composite blank composed of a section of one web disposed on the opposite faces of a section of another web and across one edge thereof, and mechanism adapted to fold said composite blank on lines transverse to said edge into a tubular element.

273. In an apparatus of the character described, in combination, a plurality of web feeding mechanisms comprising a reciprocatory web gripping device, a plurality of mechanisms adapted to sever blanks from said webs, web folding mechanism movable in a path intersecting the path of said web gripping device, means whereby the aforesaid mechanisms automatically coöperate to form a composite blank composed of a section of one web disposed on the opposite faces of a section of another web and across one edge thereof, and mechanism adapted to fold said composite blank on lines transverse to said edge into a tubular element.

274. In an apparatus of the character described, in combination, a plurality of web feeding mechanisms, a plurality of mechanisms adapted to sever blanks from said webs, web folding mechanism comprising a combined folding and pressing bar, a pressing jaw movable toward and from the pressing face of said bar and mechanism adapted to move said bars transversely of the path of said webs, means whereby the aforesaid mechanisms automatically coöperate to form a composite blank composed of a section of one web disposed on the opposite faces of a section of another web and across one edge thereof, and mechanism adapted to fold said composite blank on lines transverse to said edge into a tubular element, one of said severing mechanisms comprising a movable cutter adapted to coöperate with a portion of said combined folding and pressing bar to sever one of said webs.

275. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, and mechanism adapted to fold said composite blank on lines transverse to said edge into a tubular element, one of said feeding mechanisms comprising a pair of intermittently rotatable web gripping rollers and the other comprising a reciprocatory web gripping device.

276. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, and mechanism adopted to fold said composite blank on lines transverse to said edge into a tubular element, said severing mechanisms each comprising rotatable cutting disks and means to reciprocate the latter across the respective webs at predetermined times.

277. In an apparatus of the character described, in combination, a plurality of web feeding mechanisms, a plurality of mechanisms adapted to sever blanks from said webs, web folding mechanism, means whereby the aforesaid mechanisms automatically coöperate to successively form composite blanks each composed of a section of one web disposed on the opposite faces of a section of another web and across one edge thereof, and mechanism adapted to fold said composite blanks on lines transverse to said edge into tubular elements comprising a plurality of formers mounted to travel in an endless path, means adapted to intermittently move said formers and a blank clamping jaw carried by each former, one of said feeding mechanisms comprising a reciprocatory gripper adapted to dispose the composite blanks in the path of said formers opposite said clamping jaw at predetermined times.

278. In an apparatus of the character described, in combination, a plurality of web feeding mechanisms, a plurality of mechanisms adapted to sever blanks from said webs, web folding mechanism, means whereby the aforesaid mechanisms automatically coöperate to successively form composite blanks each comprising a section of one web disposed on the opposite faces of a section of another web and across one edge thereof, and mechanism adapted to fold said composite blanks on lines transverse to said edge into a tubular element comprising a plurality of formers mounted to travel in an endless path, means adapted to intermittently move said formers, a blank clamping jaw carried by each former, one of said feeding mechanisms comprising a reciprocatory gripper adapted to dispose the composite blanks in the path of said formers opposite said clamping jaw at predetermined times, and a reciprocatory hook arm adapted to discharge the tubular elements from said respective formers.

279. In an apparatus of the character described, in combination, a plurality of web feeding mechanisms, a plurality of mechanisms adapted to sever blanks from said webs, web folding mechanism, web grooving mechanism comprising scoring devices spaced apart transverse of the web adapted to remove material from a face of one of said webs as it is fed, means whereby the aforesaid mechanisms automatically coöperate to form a composite blank composed of a section of one web disposed on the opposite faces of a section of another web and across one edge thereof, an angular former and mechanism adapted to fold said composite blank on said former at the grooved portions on lines transverse to said edge into a tubular element.

280. In a device of the character described, in combination, means adapted to feed a binder web, means adapted to sever said web, a flange blank supply device, means adapted to cause said means and said device to coöperate to form successive composite blanks composed of disposed adhesively attached flange blanks and binder blanks, a plurality of rectangular formers movable in an endless path, said formers having a pneumatic gripper face, means adapted to supply heads to the pneumatic gripper faces of said formers, means adapted to energize and deënergize said gripper faces at predetermined times, and means adapted to fold composite blanks around the heads pneumatically held on said formers, respectively.

281. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, a head supply device, a former adapted to support a head from said supply device, and means adapted to fold said composite blank around said former with the plane of the folded composite blank at an angle to that of said head.

282. In an apparatus of the character described, in combination, a plurality of web feeding mechanisms, a plurality of mechanisms adapted to sever blanks from said webs, web folding mechanism, means whereby the aforesaid mechanisms automatically coöperate to form a composite blank composed of a section of one web disposed on the opposite faces of a section of another web and across one edge thereof, and a portion extending beyond that edge of said other section which is opposite said crossed edge, a head supply device, a rectangular former adapted to support a head from said supply device, means adapted to fold said composite blank around said former with the plane of the folded composite blank disposed at an angle to that of said head, and means adapted to fold said extending portion against said head.

Witness my hand this 10th day of April, 1909.

CARLOS HOLLY.

Witnesses:
   THEO. L. POPP,
   ANNA HEIGIS.